(12) United States Patent
Hinckley et al.

(10) Patent No.: US 10,635,291 B2
(45) Date of Patent: Apr. 28, 2020

(54) THUMB AND PEN INTERACTION ON A MOBILE DEVICE

(71) Applicant: Microsoft Technology Licensing, LLC, Redmond, WA (US)

(72) Inventors: Kenneth P. Hinckley, Redmond, WA (US); Michel Pahud, Kirkland, WA (US); William Arthur Stewart Buxton, Toronto (CA); Ken Pfeuffer, Lancaster (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 27 days.

(21) Appl. No.: 15/437,387

(22) Filed: Feb. 20, 2017

(65) Prior Publication Data
US 2018/0239482 A1 Aug. 23, 2018

(51) Int. Cl.
*G06F 3/0488* (2013.01)
*G06F 17/24* (2006.01)
(Continued)

(52) U.S. Cl.
CPC .......... *G06F 3/0488* (2013.01); *G06F 3/038* (2013.01); *G06F 3/03545* (2013.01);
(Continued)

(58) Field of Classification Search
CPC ......... G06F 3/0416; G06F 2203/04806; G06F 3/04883; G06F 3/0485; G06F 3/04845;
(Continued)

(56) References Cited

U.S. PATENT DOCUMENTS 8,325,151 B1 * 12/2012 Chan .................... G06F 3/0487
345/173
8,902,181 B2 12/2014 Hinckley et al.
(Continued)

OTHER PUBLICATIONS

Zhao, et al., "Simple vs. Compound Mark Hierarchical Marking Menus", In Proceedings of the 17th Annual ACM Symposium on User Interface Software and Technology, Oct. 24, 2004, pp. 33-42.
(Continued)

*Primary Examiner* — Chineyere D Wills-Burns
(74) *Attorney, Agent, or Firm* — Merchant & Gould

(57) ABSTRACT

Thumb+pen inputs are described herein, to improve the functionality of touch enabled devices for accepting bimanual input in situations where the device is gripped or supported by one of the user's hands, leaving only one hand free. The thumb of an engaging hand is identified and controls are placed within its range of motion to enhance the functionality provided by the free hand. The actions of the thumb can be used to determine how pen actions made using the other hand are interpreted. Alternatively, the pen can indicate an object through pointing, while the thumb indirectly manipulates one or more of its parameters through touch controls. Marking menus, spring-loaded modes, indirect input, and conventional multi-touch interfaces are applied with respect to the bimanual input mode in which one hand is positioned to hold or support the device, and the other hand is free to improve device operability and accessibility.

17 Claims, 58 Drawing Sheets

(51) Int. Cl.
*G06F 3/0483* (2013.01)
*G06F 3/038* (2013.01)
*G06F 3/0354* (2013.01)
*G06F 3/0484* (2013.01)
*G06F 3/0482* (2013.01)
*G06F 3/0485* (2013.01)

(52) U.S. Cl.
CPC .......... *G06F 3/0482* (2013.01); *G06F 3/0483* (2013.01); *G06F 3/04845* (2013.01); *G06F 3/04883* (2013.01); *G06F 17/242* (2013.01); *G06F 17/246* (2013.01); *G06F 3/0485* (2013.01); *G06F 3/04842* (2013.01); *G06F 2203/04806* (2013.01); *G06F 2203/04807* (2013.01); *G06F 2203/04808* (2013.01)

(58) Field of Classification Search
CPC ......... G06F 3/0482; G06F 2203/04106; G06F 3/04842
USPC ....................................................... 345/173
See application file for complete search history.

(56) References Cited

U.S. PATENT DOCUMENTS

| | | | |
|---|---|---|---|
| 8,994,646 B2 | 3/2015 | Hinckley et al. | |
| 9,360,965 B2 | 6/2016 | Krulce et al. | |
| 2006/0026535 A1* | 2/2006 | Hotelling | G06F 3/0418 715/863 |
| 2010/0073303 A1* | 3/2010 | Wu | G06F 3/0485 345/173 |
| 2011/0191718 A1* | 8/2011 | Hinckley | G06F 3/033 715/835 |
| 2012/0032979 A1* | 2/2012 | Blow | G06F 1/1626 345/647 |
| 2012/0154295 A1* | 6/2012 | Hinckley | G06F 3/04883 345/173 |
| 2012/0158629 A1* | 6/2012 | Hinckley | G06F 3/038 706/15 |
| 2012/0162093 A1* | 6/2012 | Buxton | G06F 3/0482 345/173 |
| 2012/0206363 A1* | 8/2012 | Kyprianou | G06F 3/04883 345/168 |
| 2012/0262407 A1* | 10/2012 | Hinckley | G06F 3/038 345/173 |
| 2012/0287076 A1* | 11/2012 | Dao | G06F 1/1626 345/174 |
| 2013/0300668 A1* | 11/2013 | Churikov | G06F 3/041 345/168 |
| 2014/0157169 A1* | 6/2014 | Kikin-gil | G06F 9/543 715/770 |
| 2015/0205400 A1* | 7/2015 | Hwang | G06F 3/044 345/654 |
| 2015/0363034 A1* | 12/2015 | Hinckley | G06F 3/04883 345/173 |
| 2015/0363035 A1 | 12/2015 | Hinckley et al. | |
| 2016/0054851 A1* | 2/2016 | Kim | G06F 3/0488 345/174 |
| 2016/0195986 A1* | 7/2016 | Kwon | G06F 3/044 345/174 |

OTHER PUBLICATIONS

Foucault, et al., "SPad: a bimanual interaction technique for productivity applications on multi-touch tablets", In Proceedings of Extended Abstracts on Human Factors in Computing Systems, Apr. 26, 2014, pp. 1879-1884.
Wagner, et al., "Multi-finger chords for hand-held tablets: recognizable and memorable", In Proceedings of the SIGCHI Conference on Human Factors in Computing Systems, Apr. 26, 2014, pp. 2883-2892.
Hinckley, et al., "Manual Deskterity: An Exploration of Simultaneous Pen + Touch Direct Input", In Proceedings of Conference on Human Factors in Computing Systems, Apr. 10, 2010, pp. 2793-2802.
Hinckley, et al., "Sensing Techniques for Tablet+Stylus Interaction", in Proceedings of 27th Annual ACM Symposium on User Interface Software and Technology, Oct. 5, 2014, pp. 605-.
Song, et al., "Grips and Gestures on a Multi-Touch Pen", In Proceedings of the SIGCHI Conference on Human Factors in Computing Systems, May 7, 2011, pp. 1-10.
Zeng, et al., "Thumb Widgets: Apply Thumb Tracking to Enhance Capabilities of Multi-touch on Mobile Devices", In Proceedings of the SIGCHI Conference on Human Factors in Computing Systems, Apr. 27, 2013, pp. 1281-1286.
Hinckley, et al, "Cooperative Bimanual Action", In Proceedings of the ACM SIGCHI Conference on Human factors in computing systems, Mar. 27, 1997, pp. 1-14.
Sugimoto, et al., "HybridTouch: An Intuitive Manipulation Technique for PDAs Using Their Front and Rear Surfaces", In Proceedings of the 8th conference on Human-computer interaction with mobile devices and services, Sep. 12, 2006, pp. 137-140.
Abednego, et al., "I-Grabber: expanding physical reach in a large-display tabletop environment through the use of virtual grabber", In Proceedings of the ACM International Conference on Interactive Tabletops and Surfaces, Nov. 23, 2009, pp. 61-64.
Albinsson, et al., "High precision touch screen interaction", In Proceedings of the SIGCHI Conference on Human Factors in Computing Systems, vol. No. 5, Issue No. 1, Apr. 5, 2003, pp. 105-112.
Benko, et al., "Precise selection techniques for multi-touch screens", In Proceedings of the SIGCHI Conference on Human Factors in Computing Systems, Apr. 22, 2006, pp. 1263-1272.
Bergstrom-Lehtovirta, et al., "Modeling the functional area of the thumb on mobile touchscreen surfaces", In Proceedings of the SIGCHI Conference on Human Factors in Computing Systems, Apr. 26, 2014, pp. 1991-2000.
Bezerianos, et al., "The vacuum: facilitating the manipulation of distant objects", In Proceedings of the SIGCHI Conference on Human Factors in Computing Systems, Apr. 2, 2005, pp. 361-370.
Bragdon, et al., "GestureBar: improving the approachability of gesture-based interfaces", In Proceedings of the SIGCHI Conference on Human Factors in Computing Systems, Apr. 9, 2009, pp. 2269-2278.
Brandl, et al., "Combining and measuring the benefits of bimanual pen and direct-touch interaction on horizontal interfaces", In Proceedings of the working conference on Advanced visual interfaces, May 28, 2008, pp. 154-156.
Brown, et al., "Windows on tablets as a means of achieving virtual input devices", In Proceedings of the IFIP TC13 Third Interational Conference on Human-Computer Interaction, Aug. 27, 1990, 11 pages.
Forlines, et al., "HybridPointing: fluid switching between absolute and relative pointing with a direct input device", In Proceedings of the 19th annual ACM symposium on User interface software and technology, Oct. 15, 2006, pp. 211-220.
Guiard, Yves, "Asymmetric Division of Labor in Human Skilled Bimanual Action: The Kinematic Chain as a Model", In Journal of motor behaviour, vol. 19, No. 4, Dec. 1, 1987, 23 pages.
Guiard, et al., "Object pointing: a complement to bitmap pointing in GUIs", In Proceedings of Graphics Interface, May 17, 2004, pp. 9-16.
Hamilton, et al., "High-performance pen + touch modality interactions: a real-time strategy game eSports context", In Proceedings of the 25th annual ACM symposium on User interface software and technology, Oct. 7, 2012, pp. 309-318.
Hinckley, et al., "Informal information gathering techniques for active reading", In Proceedings of the SIGCHI Conference on Human Factors in Computing Systems, May 5, 2012, pp. 1893-1896.
Hinckley, et al., "The springboard: multiple modes in one spring-loaded control", In Proceedings of the SIGCHI Conference on Human Factors in Computing Systems, Apr. 22, 2006, pp. 181-190.

(56) References Cited

OTHER PUBLICATIONS

Hinckley, et al., "Pen + touch = new tools", In Proceedings of the 23nd annual ACM symposium on User interface software and technology, Oct. 3, 2010, pp. 27-36.
Karlson, et al., "Understanding One-Handed Use of Mobile Devices", In Publication of IGI global, Feb. 28, 2008, pp. 86-88.
Karlson, et al., "ThumbSpace: Generalized One-Handed Input for Touchscreen-Based Mobile Devices", In Proceedings of the Conference on Human-Computer Interaction, Sep. 10, 2007, 324-338 pages.
Kurtenbach, et al., "Issues in combining marking and direct manipulation techniques", In Proceedings of the 4th annual ACM symposium on User interface software and technology, Nov. 11, 1991, pp. 137-144.
Kurtenbach, et al., "User Learning and Performance with Marking Menus", In Proceedings of the SIGCHI Conference on Human Factors in Computing Systems, Apr. 24, 1994, pp. 258-264.
Lai, et al., "ExtendedThumb: A Motion-based Virtual Thumb for Improving One-handed Target Acquisition on Touch-screen Mobile Devices", In Proceedings of the Extended Abstracts of the 32Nd Annual ACM Conference on Human Factors in Computing Systems, Apr. 26, 2014, pp. 1825-1830.
Lank, et al., "Concurrent Bimanual Stylus Interaction: A Study of Non-preferred Hand Mode Manipulation", In Proceedings of Graphics Interface, Jun. 7, 2006, pp. 17-24.
Lee, et al., "PhantomPen: Virtualization of Pen Head for Digital Drawing Free from Pen Occlusion & Visual Parallax", In Proceedings of the 25th Annual ACM Symposium on User Interface Software and Technology, Oct. 7, 2012, pp. 331-340.
Li, et al. "Experimental Analysis of Mode Switching Techniques in Pen-based User Interfaces", In Proceedings of the SIGCHI Conference on Human Factors in Computing Systems, Apr. 2, 2005, pp. 461-470.
Lopes, et al., "Combining bimanual manipulation and pen-based input for 3D modelling", In Proceedings of the Eighth Eurographics Symposium on Sketch-Based Interfaces and Modeling, Aug. 5, 2011, pp. 15-22.
Matsushita, et al., "Dual Touch: A Two-handed Interface for Pen-based PDAs", In Proceedings of the 13th Annual ACM Symposium on User Interface Software and Technology, vol. 2, Issue 2, Nov. 1, 2000, 211-212 pages.
Matulic, et al., "Pen and touch gestural environment for document editing on interactive tabletops", In Proceedings of the ACM international conference on Interactive tabletops and surfaces, Oct. 6, 2013, pp. 41-50.
McGuffin, et al., "FaST Sliders: Integrating Marking Menus and the Adjustment of Continuous Values", In Proceedings of the Graphics Interface, May 2000, 7 pages.
Oulasvirta, et al., "Improving Two-Thumb Text Entry on Touchscreen Devices", In Proceedings of the Conference on Human Factors in Computing Systems, Apr. 27, 2013, pp. 2765-2774.

Pfeuffer, et al., "Partially-indirect Bimanual Input with Gaze, Pen, and Touch for Pan, Zoom, and Ink Interaction", In Proceedings of the CHI Conference on Human Factors in Computing Systems, May 7, 2016, pp. 2845-2856.
Potter, et al., "Improving the Accuracy of Touch Screens: An Experimental Evaluation of Three Strategies", In Proceedings of the SIGCHI Conference on Human Factors in Computing Systems, May 15, 1988, pp. 27-32.
Raskin, Jef, "The Humane Interface: New Directions for Designing Interactive Systems", In Publication of Addison-Wesley, Mar. 29, 2000.
Saund, et al., "Stylus Input and Editing Without Prior Selection of Mode", In Proceedings of the 16th Annual ACM Symposium on User Interface Software and Technology, vol. 5, Issue 2, Nov. 2, 2003, pp. 213-216.
Trudeau, et al., "Tablet Keyboard Configuration Affects Performance, Discomfort and Task Difficulty for Thumb Typing in a Two-Handed Grip", In Journal of PLoS ONE, vol. 8, Issue 6, Jun. 26, 2013, pp. 1-9.
Wagner, et al., "BiTouch and BiPad: designing bimanual interaction for hand-held tablets", In Proceedings of the SIGCHI Conference on Human Factors in Computing Systems, May 5, 2012, pp. 2317-2326.
Walny, et al., "Understanding pen and touch interaction for data exploration on interactive whiteboards", In Journal of IEEE Transactions on Visualization and Computer Graphics, vol. 18, No. 12, Dec. 2012, pp. 2779-2788.
Wolf, et al., "Comparing pointing techniques for grasping hands on tablets", In Proceedings of the 16th international conference on Human-computer interaction with mobile devices & services, Sep. 23, 2014, pp. 53-62.
Wolf, et al., "Ergonomic characteristics of gestures for front- and back-of-tablets interaction with grasping hands", In Proceedings of the 16th international conference on Human-computer interaction with mobile devices & services, Sep. 23, 2014, pp. 453-458.
Yee, Ka-Ping, "Two-handed interaction on a tablet display", In Proceedings of Extended Abstracts on Human Factors in Computing Systems, Apr. 24, 2004, pp. 1493-1496.
Yoon, et al., "RichReview: Blending Ink, Speech, and Gesture to Support Collaborative Document Review", In Proceedings of the 27th Annual ACM Symposium on User Interface Software and Technology, Oct. 5, 2014, pp. 481-490.
Zeleznik, et al., "Hands-on Math: A Page-based Multi-touch and Pen Desktop for Technical Work and Problem Solving", In Proceedings of the 23Nd Annual ACM Symposium on User Interface Software and Technology, Oct. 3, 2010, pp. 17-26.
Zgraggen, et al., "Tableur☐: Handwritten Spreadsheets", In Proceedings of the CHI Conference Extended Abstracts on Human Factors in Computing Systems, May 7, 2016, pp. 2362-2368.
Jacko, Julie A, "The Human-computer Interaction Handbook", In Publication of CRC Press, May 4, 2012.
Odell, et al., "Enabling comfortable thumb interaction in tablet computers: a Windows 8 case study", In Proceedings of the Human Factors and Ergonomics Society Annual Meeting, vol. 56, Sep. 2012.

* cited by examiner

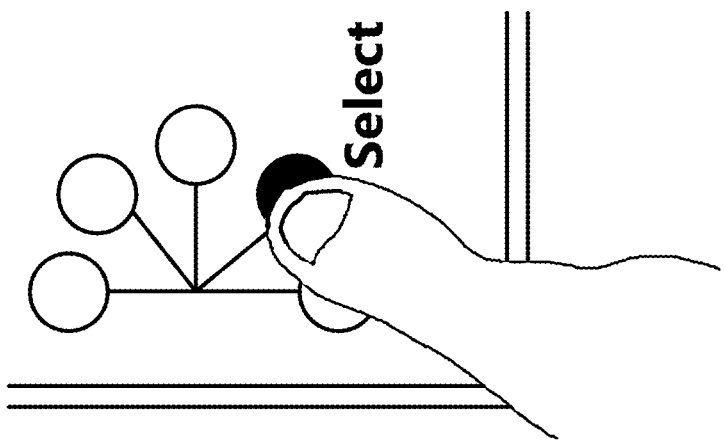
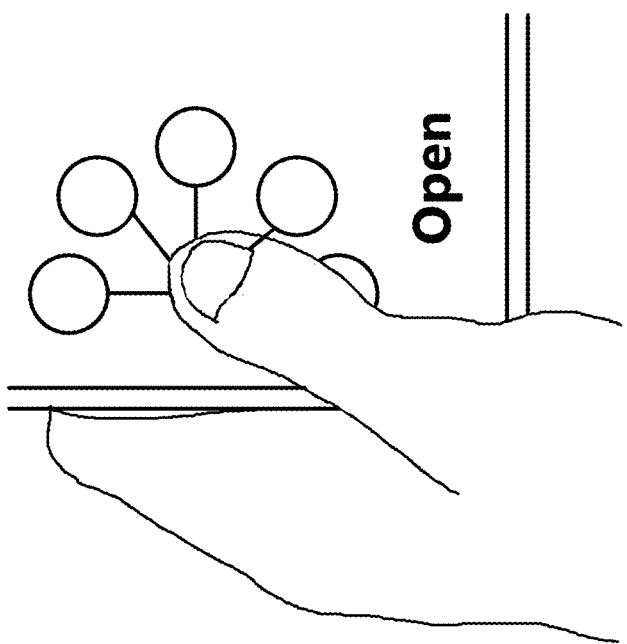
FIG. 5A

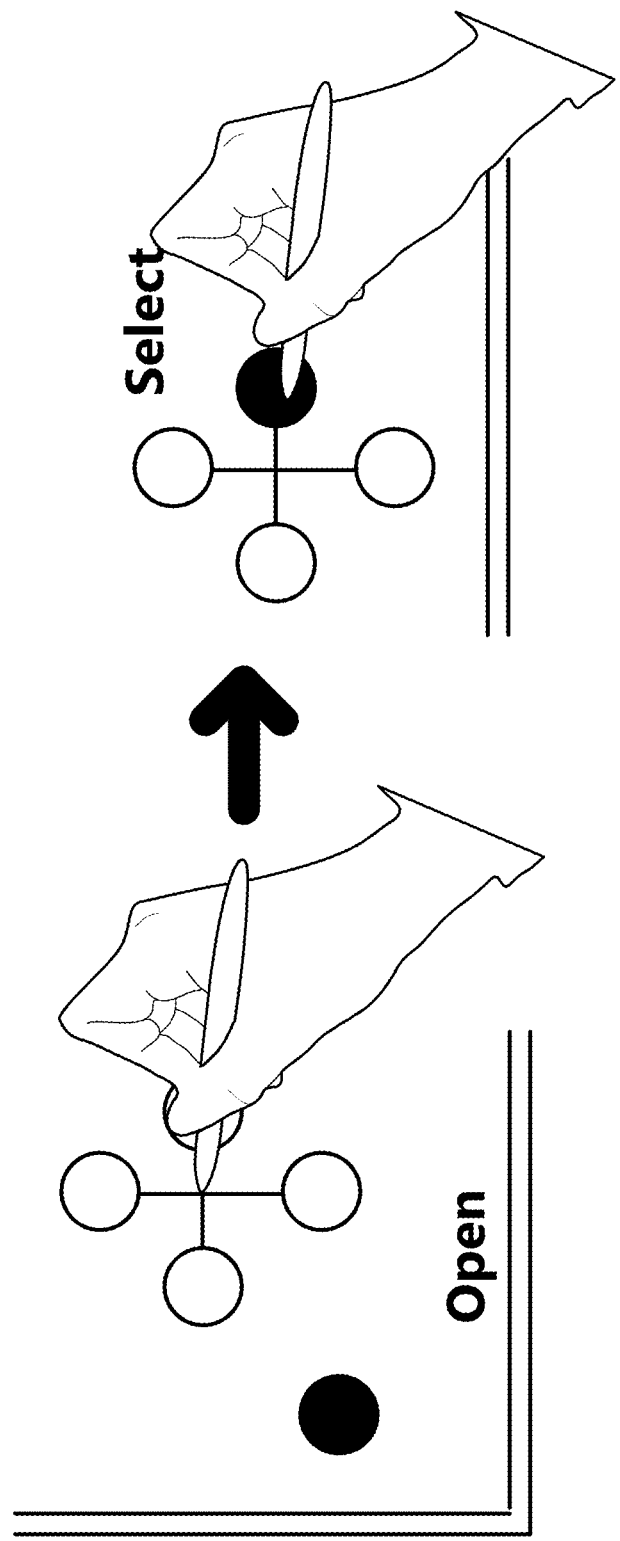

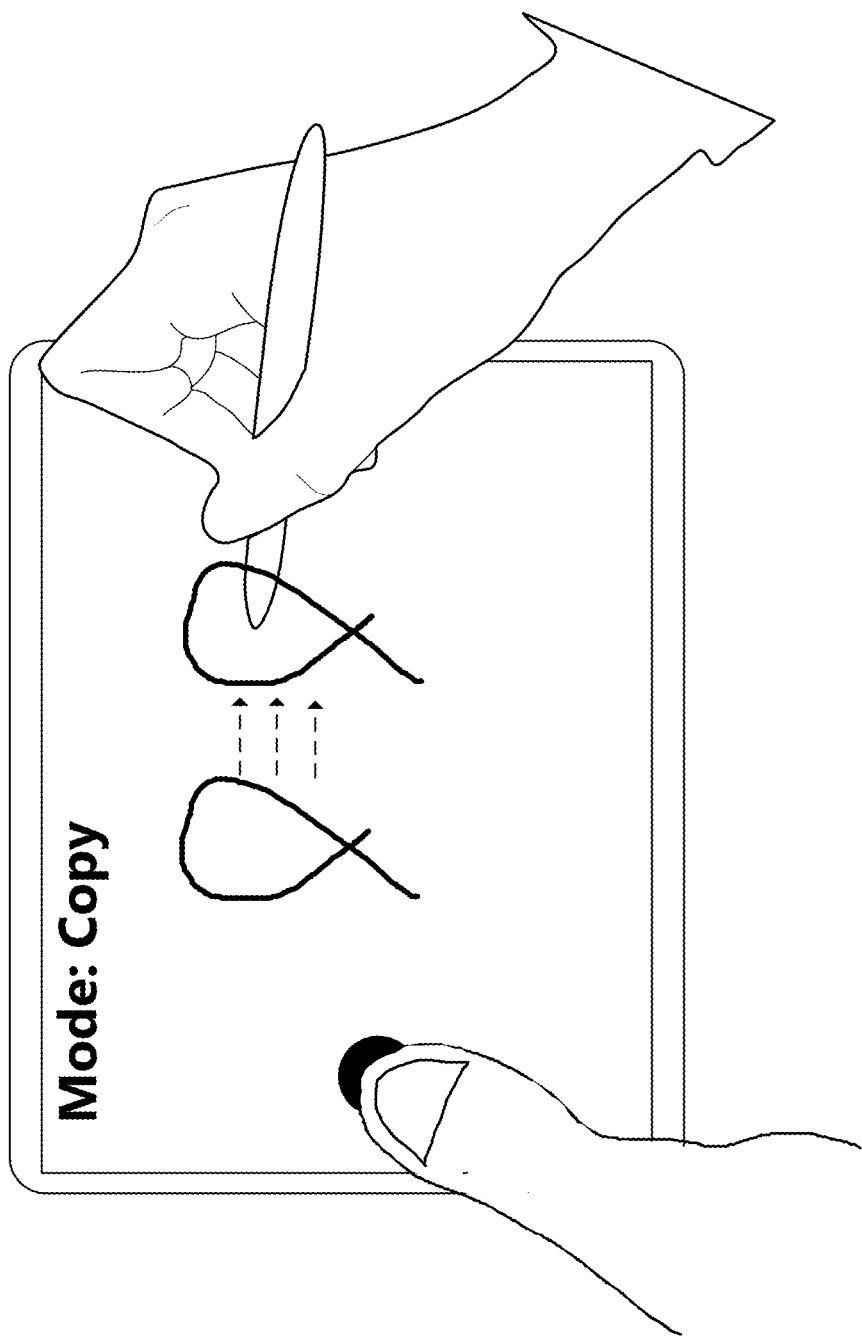

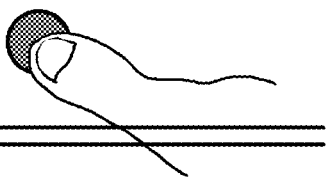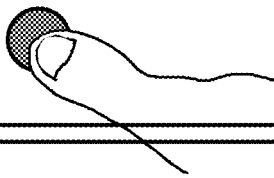
FIG. 8

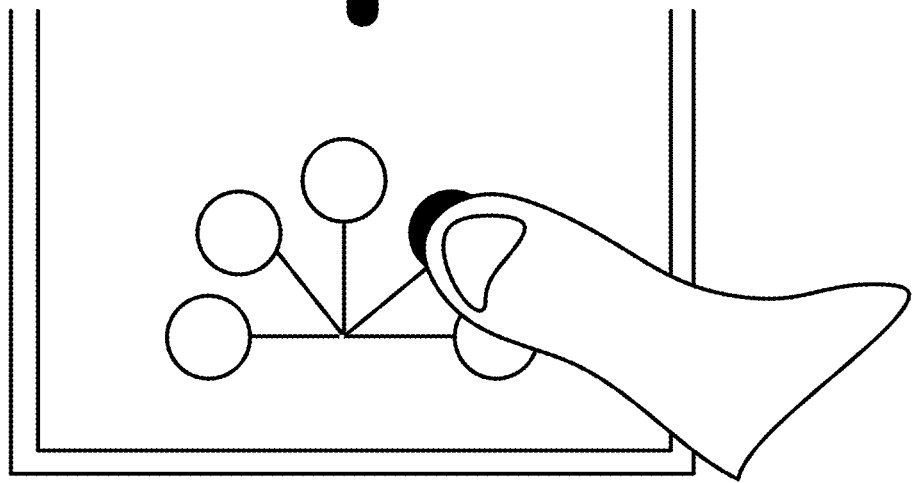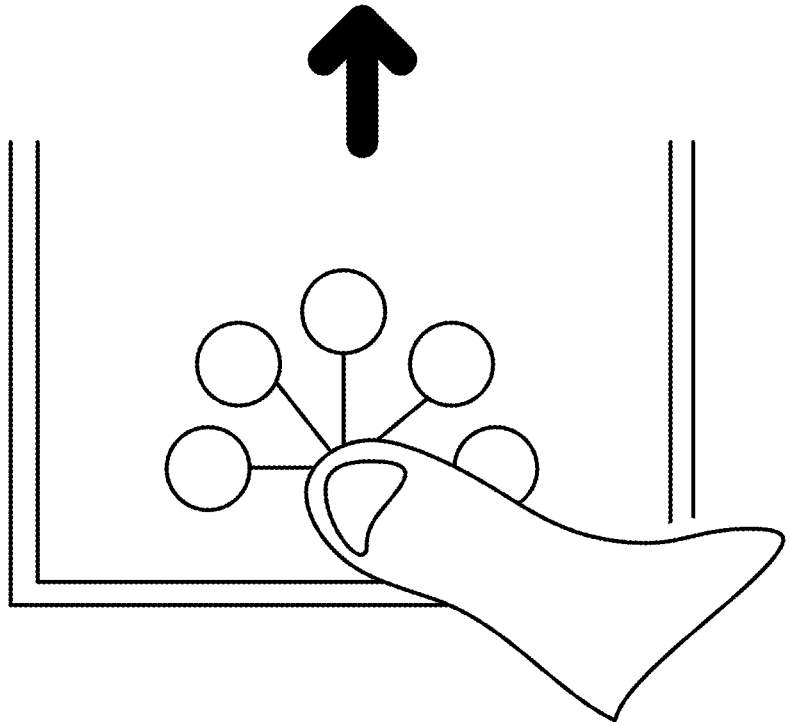
FIG. 10A

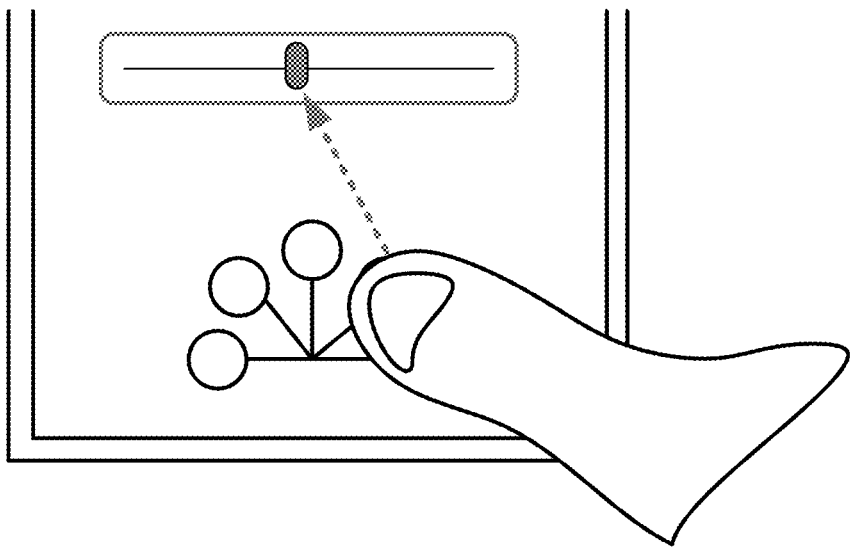
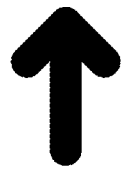
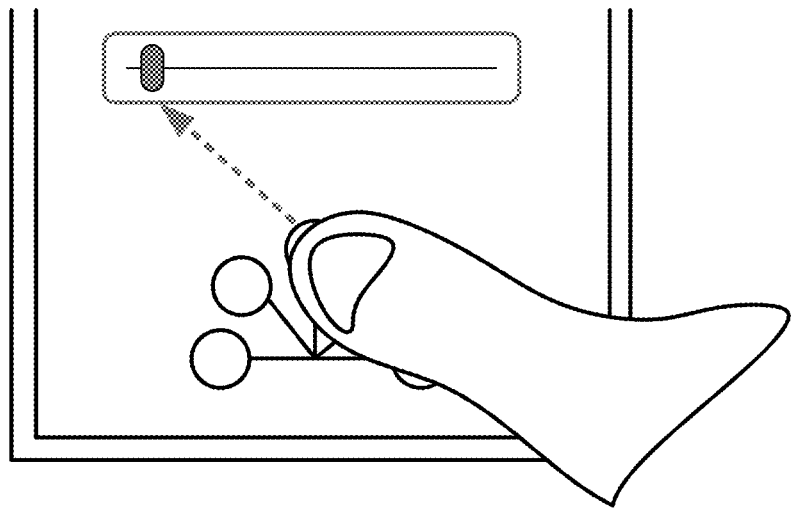
FIG. 10B

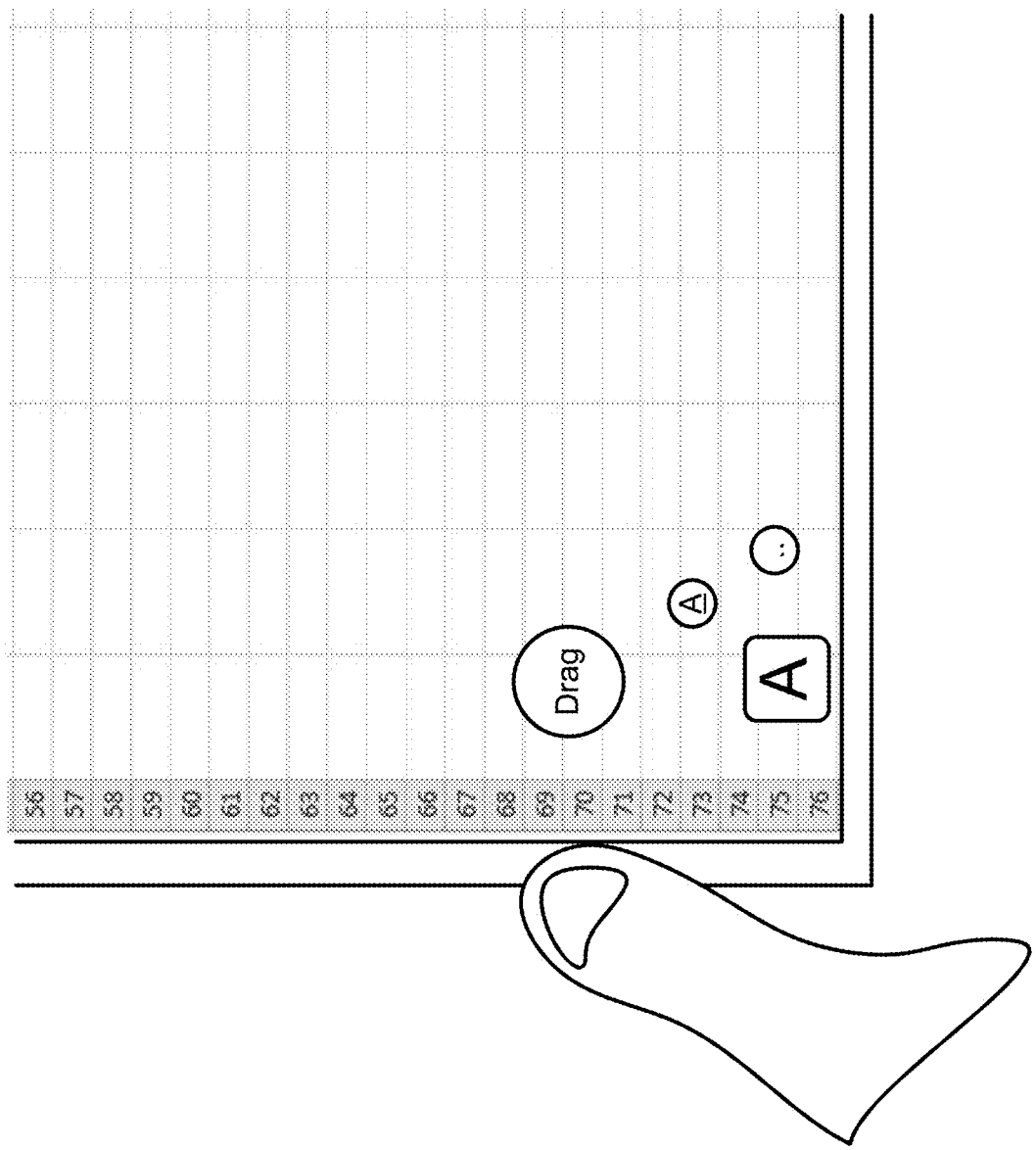

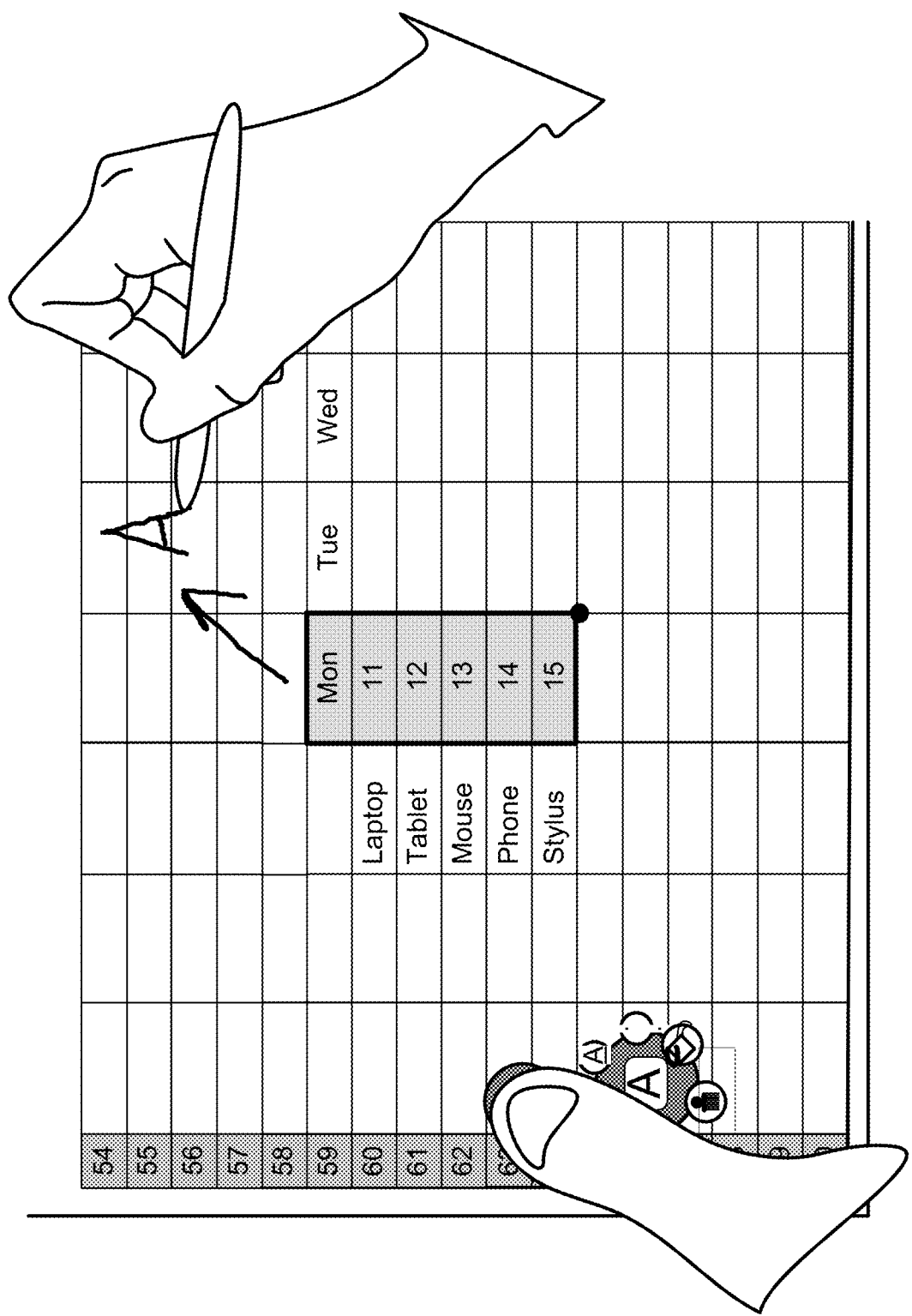

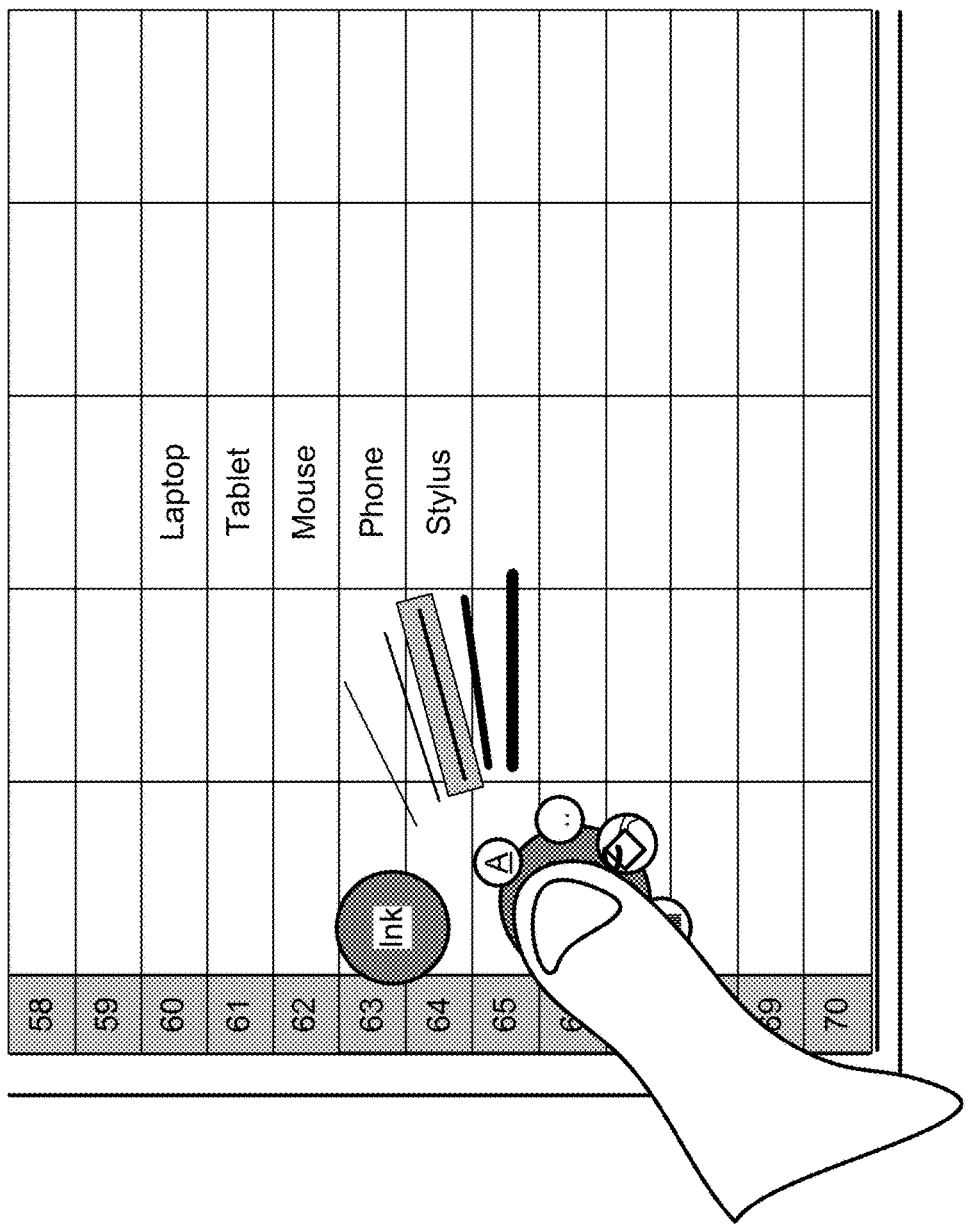

FIG. 18A

Website name 1
Https//:websiteadress.org
Lorem ipsum dolor sit amet, consectetur adipiscing elit, sed do eiusmod tempor incididunt ut labore et dolore magna aliqua.

Website name 2
Https//:websiteadress2.org
Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur.

Website name 3
Https//:websiteadress3.org
Excepteur sint occaecat cupidatat non proident, sunt in culpa qui officia deserunt mollit anim id est laborum.

Website name 4
Https//:websiteadress4.org
Lorem ipsum dolor sit amet, consectetur adipiscing elit, sed do eiusmod tempor incididunt ut labore et dolore magna aliqua.

Website name 5
Https//:websiteadress5.org
Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur.

Website name 5

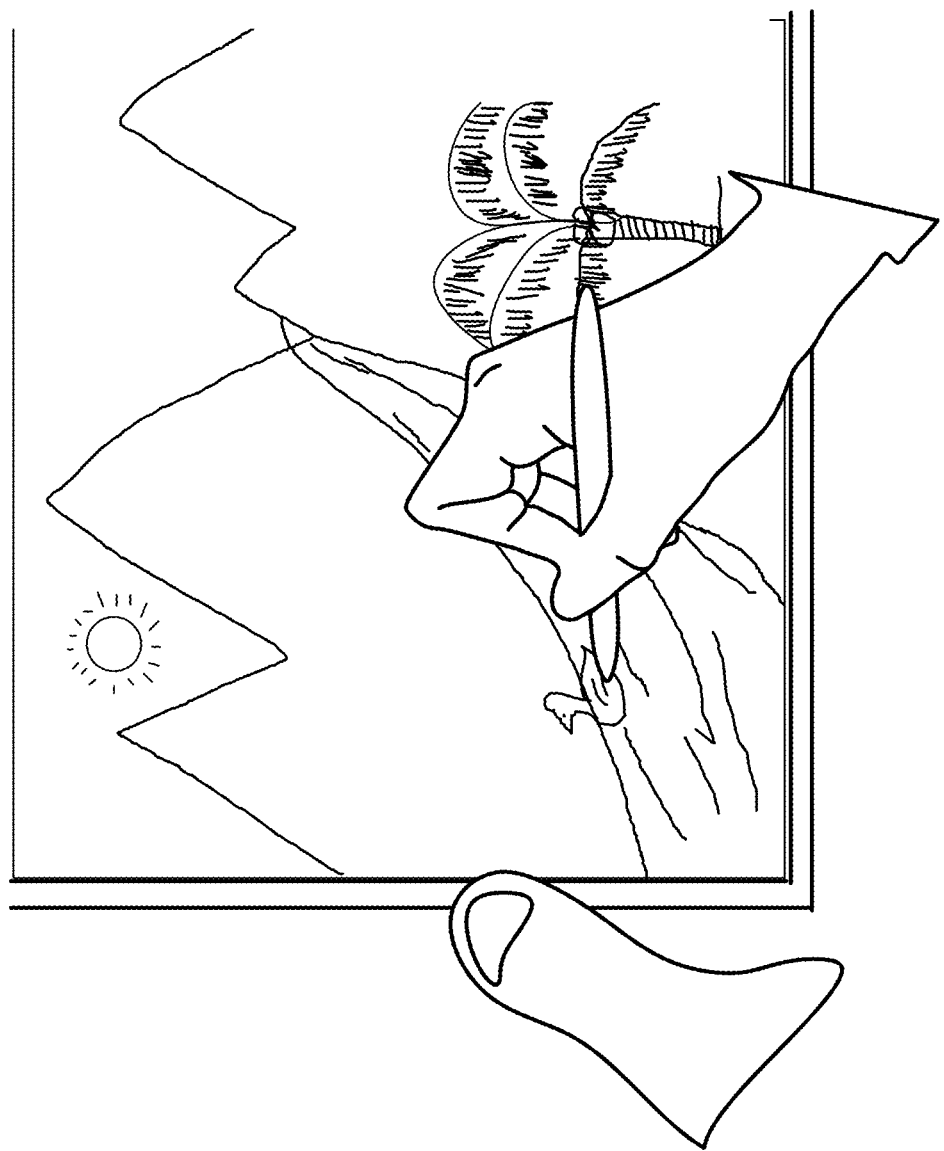

MOBILE COMPUTING DEVICE

THUMB AND PEN INTERACTION ON A MOBILE DEVICE

BACKGROUND

Mobile computing devices have recently begun supporting simultaneous pen and touch technology. Unfortunately, because of their mobility, mobile computing devices are subjected to a more diverse operating environment. As a result, users of mobile computing devices often have more difficulty compared to conventional desktop computing devices or wall-mounted computers users, who are able to freely use two hands for bimanual interactions. In contrast, the mobile computing device users may include users with limited access to both hands, having to engage the device with one hand and manipulate content with the other, such as, for example, a doctor using a mobile computing device for taking notes on a patient's chart, a passenger on a train, a person reclined on the couch, or a person at the park. In many situations, a supporting surface is unavailable or the mobile device must be supported for stability, which places several users at a disadvantage or actively hinders the use of bimanual input.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

To improve the functionality of touch enabled devices for accepting bimanual input in situations where the device is gripped or supported by one of the user's hands, as well as other situations, thumb+pen inputs are described herein. The thumb of an engaging hand is identified and controls are placed within its range of motion to enhance the functionality provided by the free hand (referred to as the pen input). For instance, the actions of the thumb can be used to determine how pen actions made using the other hand are interpreted. In other aspects, the pen can indicate an object through pointing, while the thumb indirectly manipulates one or more of its parameters through touch controls. Marking menus, spring-loaded modes, indirect input, and conventional multi-touch interfaces are applied with respect to the bimanual input mode in which one hand is positioned to hold or support the device, and the other hand is free.

The functionality of the user's device is improved by the present disclosure in at least that an improved user experience is provided that enables the user to manipulate virtual objects displayed on the device with bimanual input while one hand is otherwise engaged in manipulating the physical object of the device. The range of inputs available to the user via the combined thumb of the engaged hand and the input device of (or held by) the free hand are greater than those available to either alone, and thus the efficiency at which the user can manipulate content is improved, and fewer computer resources are expended in effectuating user commands.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 5A-5B are illustrations of example graphical user interfaces that enable thumb+pen interactions;

FIGS. 6A-6B are illustrations of example graphical user interfaces that enable thumb+pen interactions;

FIG. 8 is an illustration of example graphical user interface that enables thumb+pen interactions;

FIGS. 10A-10B are illustrations of example graphical user interfaces that enable thumb+pen interactions;

FIGS. 12A-12C are illustrations of example graphical user interfaces that enable thumb+pen interactions;

FIG. 14 is an illustration of example graphical user interface that enables thumb+pen interactions;

FIGS. 16A-16C are illustrations of example graphical user interfaces that enable thumb+pen interactions;

FIGS. 18A-18B are illustrations of example graphical user interfaces that enable thumb+pen interactions;

FIGS. 23A-23B are illustrations of example graphical user interfaces that enable thumb+pen interactions;

DETAILED DESCRIPTION

Figure 1:
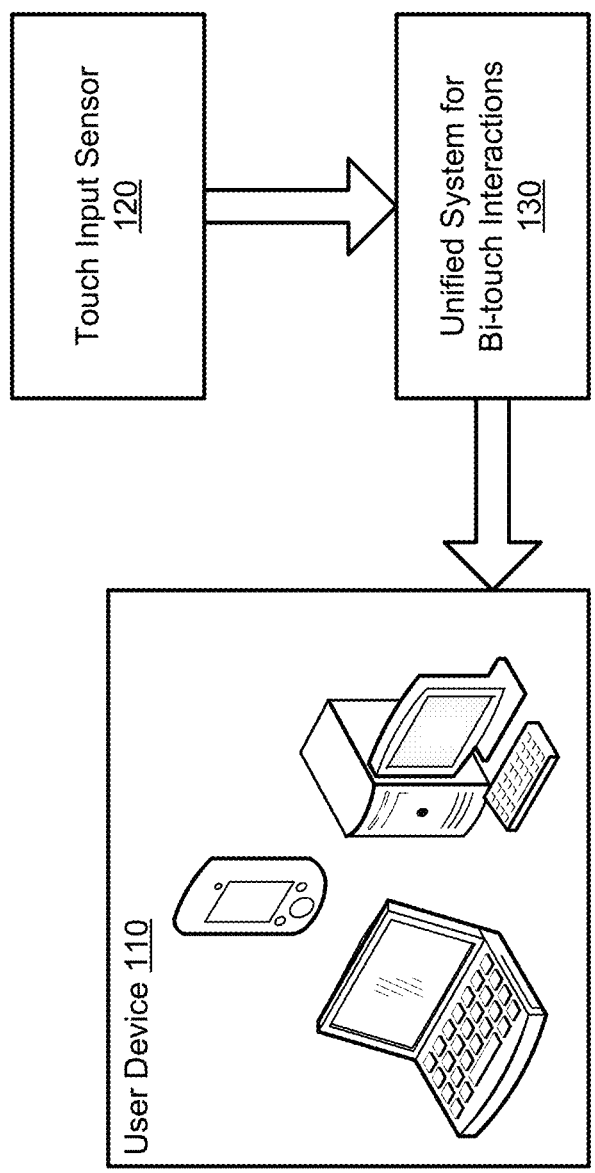
FIG. 1 is a block diagram illustrating an example computing environment enabling thumb+pen interactions.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

To improve the functionality of touch enabled devices for accepting bimanual input in situations where the device is gripped or supported by one of the user's hands, as well as other situations, thumb+pen inputs are described herein. The thumb of an engaging hand is identified and controls are placed within its range of motion to enhance the functionality provided by the free hand (referred to as the pen input). For instance, the actions of the thumb can be used to determine how pen actions made using the other hand are interpreted. In other aspects, the pen can indicate an object through pointing, while the thumb indirectly manipulates one or more of its parameters through touch controls. Marking menus, spring-loaded modes, indirect input, and conventional multi-touch interfaces are applied with respect to the bimanual input mode in which one hand is positioned to hold or support the device, and the other hand is free.

The functionality of the user's device is improved by the present disclosure in at least that an improved user experience is provided that enables the user to manipulate virtual objects displayed on the device with bimanual input while one hand is otherwise engaged in manipulating the physical object of the device. The range of inputs available to the user via the combined thumb of the engaged hand and the input device of (or held by) the free hand are greater than those available to either alone, and thus the efficiency at which the user can manipulate content is improved, and fewer computer resources are expended in effectuating user commands.

FIG. 1 is a block diagram illustrating an example computing environment 100 implementing enabling thumb+pen interactions. The example computing environment 100 includes a user device 110 that includes or is in communication with a touch input sensor 120. The inputs from the touch input sensor 120 are handled by a unified system for bi-touch interactions 130 so that inputs received from a pen and a finger may be handled jointly or separately by applications running on the user device 110 in a variety of circumstances. Although examples are given herein primarily in regard to a thumb and a pen input device, other combinations of appendages and/or pointing devices are envisioned for use with the present disclosure.

The user device 110 is illustrative of a variety of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 27, 28A, 28B, and 29. In various aspects, the computing device 110 is accessible locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

In various aspects, the touch input sensor 120 is integrated into the user device 110 (e.g., as a touch screen of a smart phone or tablet) or a separate device in communication with the user device 110 (e.g., a drawing pad for a desktop computer). Various touch input types are measured (e.g., capacitance, pressure) for use by various applications running on the user device 110 as inputs thereto.

The unified system for bi-touch interactions 130 provides a lightweight and integrated interface that allows the user to efficiently interact with and manipulate content in the user interface. The system is configured to detect a multi-input interaction on the touchscreen and to differentiate whether the user intends to perform a joint interaction, two separate interactions, or a pen+thumb interaction. Generally, the pen+thumb interaction is identified by detection of the user's thumb on the touch input device 120 and a pen input elsewhere on the touch input device 120. Generally, the thumb input is used to select from tools that modify the pen input or the display of a document/application, whereas the pen input authors content or otherwise manipulates content in accord with the thumb input.

Figure 2A:
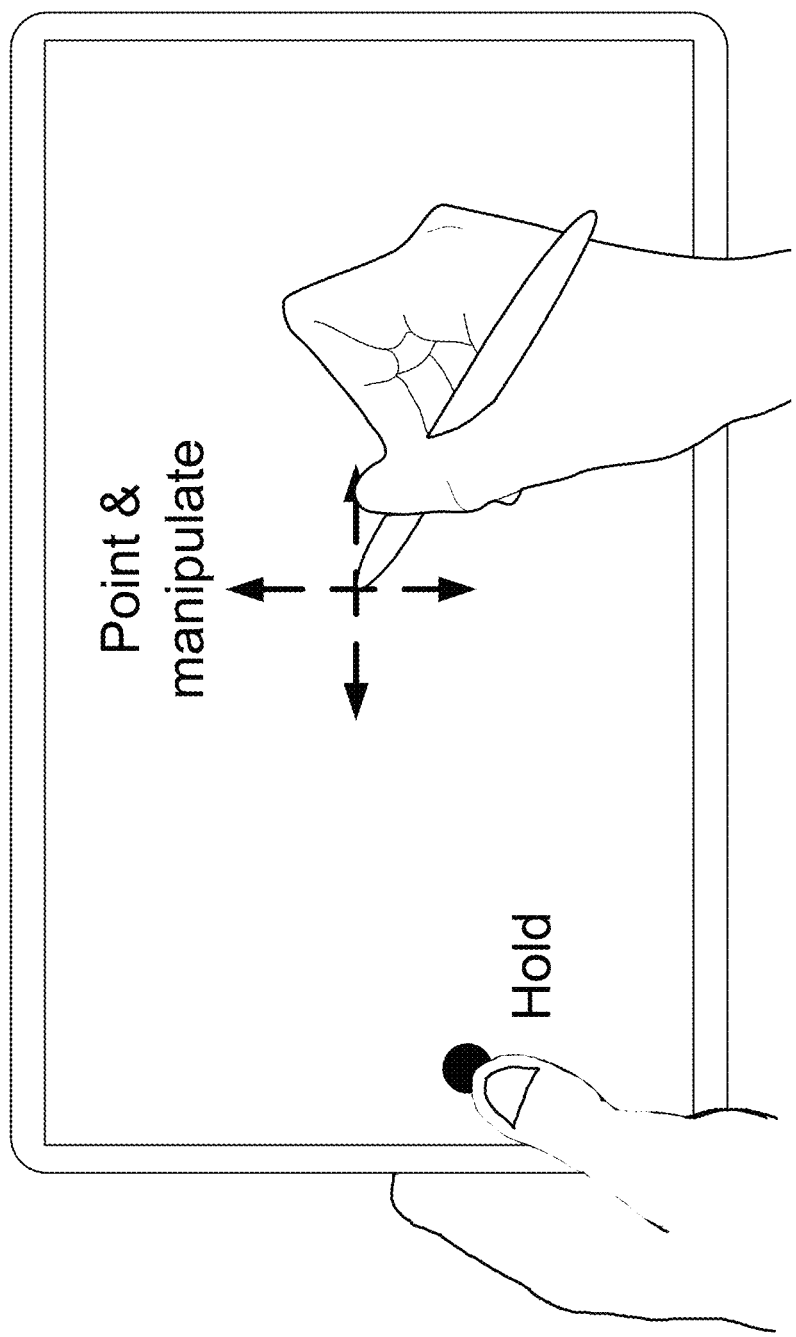
FIGS. 2A-2B are illustrations of example graphical user interfaces that enable thumb+pen interactions.
Figure 2B:
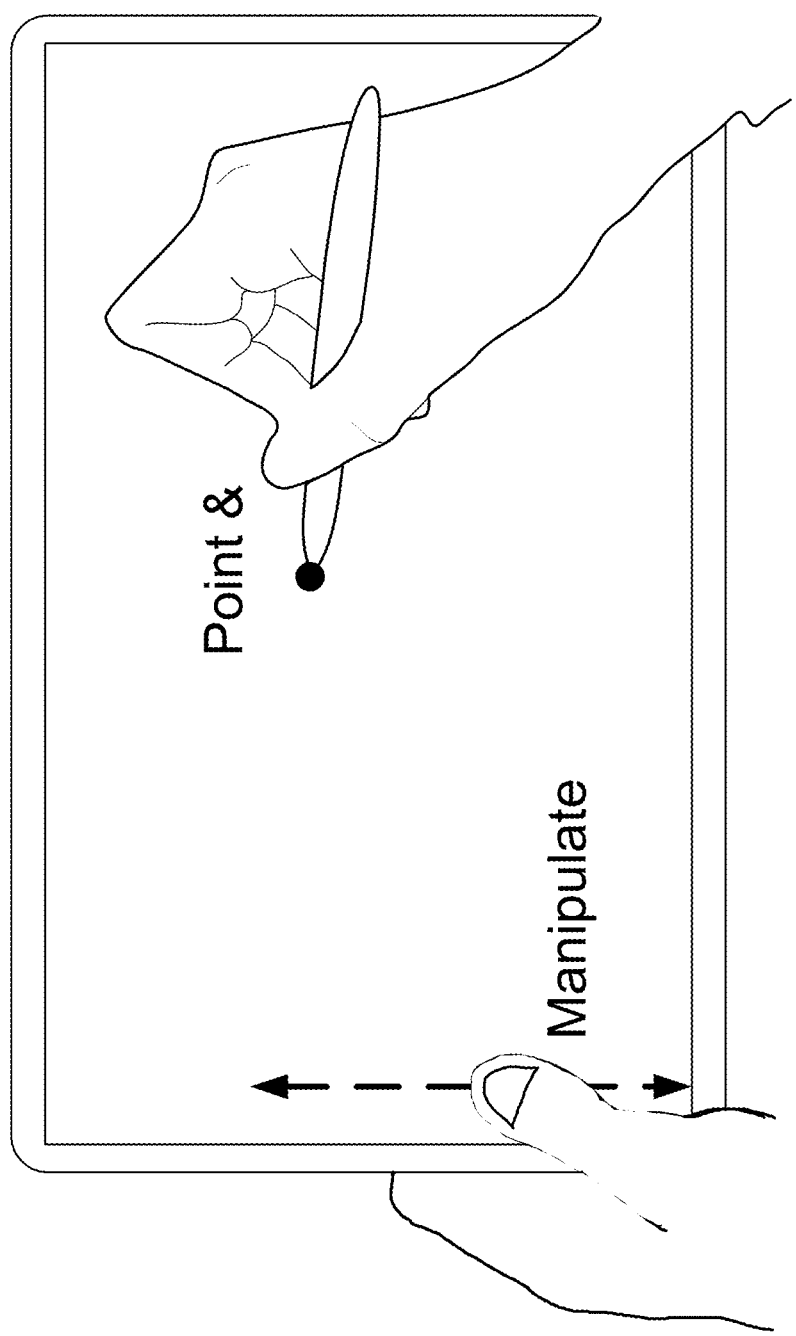
Figure 3A:
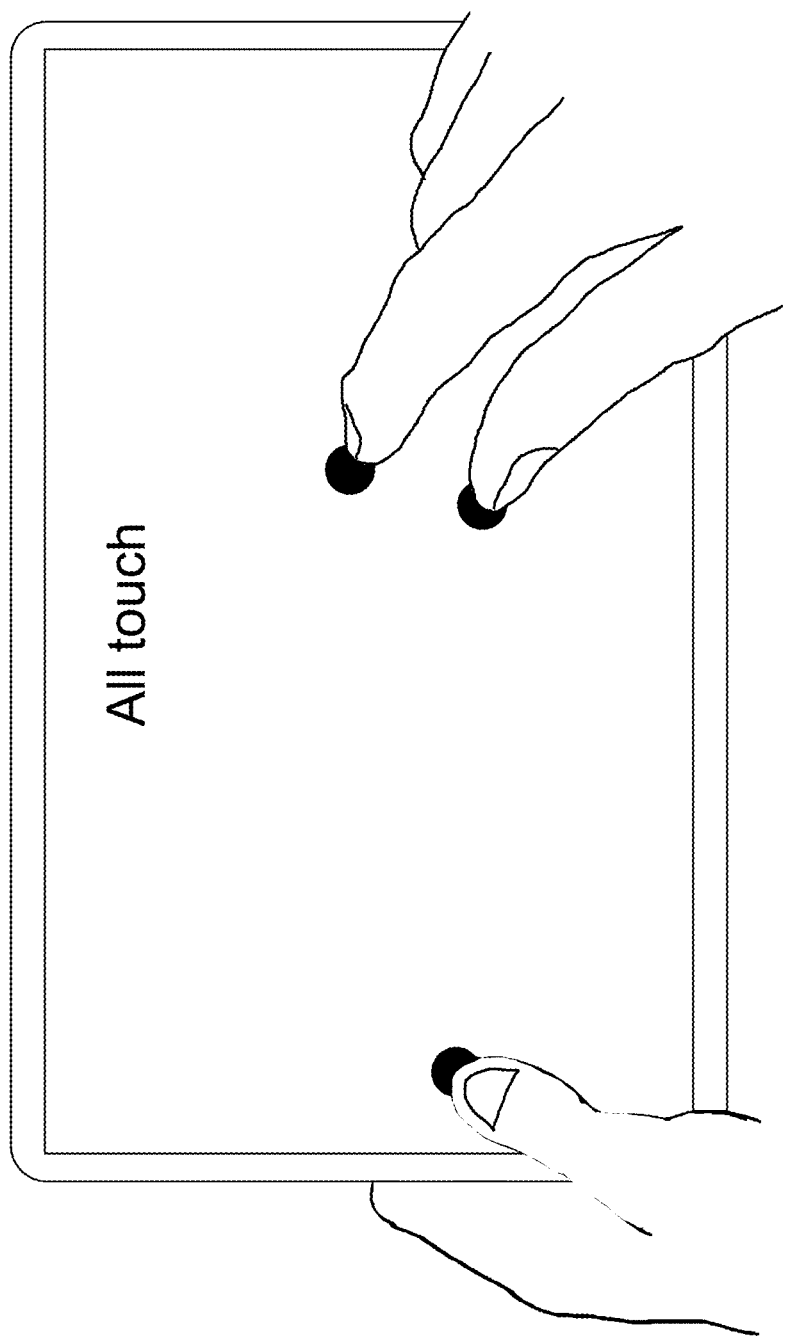
FIGS. 3A-3G are illustrations of example graphical user interfaces that enable thumb+pen interactions.
Figure 3B:
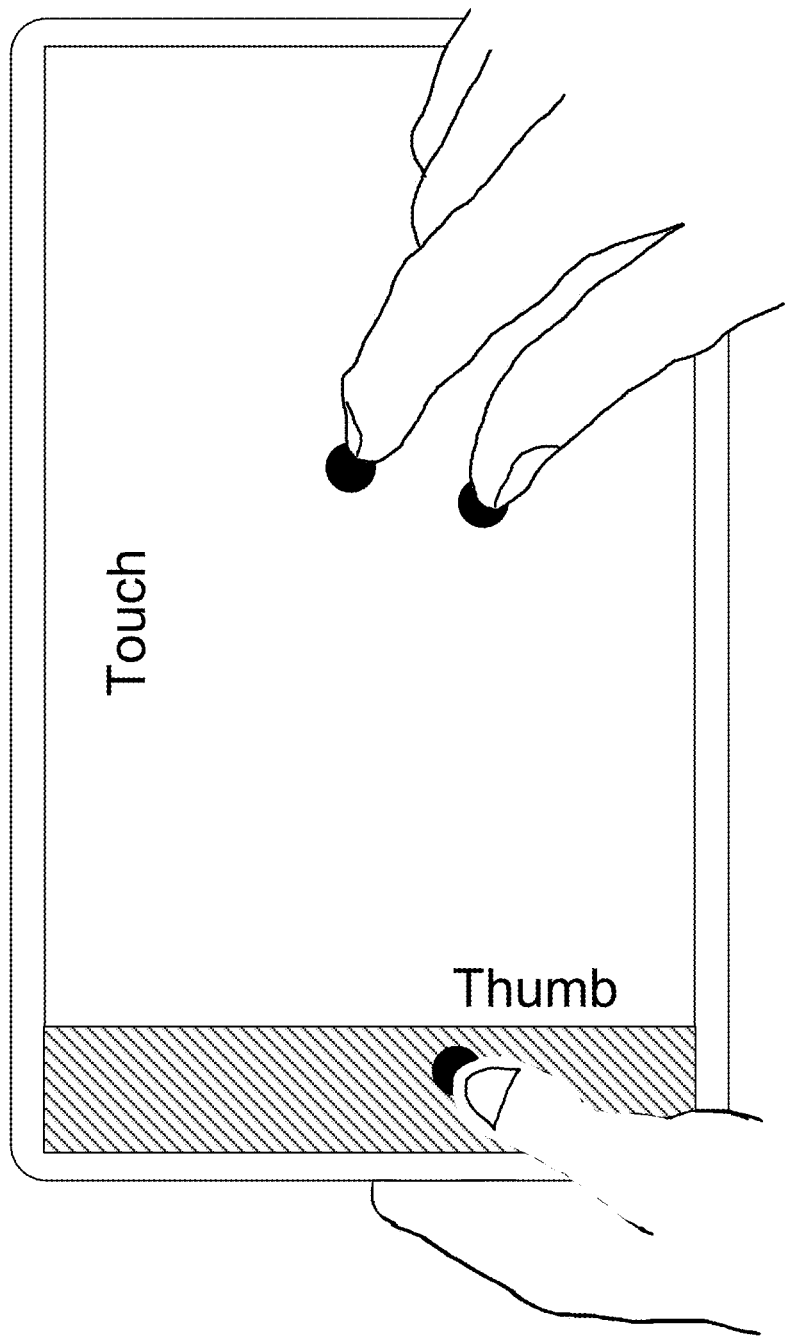
Figure 3C:
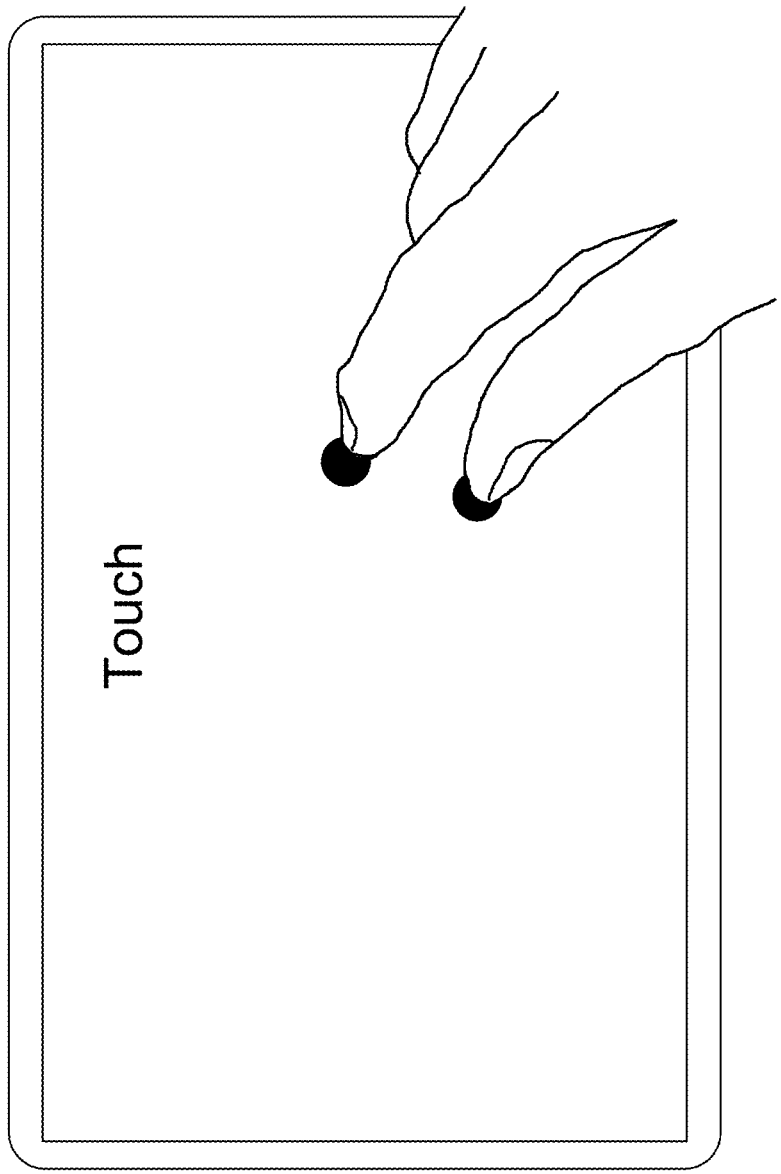
Figure 3D:
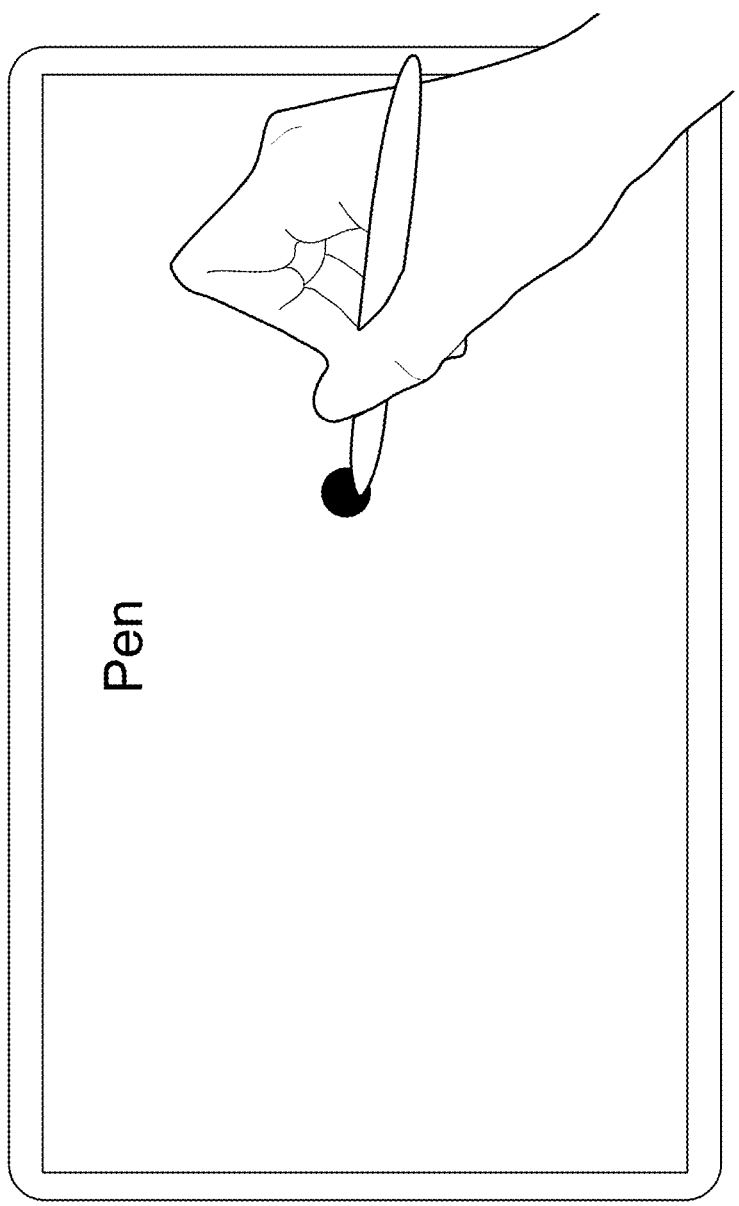
Figure 3E:
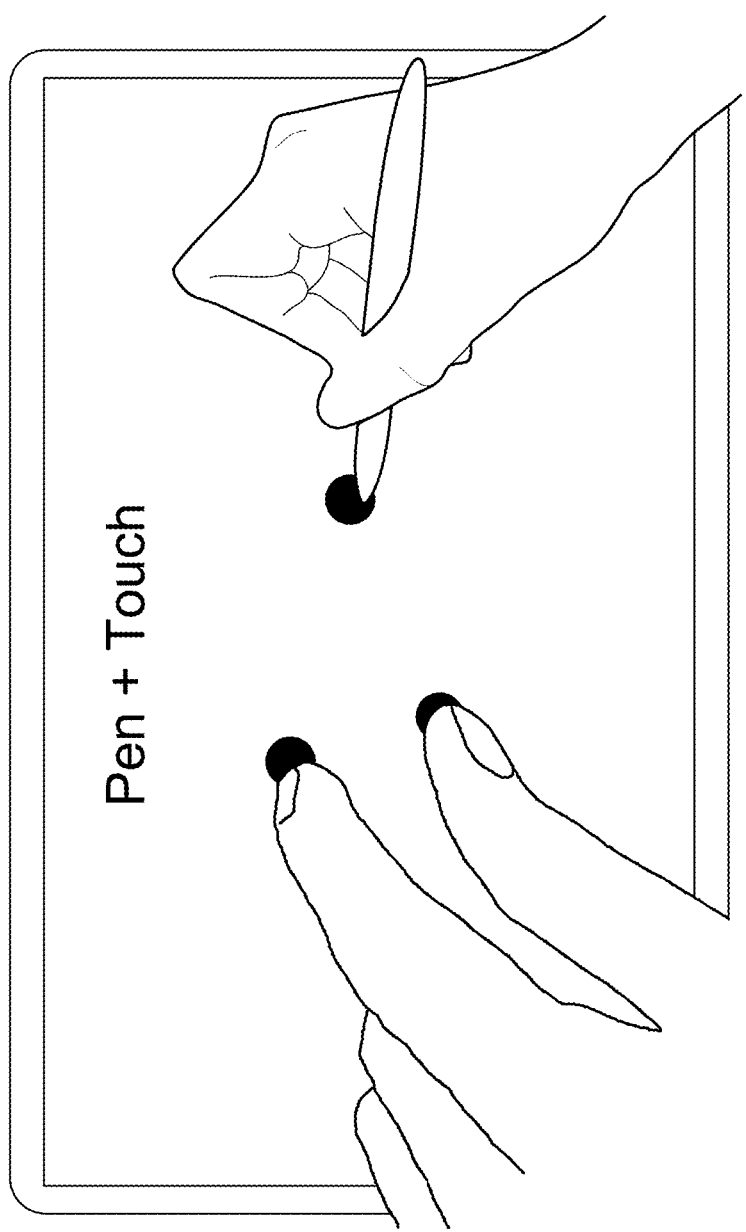
Figure 3F:
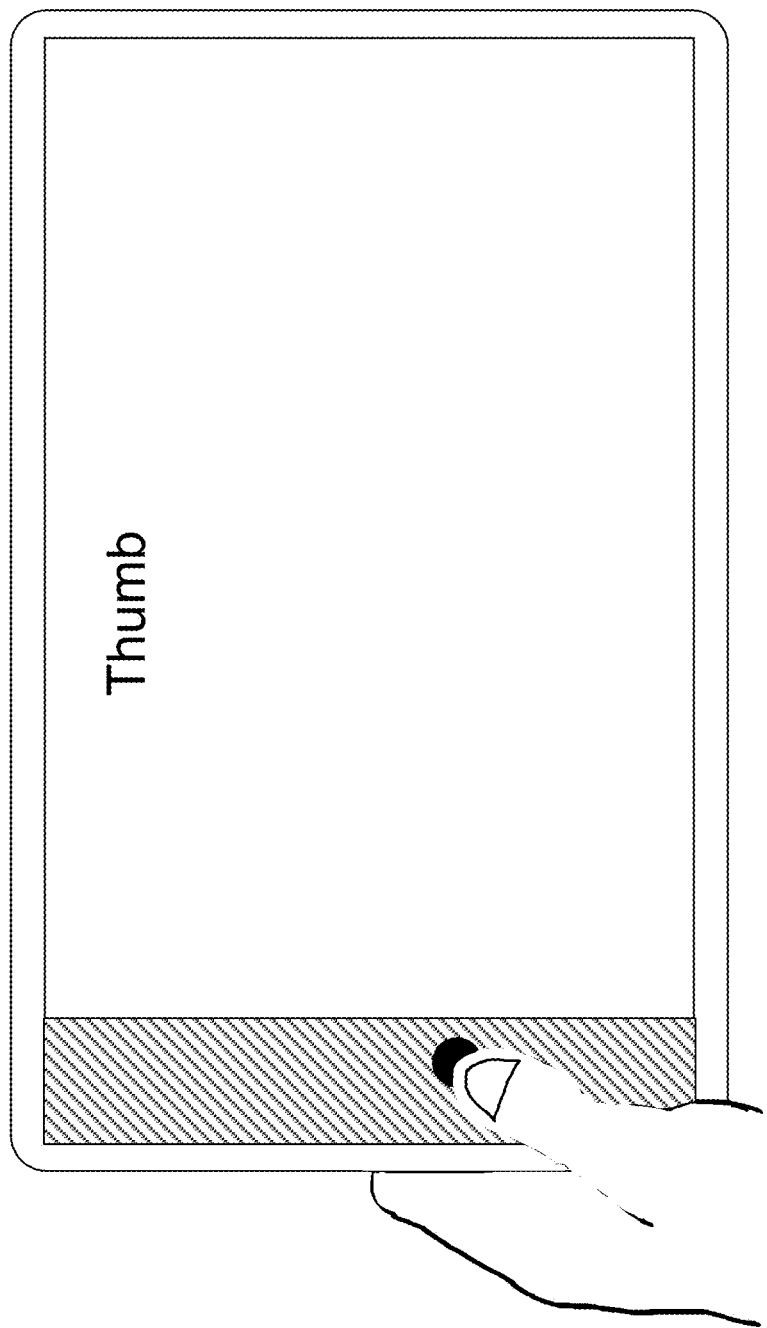
Figure 3G:
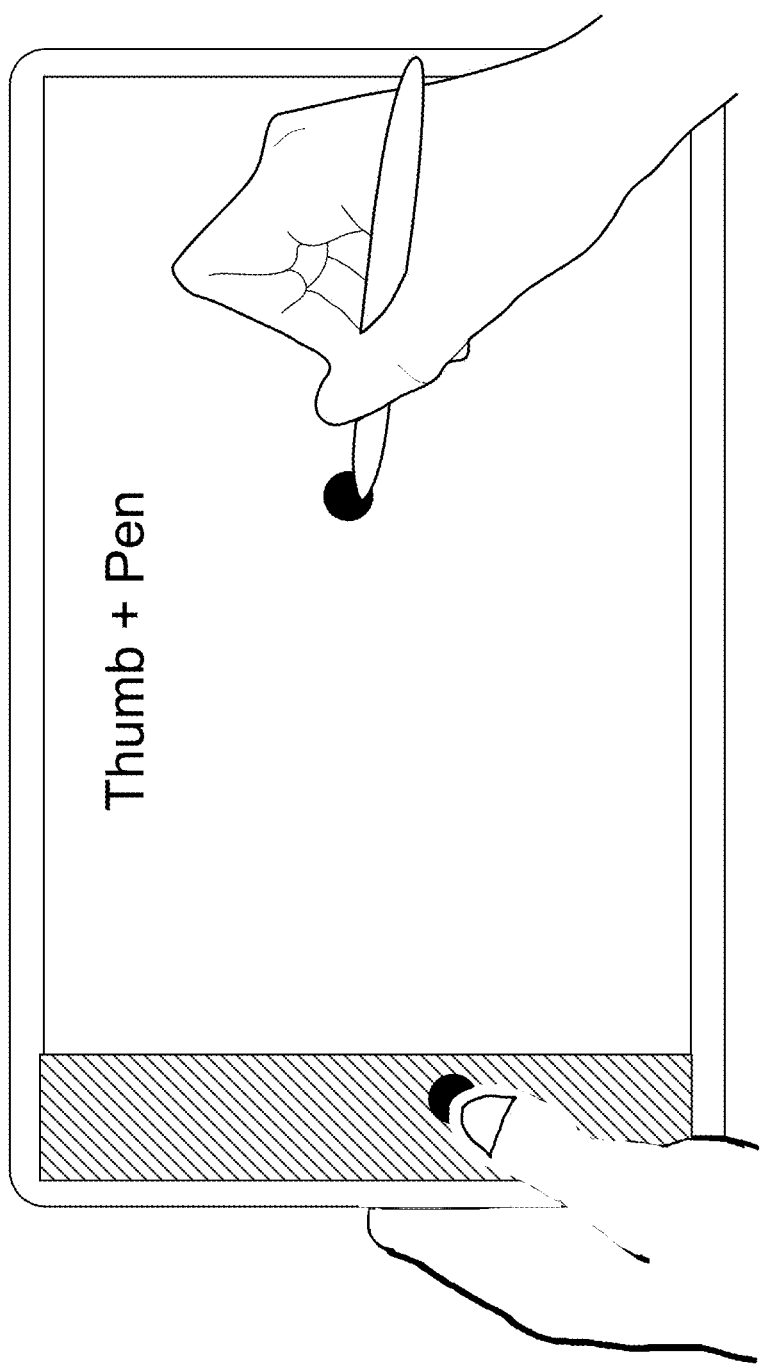

FIGS. 2A-2B are illustrations of example graphical user interfaces that enable thumb+pen interactions. According to one aspect, the thumb+pen interactions a utilized to provide the benefits of simultaneous bimanual pen and touch interactions. In the examples illustrated in FIGS. 2A-2B, the thumb of the non-preferred hand is holding the computing device and interacting with the touch screen. More specifically, the thumb interacts with the touchscreen in an indirect manner, which complements the direct input provided by the preferred hand. The technique allows users to directly write, draw, and point with the stylus, or perform standard multi-touch gestures such as pinch-to-zoom, panning, or dragging, all with the preferred hand, while the thumb of the non-preferred provides spatially distinct touch input that holds down spring-loaded modes, manipulates parameters, or switches to different tools. Further, other techniques may be utilized for the thumb+pen interactions. In one example, in FIG. 2A, the thumb of the non-preferred hand is holding a spring-loaded mode, while the preferred hand utilizes a pen to point and manipulate the main canvas. In another example, FIG. 2B illustrates that the roles may be reversed, namely that the preferred hand hovers over the target and the thumb of the non-preferred hand manipulates the pen target.

FIGS. 3A-3G are illustrations of example graphical user interfaces that enable thumb+pen interactions. According to one aspect, combinations of the thumb+pen interactions may enhance interaction with two modalities. In other words, the thumb+pen interactions overcome the limited reach of the thumb and concurrent use of the modalities. Moreover, spatial moding allows input to be distinguished based on whether the preferred/non-preferred hand is used. Consequently, the inputs may generally be characterized by whether the input is thumb only interactions or thumb+pen interactions. Examples of the types of inputs and examples of the input modes are illustrated in FIGS. 3A-3G.

Figure 4:
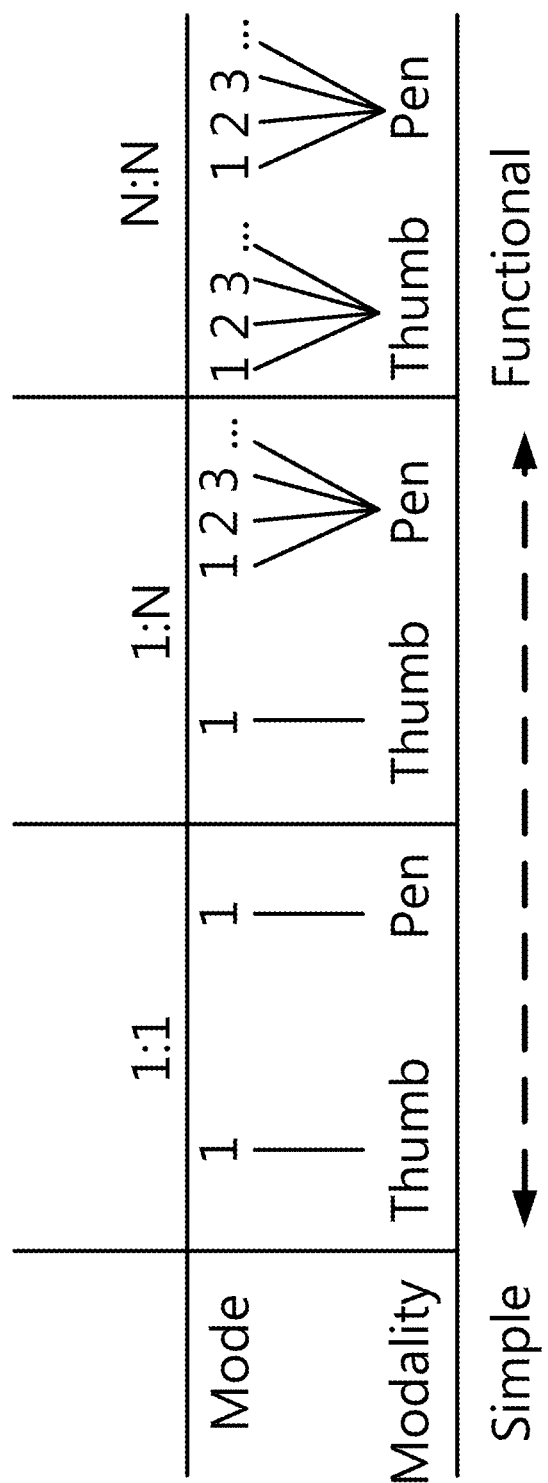
FIG. 4 is an illustration of example diagram illustrating various modes associated with thumb+pen interactions.

FIG. 4 is an illustration of example diagram illustrating various modes associated with thumb+pen interactions. More specifically, for each pen/thumb modality, applications can offer a single default mode, or multiple persistent modes to the user. The simplest of the modes provides an interface with a 1:1 pen/thumb mapping. In another example, the interface is configured to provide a 1:N pen/thumb mapping, which provides a default mapping (e.g., pan and zoom) for the thumb while provide various modes (e.g., color, size, tool, etc.) for the pen. In yet another example, the interface is configured to provide more functionalities to two hands (N:N mapping) that provides simultaneous control of multiple dimensions.

FIGS. 5A-5B are illustrations of example graphical user interfaces that enable thumb+pen interactions. More particularly, FIG. 5A depicts aspects of providing thumb marking menus. As illustrated, the use of the thumb marking menus allows better utilization of the limited reach of the user's thumb to provide additional operations to the user. Further, FIG. 5B depicts aspects of providing pen marking menus. The pen marking menus are useful to facilitate frequent mode switching activities (e.g., color, pen tool, stroke width, etc.).

Figure 6A:
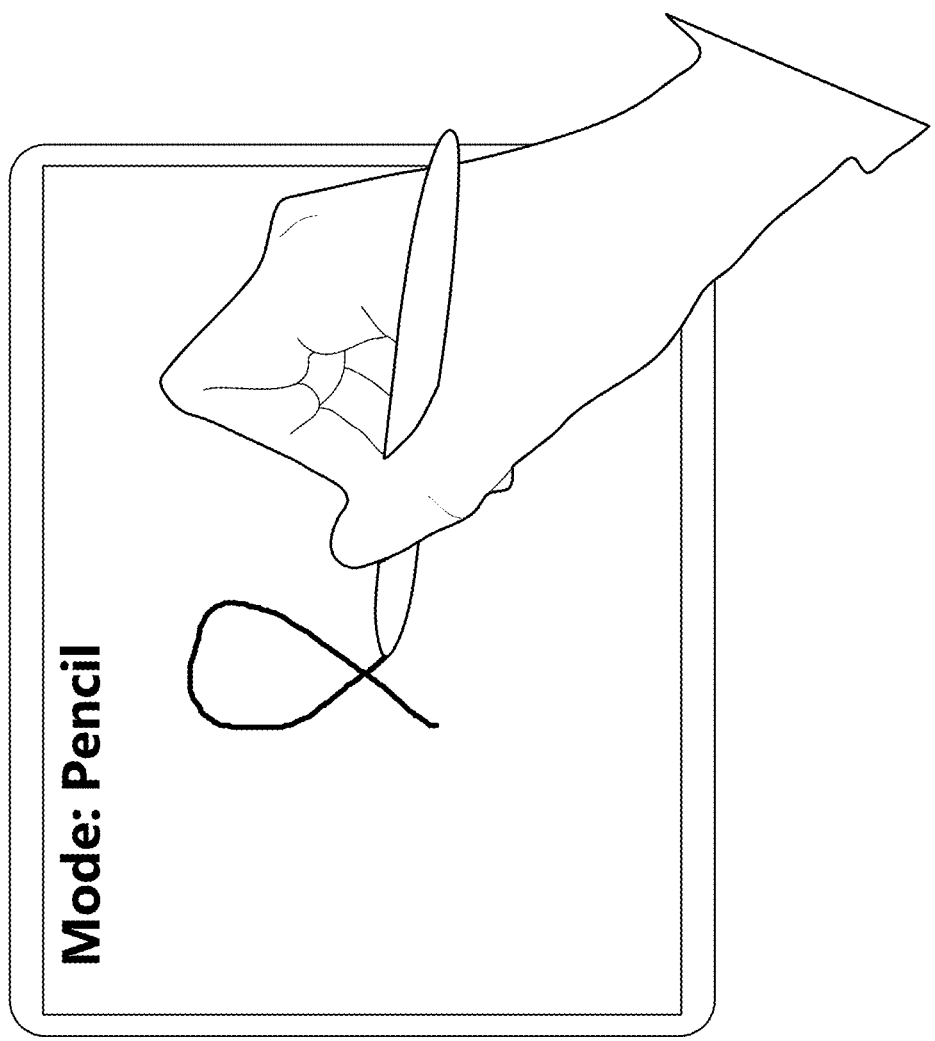

FIGS. 6A-6B are illustrations of example graphical user interfaces that enable thumb+pen interactions. According to one aspect, the graphical user interface utilizes spring-loaded modes in order to enable mode-switching. For example, the user may hold a spring-loaded mode control with the thumb while interacting using the preferred hand's pen. In FIG. 6A, the graphical user interface illustrates that the default mode is pencil/inking. However, spring-loaded modes can provide users with additional functionality without altering the defaults mode. For example, as illustrated in FIG. 6B, the thumb of the non-preferred hand is holding a spring-loaded mode control, while the preferred hand utilizes a pen to copy a selected object within the main canvas.

Figure 7A:
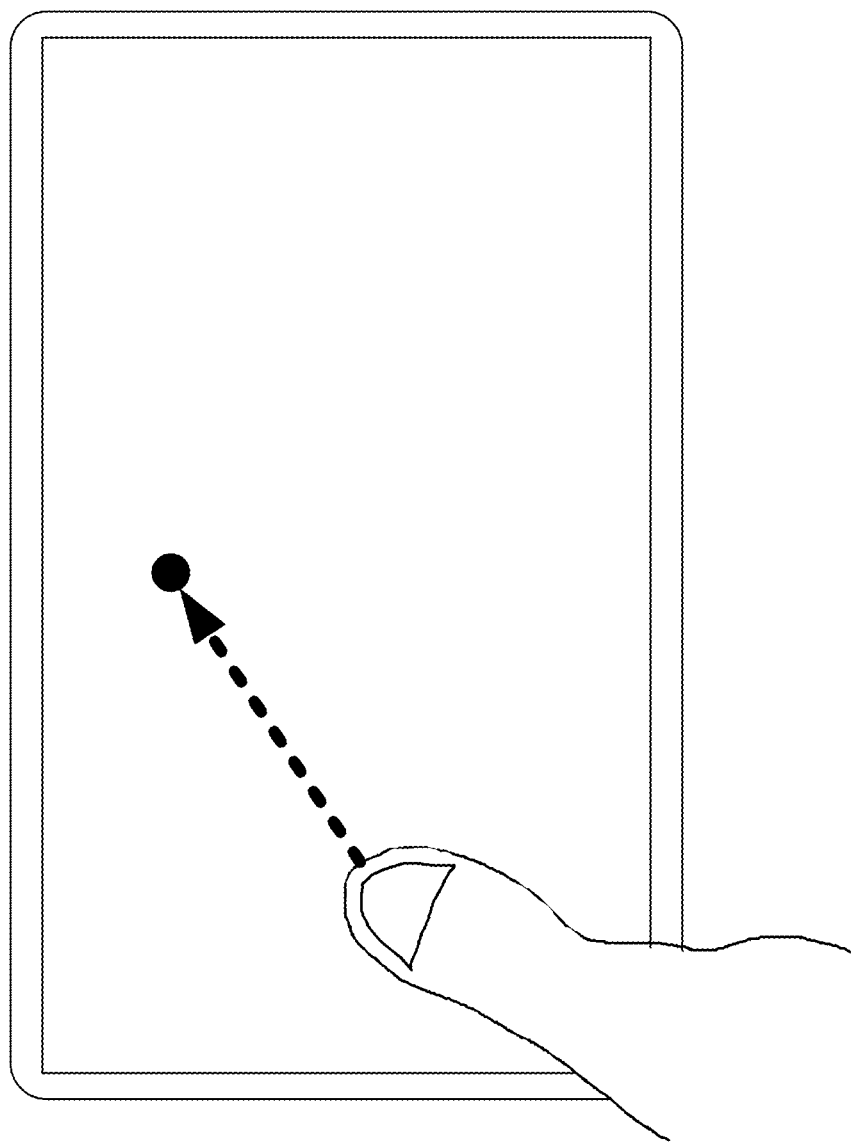
FIGS. 7A-7B are illustrations of example graphical user interfaces that enable thumb+pen interactions.
Figure 7B:
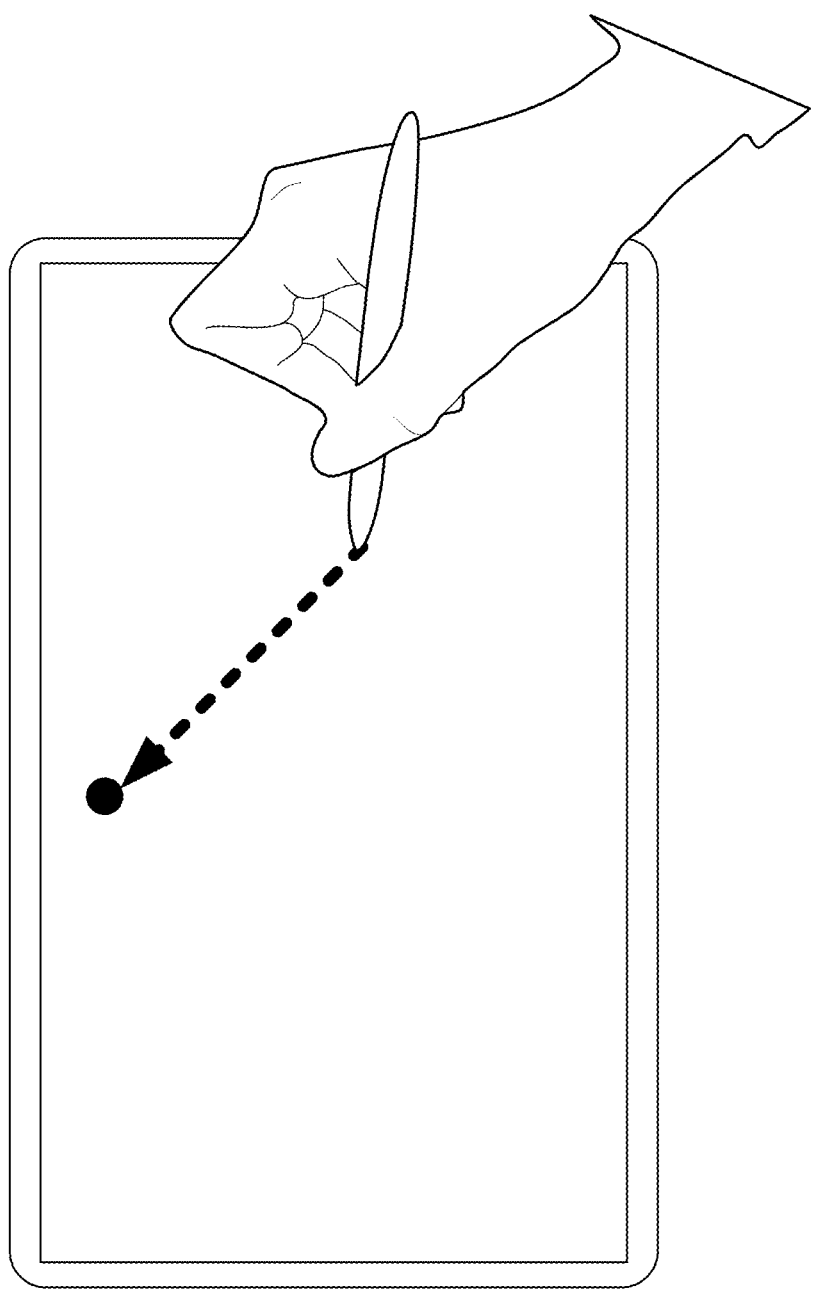

FIGS. 7A-7B are illustrations of example graphical user interfaces that enable thumb+pen interactions. The illustrated user interfaces depict indirect input for thumb and pen modalities. More specifically, each pen/thumb modality can be made indirect through, for example, relative cursor control, which is operable to extend the thumb's reach with indirect input.

FIG. 8 is an illustration of example graphical user interface that enables thumb+pen interactions. More particularly, FIG. 8 illustrates the combination of a marking menu and spring-loaded mode. Conventionally, the spring-loaded modes are often based on single buttons and do not support more than one. By combining spring-loaded modes with marking menus, users are enabled to employ multiple spring-loaded modes without additional user interface allocation. More specifically, when the user holds the button, the user interface provides the spring-loaded functionality. Alternatively, when the user performs a drag motion, the user interface accesses a marking menu that allows the user to change the spring-loaded mode.

Figure 9A:
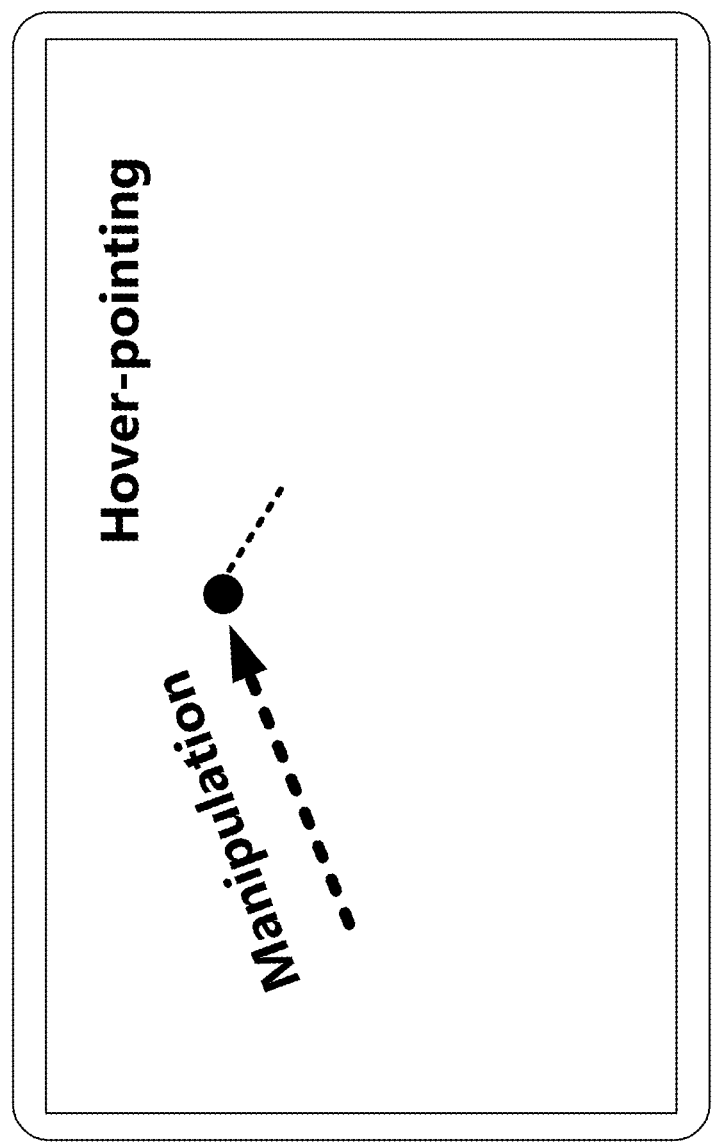
FIGS. 9A-9B are illustrations of example graphical user interfaces that enable thumb+pen interactions.
Figure 9B:
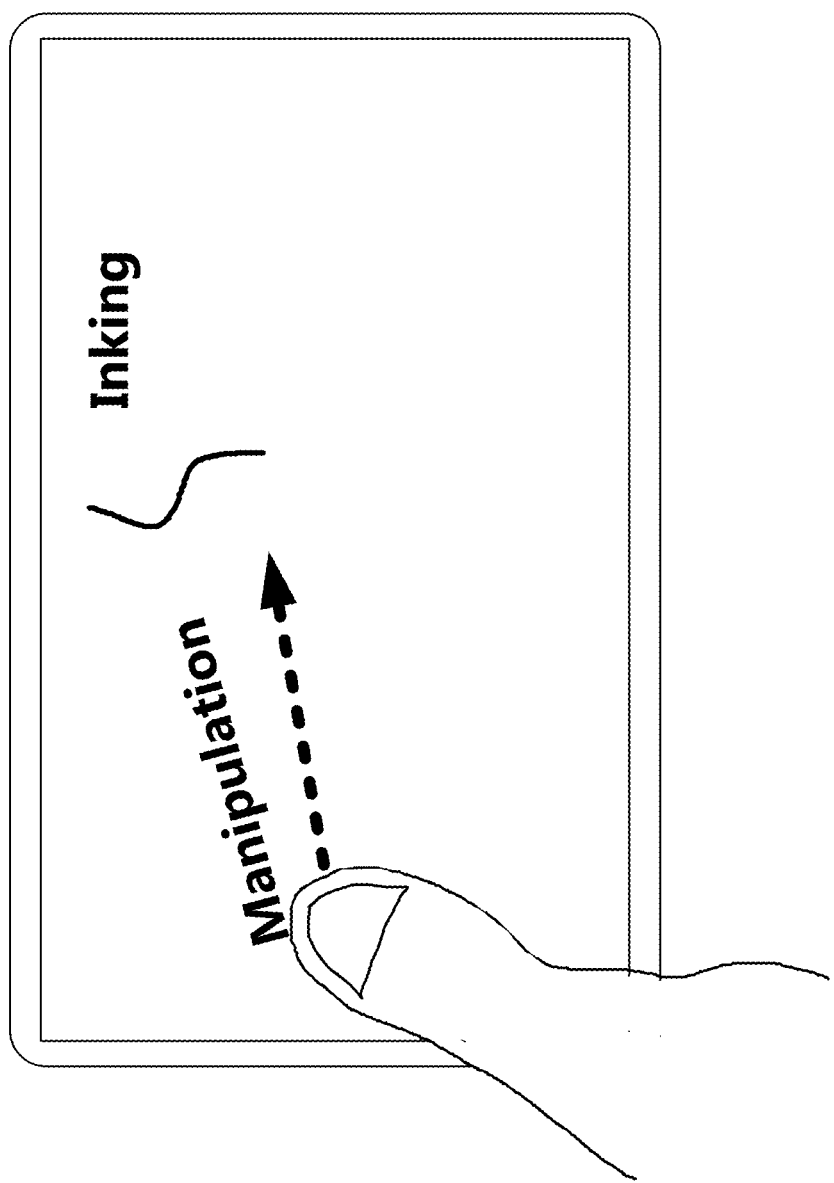
Figure 11A:
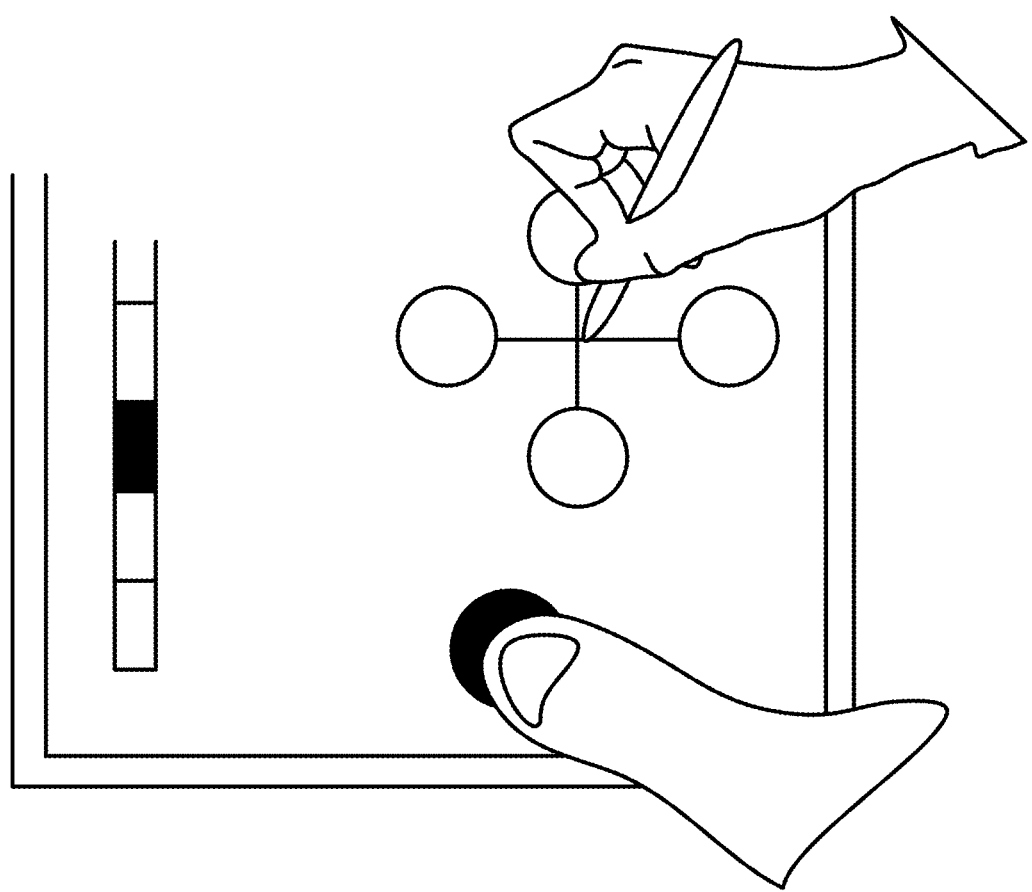
FIGS. 11A-11D are illustrations of example graphical user interfaces that enable thumb+pen interactions.
Figure 11B:
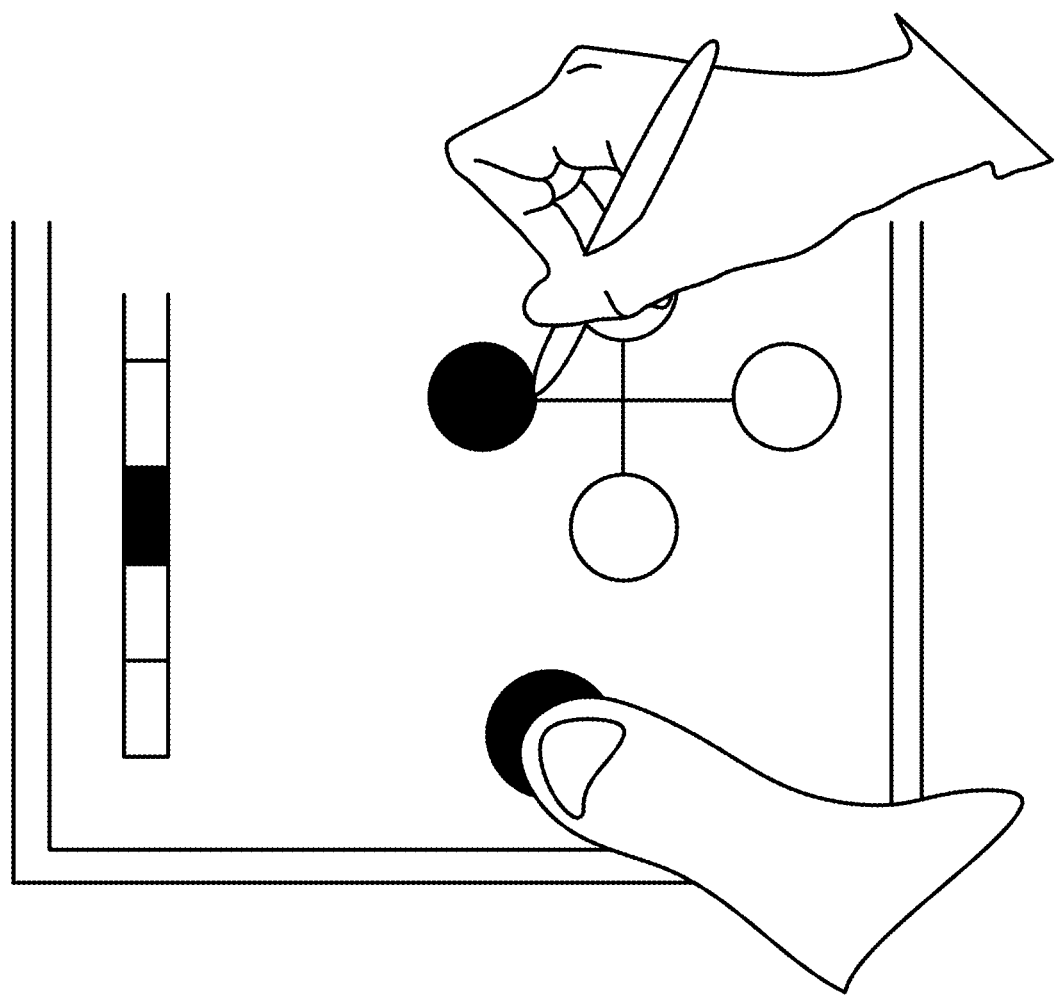
Figure 11C:
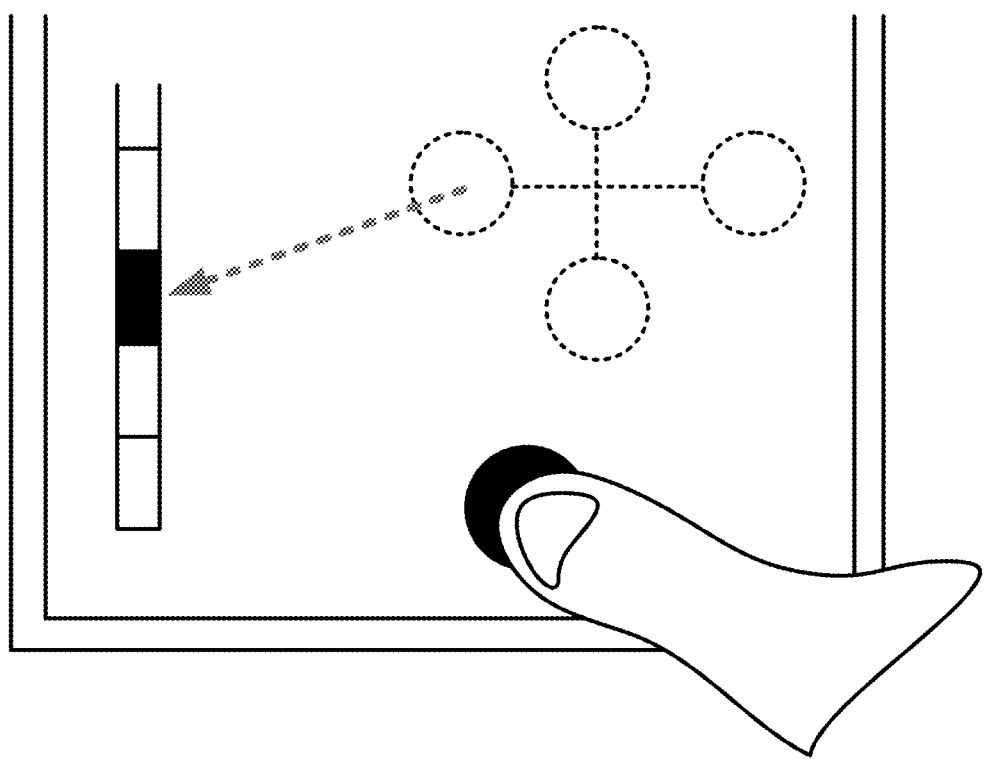
Figure 11D:
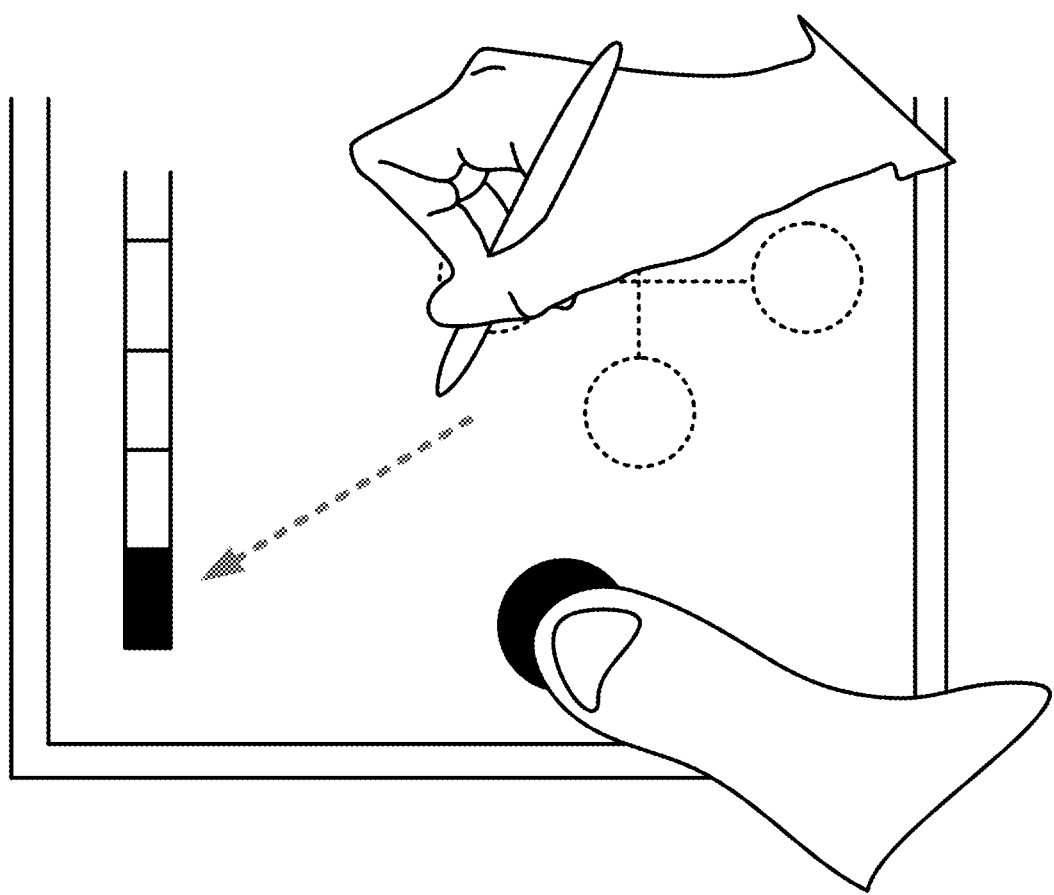

FIGS. 9A-9B are illustrations of example graphical user interfaces that enable thumb+pen interactions. More specifically, the illustrated user interface provides a representation of bimanual indirect thumb and direct pen input. According to one aspect, when the pen and thumb are considered together, the user is able to utilize a technique where touches redirect to the pen's position. In one example, the non-preferred hand's input affects the target of the preferred hand by hybrid/indirect interaction. Users are able to precisely select the object with direct pen input, while the thumb performs flexible and spatial manipulations on the selected object. Alternatively, the users may employ their thumb indirectly and the pen directly, for concurrent two-mode manipulation FIGS. 10A-10B are illustrations of example graphical user interfaces that enable thumb+pen interactions. More specifically, the illustrated user interface depicts a thumb marking menu with an indirect slider. In the illustrated example, the first-level marking menu appears directly at the thumb's position. The displayed menu items allow the user indirect input, such that when the user slides over it, a handle appears that stretches from the thumb's direct position to a remote position in a pop-up menu. Furthermore, the user is enabled to drag a thumb across the menu items so that a handle that controls a cursor on the menu moves until the current selection is confirmed.

FIGS. 11A-11D are illustrations of example graphical user interfaces that enable thumb+pen interactions. More specifically, the illustrated user interface depicts the pen marking menu extended with an indirect menu. The pen marking menu is displayed at the pen's position when the user holds the thumb input at the same time. According to one aspect, the user interface provides an indirect handle to a different user interface element on the screen. Further, the indirect pen input is used to change the new element's persistent mode. This technique enables mapping of any UI element to a radial option, which is beneficial to eliminate reaching out to remote items.

Figure 12B:
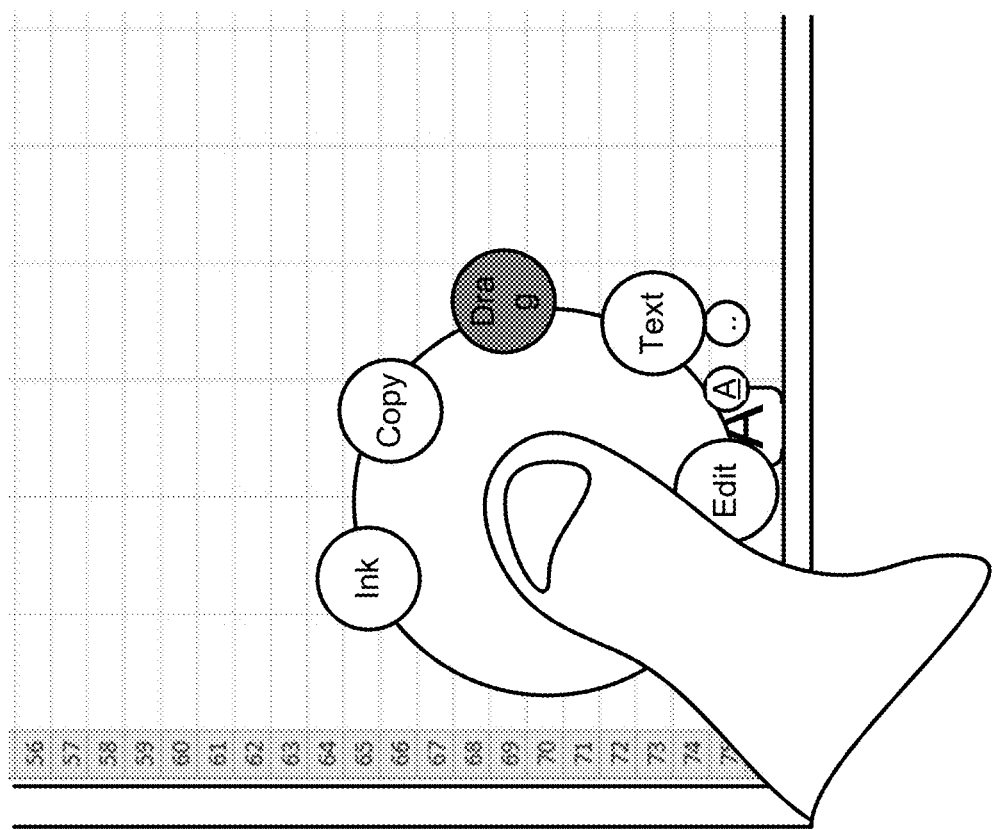
Figure 12C:
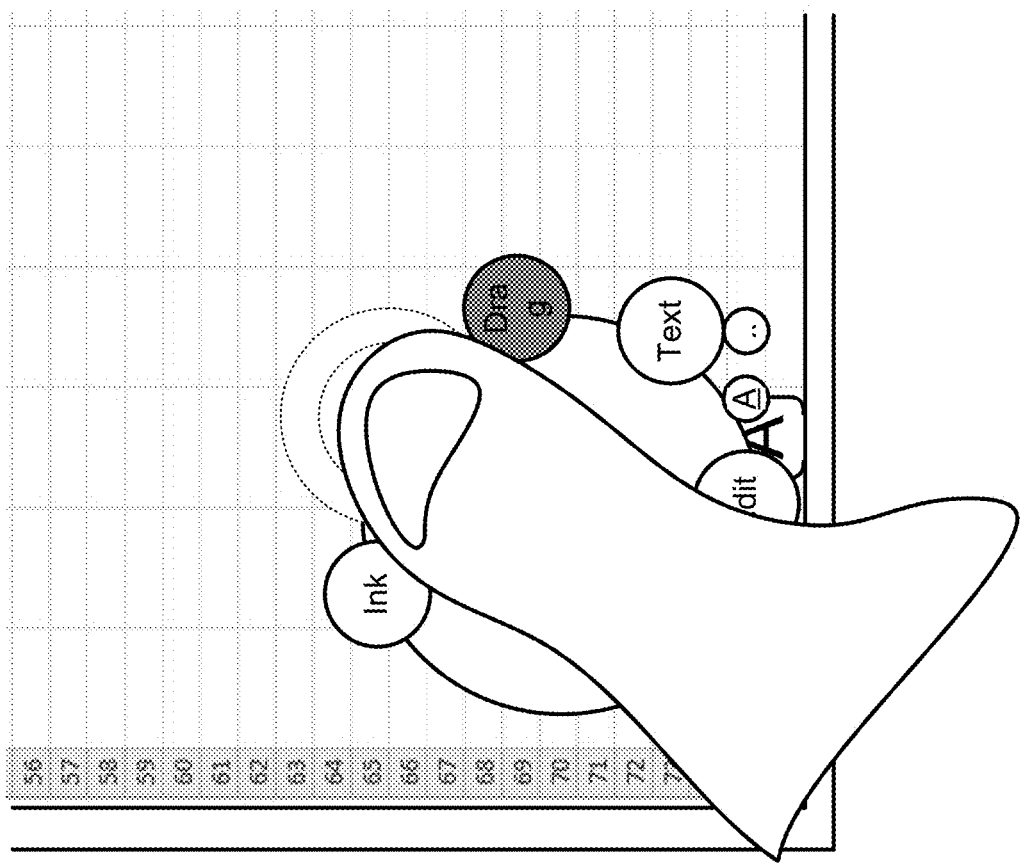

FIGS. 12A-12C are illustrations of example graphical user interfaces that enable thumb+pen interactions. According to one aspect the pen tools widget is displayed in a spring-loaded mode. The items within the spring-loaded mode items list include options for ink, copy, drag, text and edit modes. However, it should be recognized that the pen tools widget provides various different tools that users can configure through the marking-menu functionality.

Figure 13A:
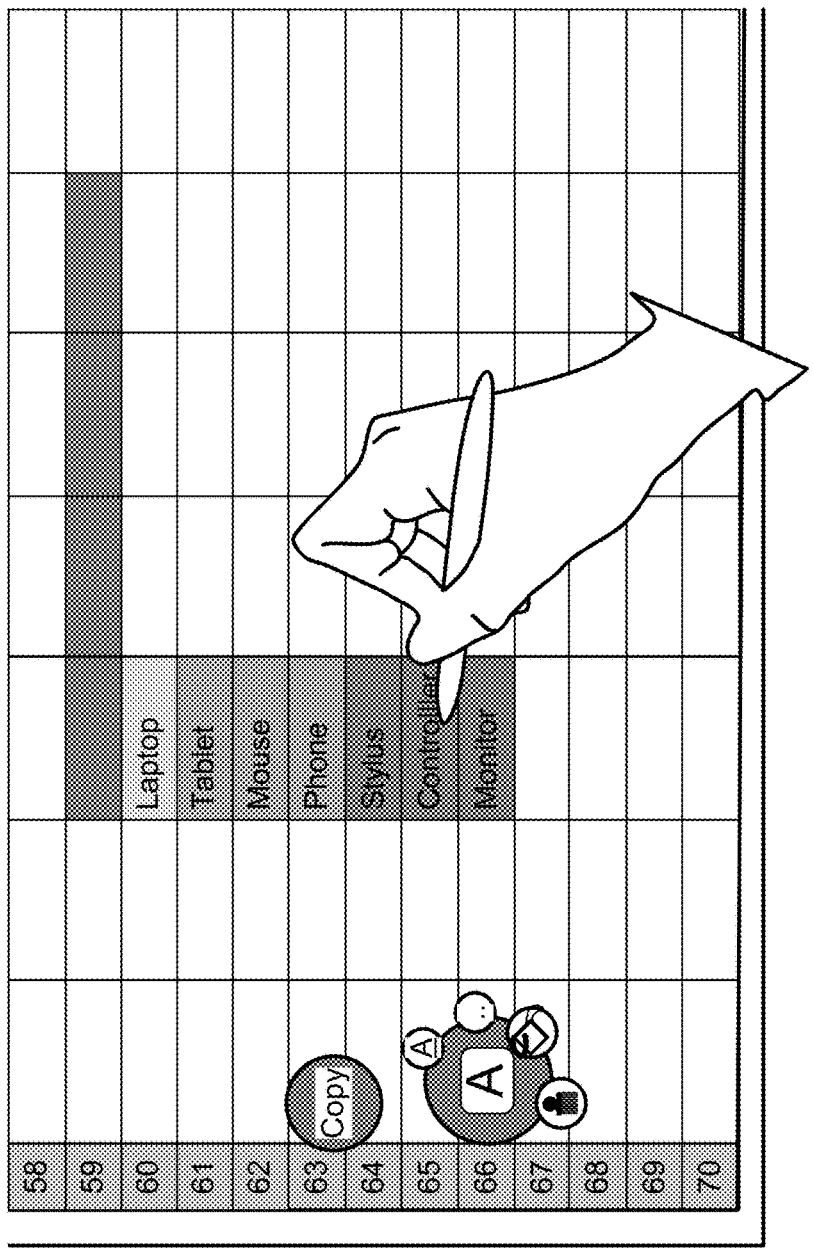
FIGS. 13A-13D are illustrations of example graphical user interfaces that enable thumb+pen interactions.
Figure 13B:
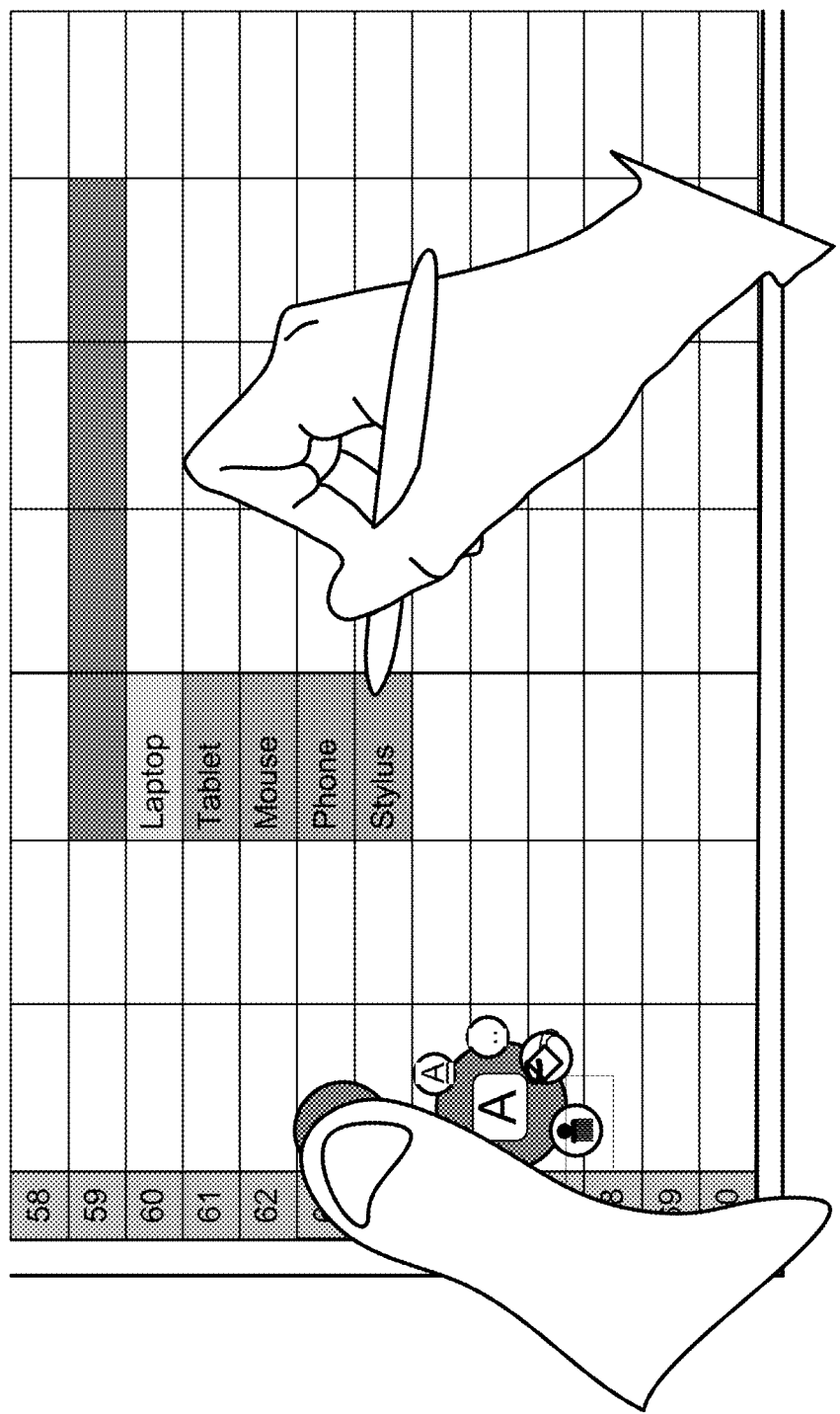
Figure 13C:
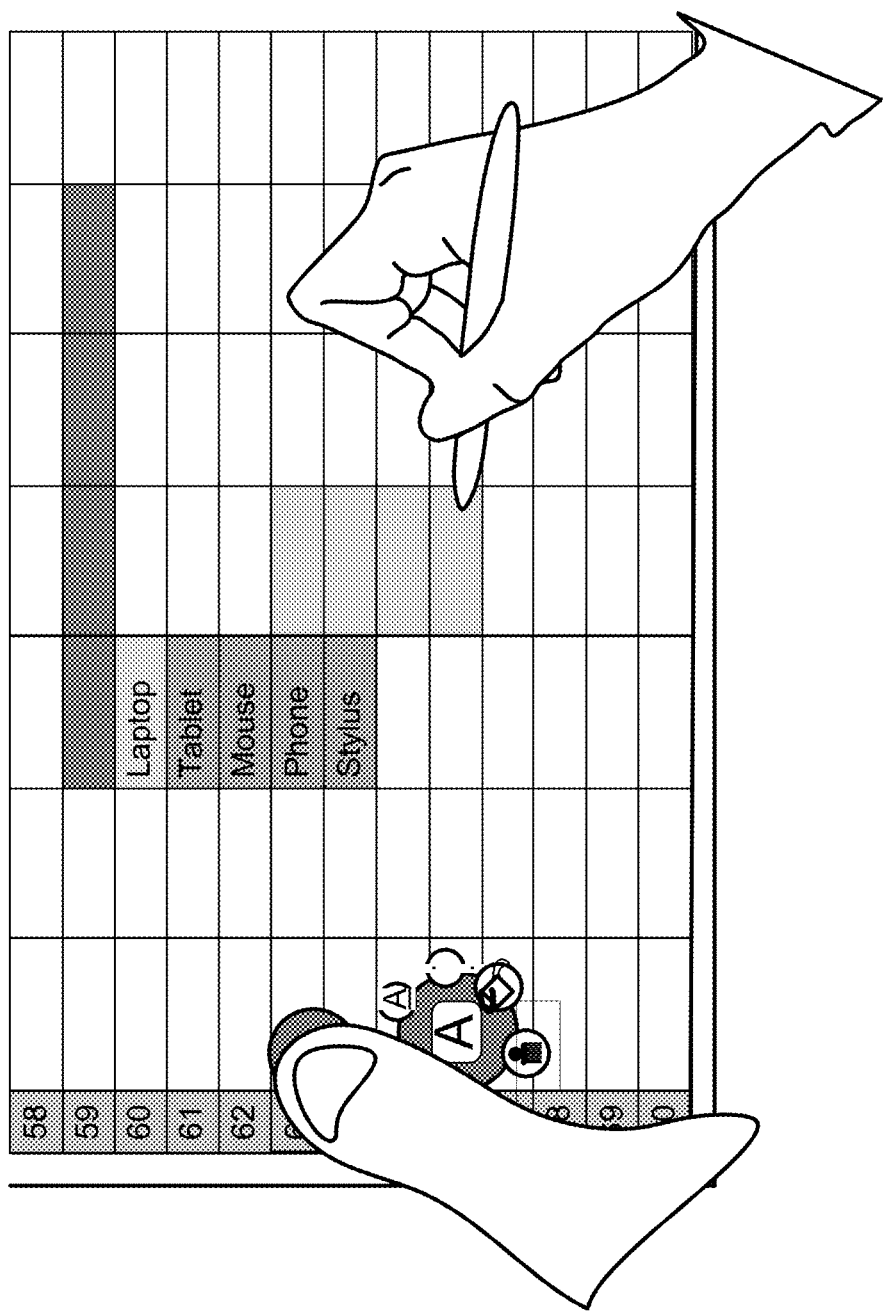
Figure 13D:
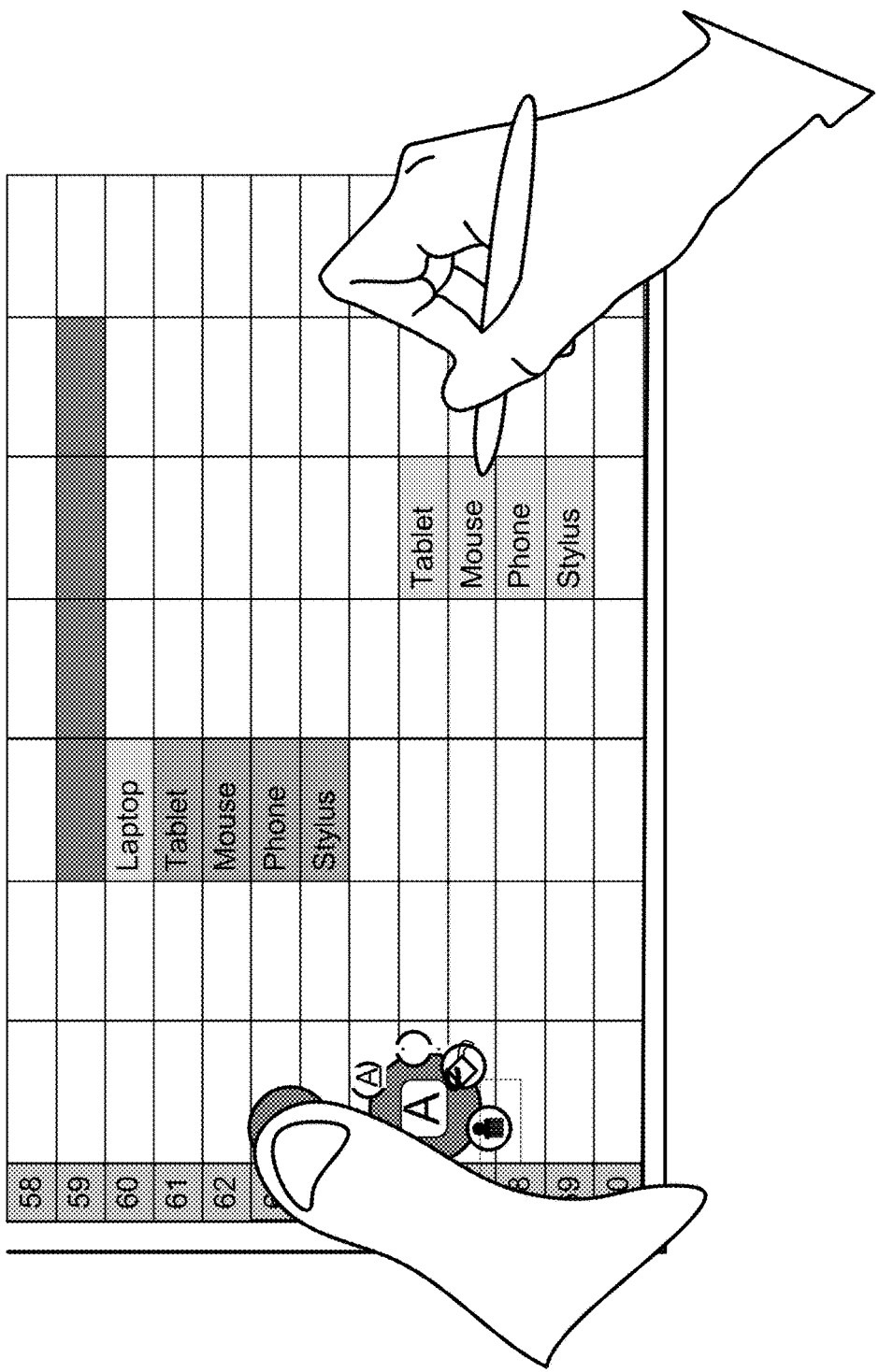

FIGS. 13A-13D are illustrations of example graphical user interfaces that enable thumb+pen interactions. According to one aspect, the graphical user interfaces provide a copy mode, a paste mode, and a drag mode. The copy and paste (or drag and drop) helps to create, combine, and manage cell data. In the illustrated example, the user selected cells with the pen. After the cells have been selected (FIG. 13A), the user selects copy from the widget (FIG. 13B), the user selects a location to paste the selected cells (FIG. 13C), and pastes with the pen (FIG. 13D). In one example, the functionality may be performed in two strokes comprising a first stroke to select cells, thumb tap to copy, a second stroke to paste cells. In another example, the functionality may be performed in one stroke, including pen down to select cells, thumb tap to copy, pen move and lift up to paste. Each of these methods may be beneficial based on the circumstances. For example, the 1-stroke method is particularly useful when multiple short copying/dragging operations are required. However, the 2-stroke method is useful when other operations, such as navigation are required.

FIG. 14 is an illustration of example graphical user interface that enables thumb+pen interactions. More particularly, the illustrated user interface provides functionality to enter an ink mode. According to one aspect, the ink annotations are only displayed when the user configures the widget's mode to ink. In one example, the ink is context-aware to the cells. In another example, the ink binds to the selected cells and annotations display when the user selects the corresponding cells. The benefit of this functionality is that it brings together two conflicting default pen modes in spreadsheets, namely for selecting cells or to inking the cells.

Figure 15:
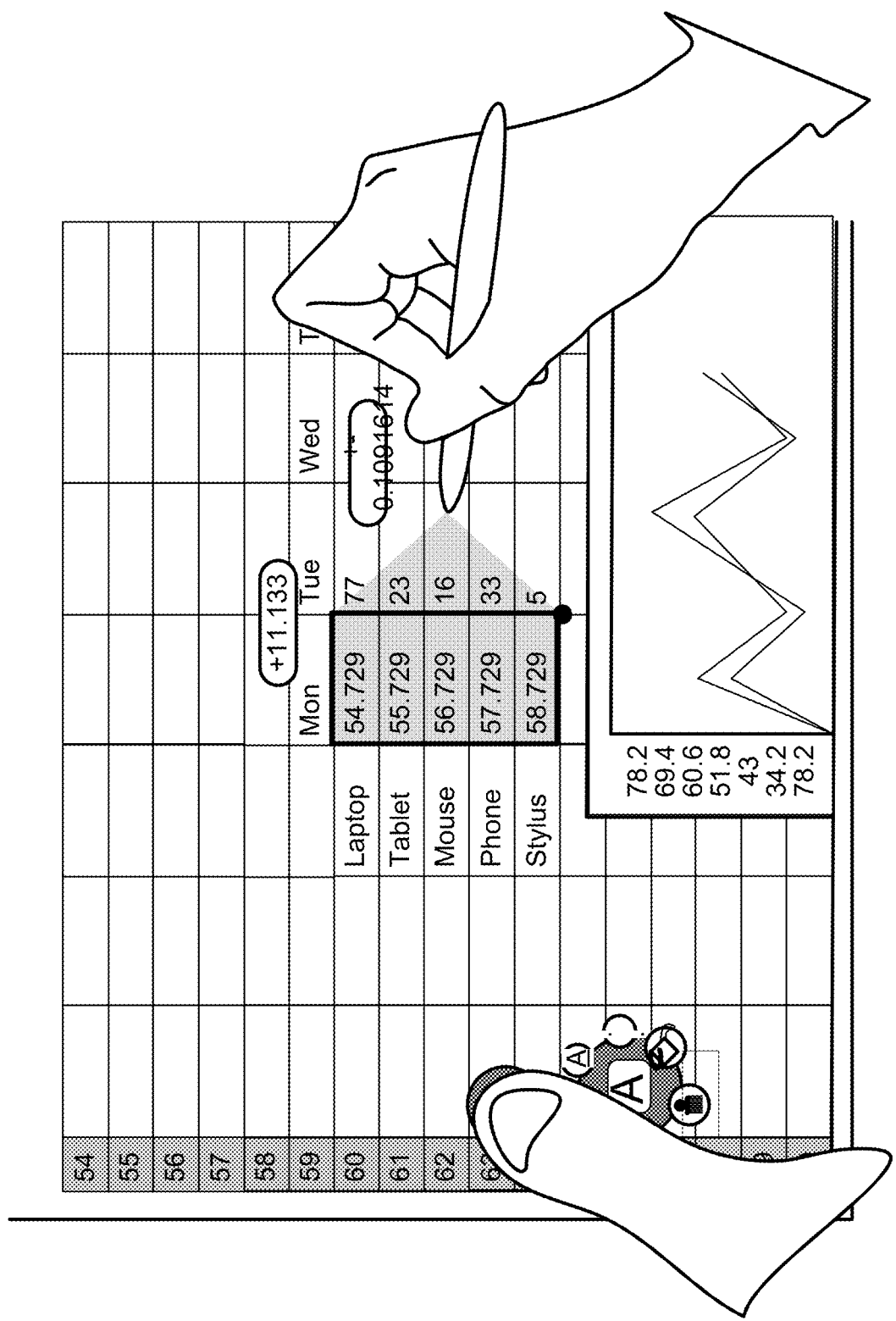
FIG. 15 is an illustration of example graphical user interface that enables thumb+pen interactions.

FIG. 15 is an illustration of example graphical user interface that enables thumb+pen interactions. More particularly, the illustrated user interface provides functionality to perform cell editing. According to one aspect, the cell editing mode permits the user to utilize a pen for manipulation of numeric data. The value of the currently selected cells is increased in response to a pen up movement, and pen down. In addition, the distance between the cells and the pen adjusts precision of the manipulation. When the pen is located near the selected cells, then the users precisely adjust values based on small steps. However, when the pen is located far from the selected cells, the values adjust with higher numeric steps.

Figure 16A:
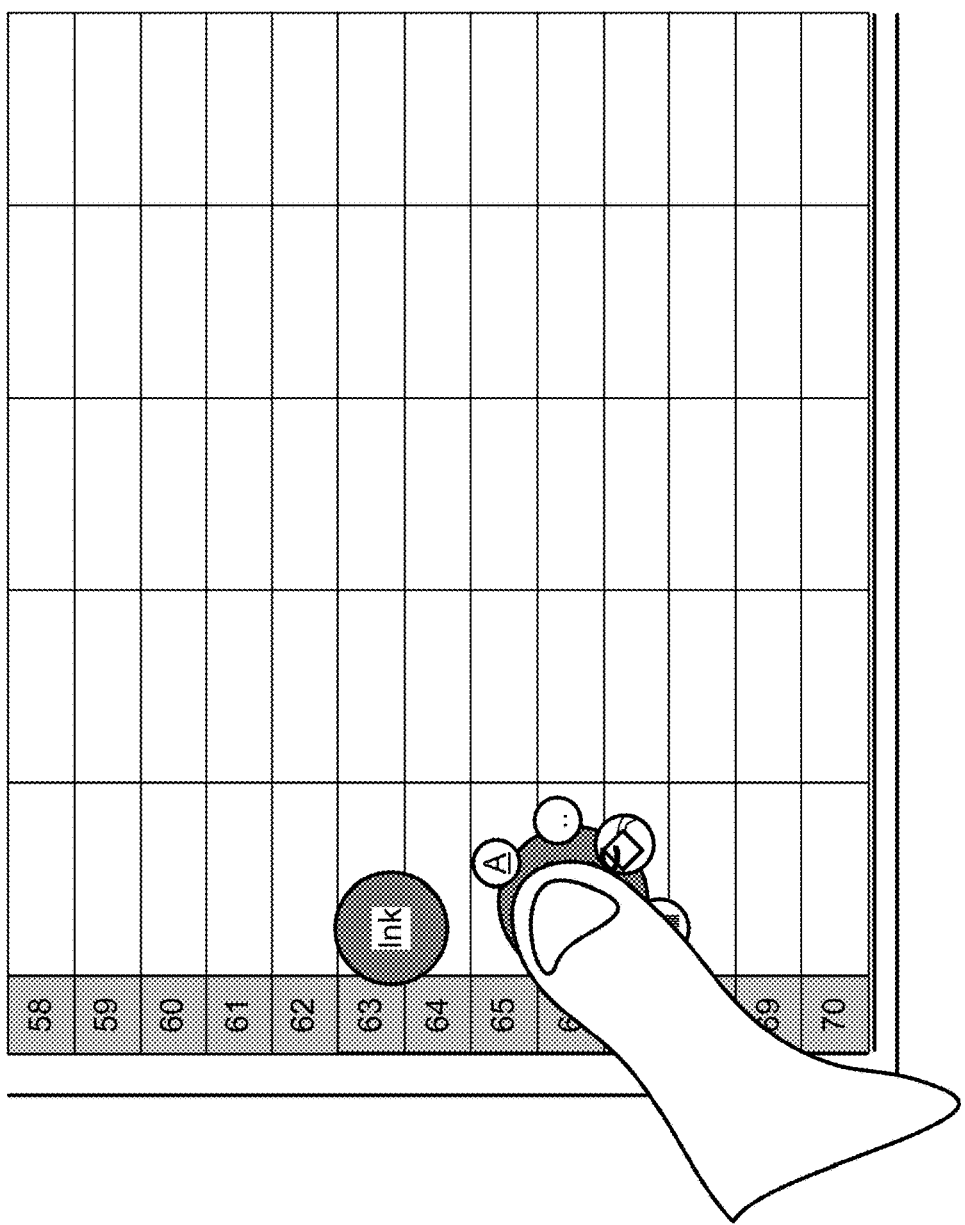
Figure 16B:
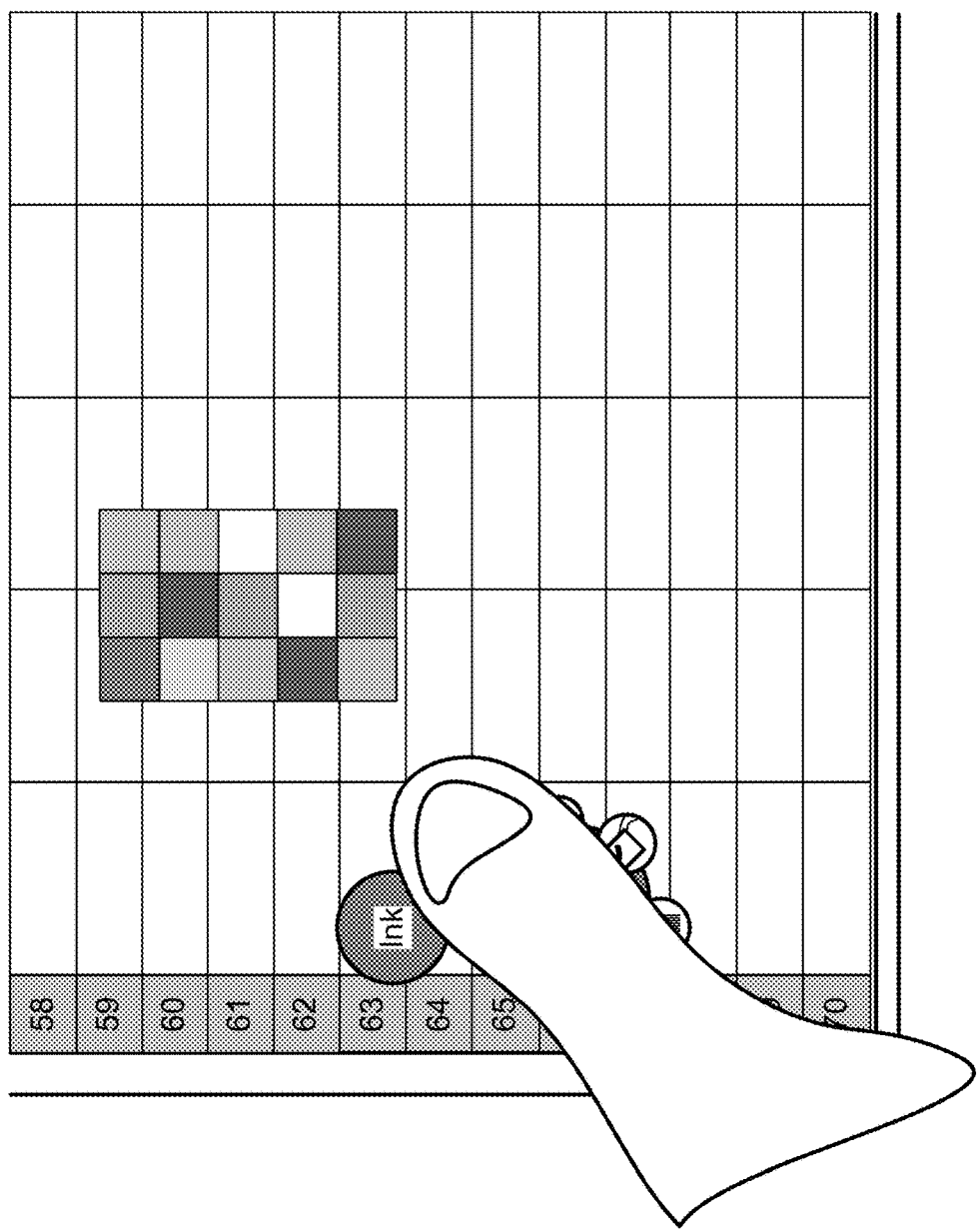

FIGS. 16A-16C are illustrations of example graphical user interfaces that enable thumb+pen interactions. More specifically, the illustrated user interface provides a formatting widget. The formatting widget is operable to add visual structure to cells within the spreadsheet. In one example, the user is able to select a set of cells and then apply the style by tapping on this formatting widget. Moreover, the user is able to configure text color, cell color, and border width through three indirect menus that are part of the marking menu. Furthermore, when the user slides a thumb over one marking option, the corresponding menu appears. Once the menu is displayed, the menu illustrates that the indirect thumb input controls a cursor within the menu. Thus, the user is able to control the cursor based on Object-Pointing, where the cursor always moves to the next object within the menu. According to one aspect, a higher control display gain is applied to comport with the user's thumb movements. In other words, only little thumb movement is required to steer the cursor within the menu.

Figure 17:
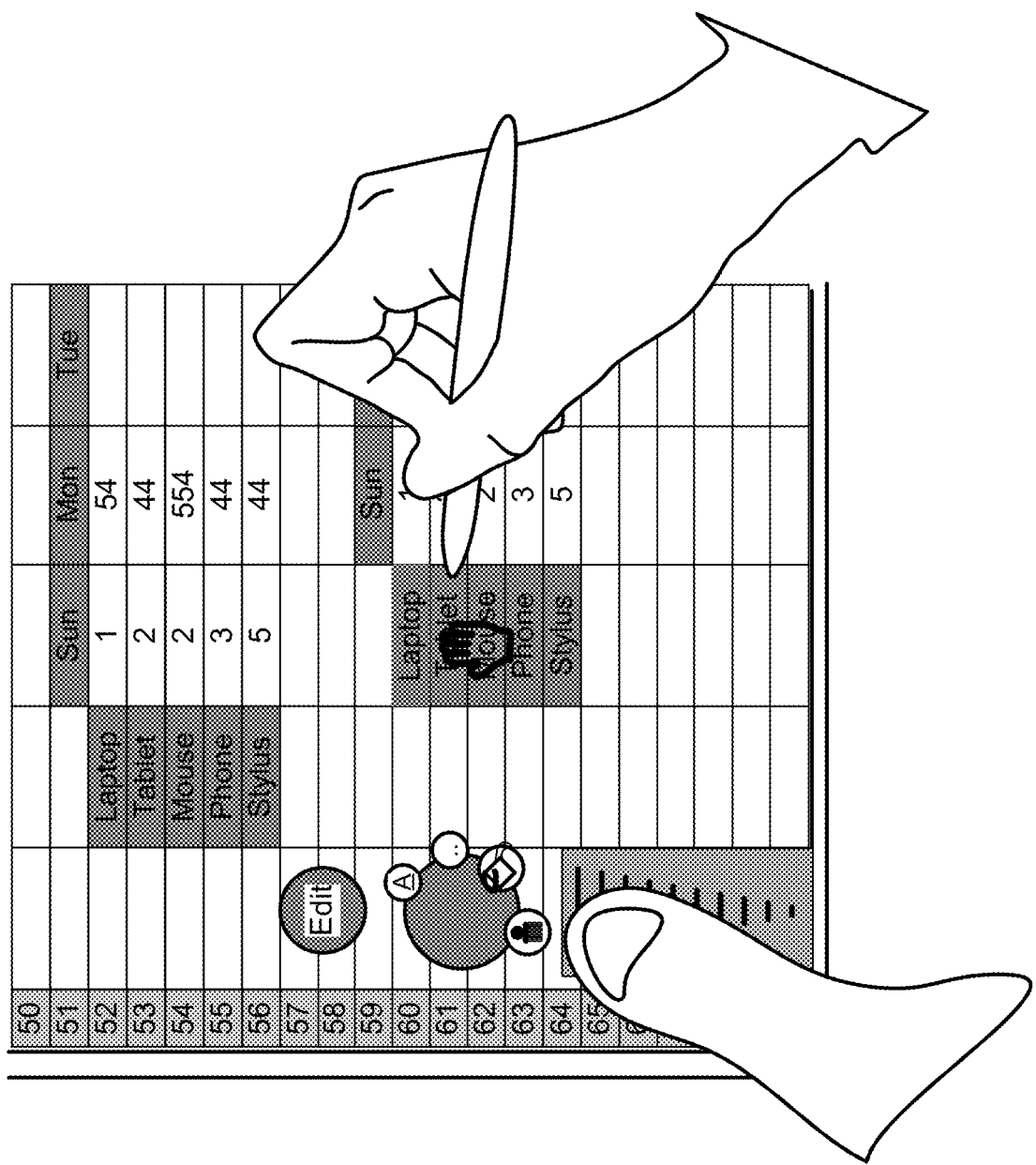
FIG. 17 is an illustration of example graphical user interface that enables thumb+pen interactions.

FIG. 17 is an illustration of an example graphical user interface that enables thumb+pen interactions. More specifically, the illustrated user interface provides a navigation widget. The navigation widget provides the user with the ability to pan and zoom. In one example, the default pan and zoom functionality requires alternation between the pen and touch. In yet another example, the navigation widget allows the user to perform pan and zoom while the pen remains on the screen, which is accomplished by pointing with the pen and zooming by scrolling with the thumb on the widget. Furthermore, the navigation widget is supported in spring-loaded mode. When the user holds the navigation widget, pen dragging gestures pan the canvas, which allows other users to pan and zoom concurrently.

Figure 18B:
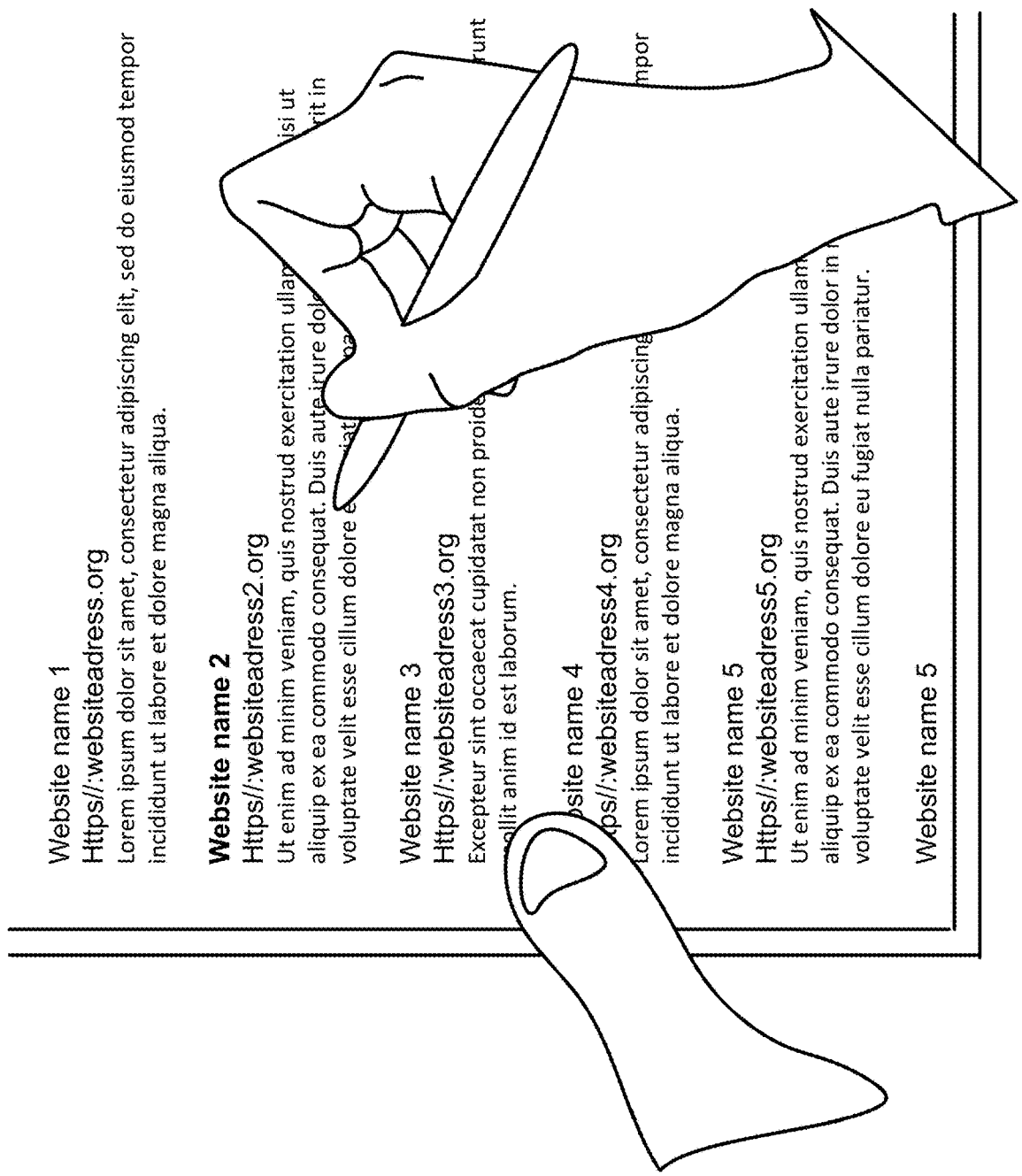

FIGS. 18A-18B are illustrations of example graphical user interfaces that enable thumb+pen interactions. More specifically, the illustrated user interface provides a one or more browser features. In one example, the browser feature includes the ability to use multiple browsing instances for parallel loading of websites. Further, the browser feature may provide functionality regarding the comparison. The additional instances of the browsers may be launched based on receiving a 'thumb+click' method comprising: holding the thumb and tapping with the pen on a link to open the browser in a background tab. Using tablet browsers, tabs are often loaded by a long-touch that opens a context menu with the corresponding option. In contrast, desktop browsers provide the efficient 'control+click' option that avoids delay introduced with long-touch input.

Figure 19:
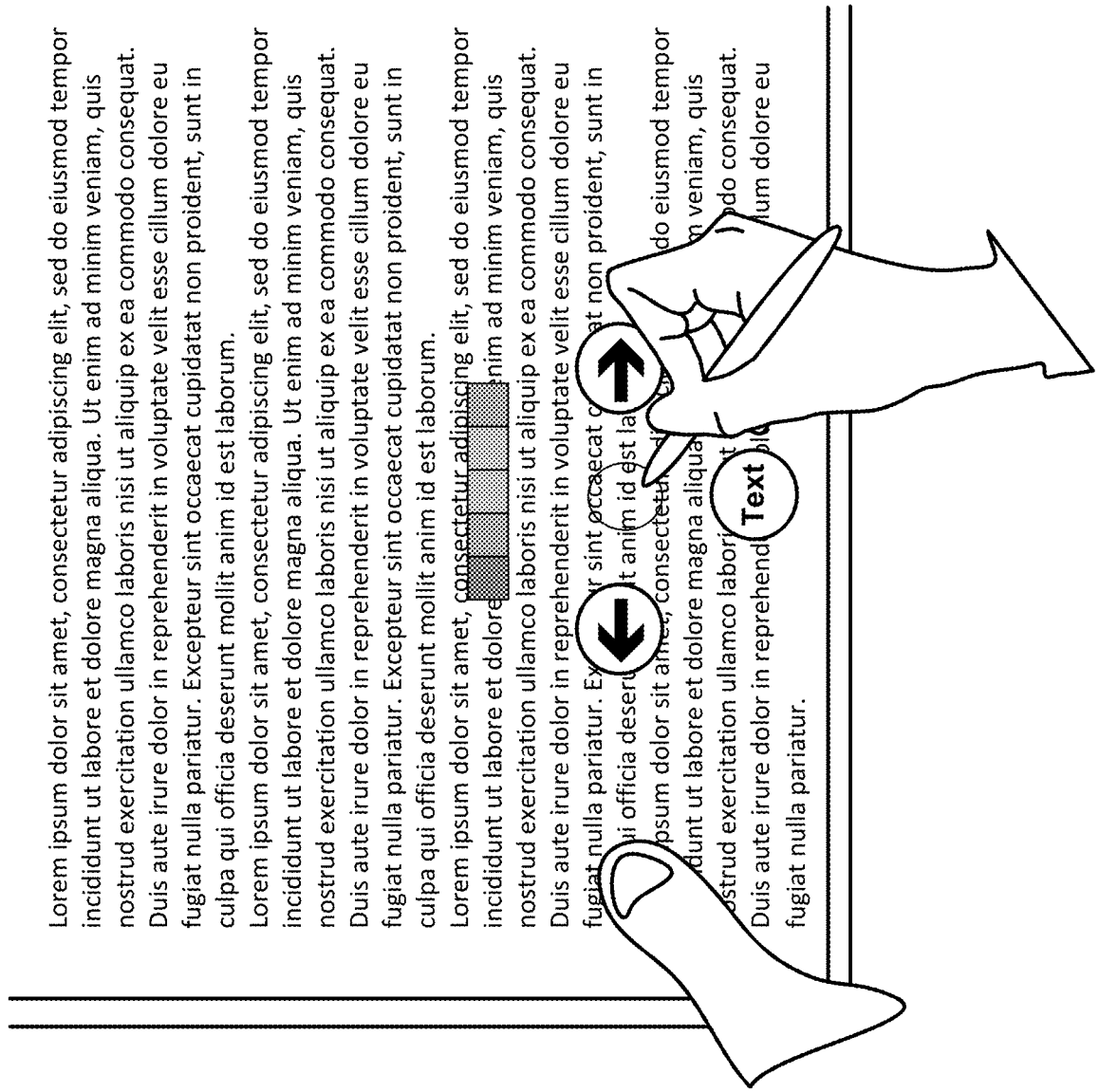
FIG. 19 is an illustration of example graphical user interface that enables thumb+pen interactions.

FIG. 19 is an illustration of example graphical user interface that enables thumb+pen interactions. More specifically, the user interface is configured to provide various other functionalities and tabs. Many secondary browser features, such as back/forward, tabs, or other tools are offloaded to persistent menus. Accordingly, the user is required to physically reach out to these menus that are often placed at the top of the tablet. Further the user interface is configured to provide navigation via receipt of horizontal flicks with the pen that causes the navigation backward/forward of the current web page instance. Further, the user interface include options for pen ink mode and text mode. The pen writes and annotates by default. However, switching modes to a text mode allows the pen to select text precisely and to search for words or to copy information to the clipboard.

Figure 20A:
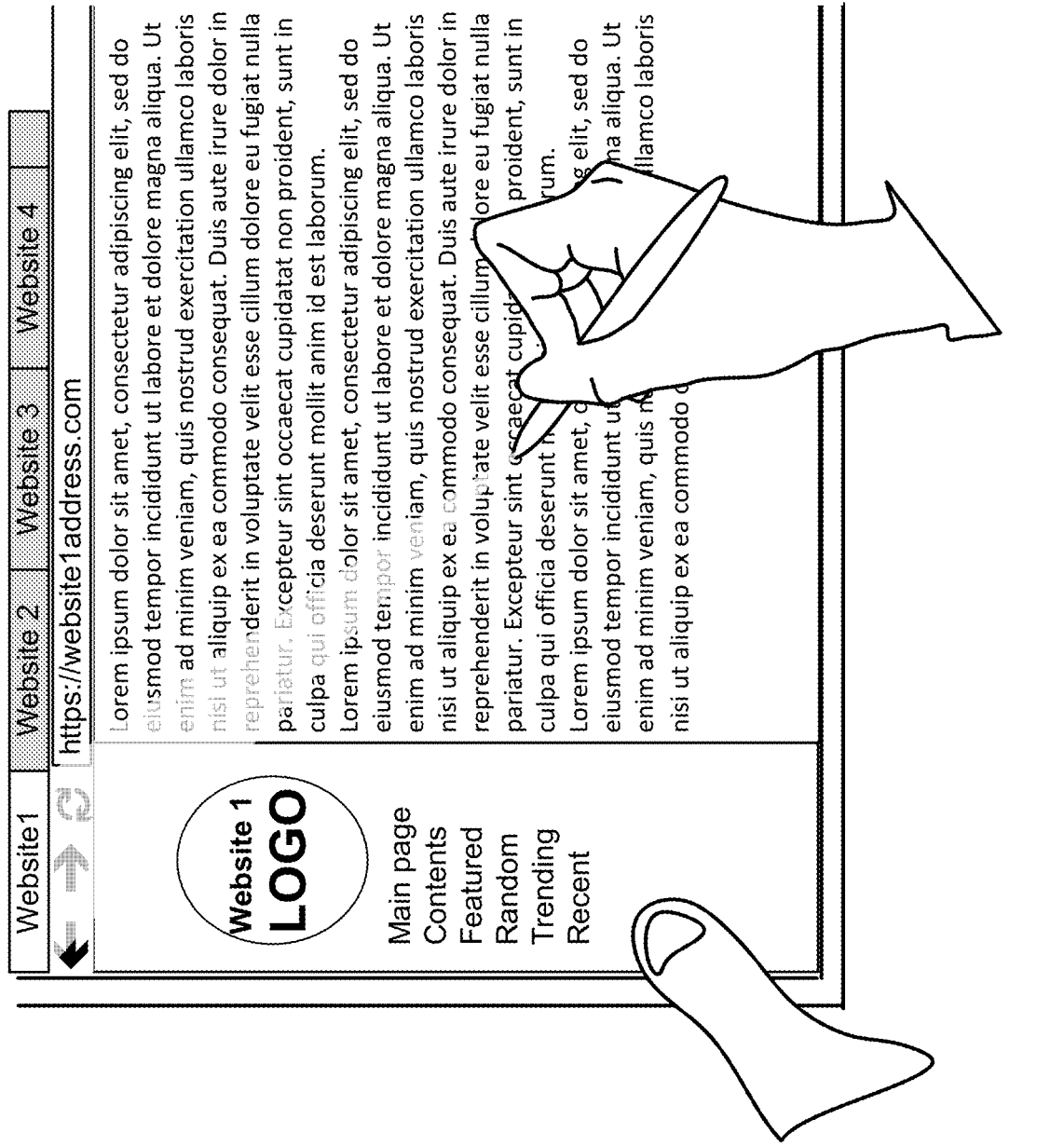
FIGS. 20A-20B are illustrations of example graphical user interfaces that enable thumb+pen interactions.
Figure 20B:
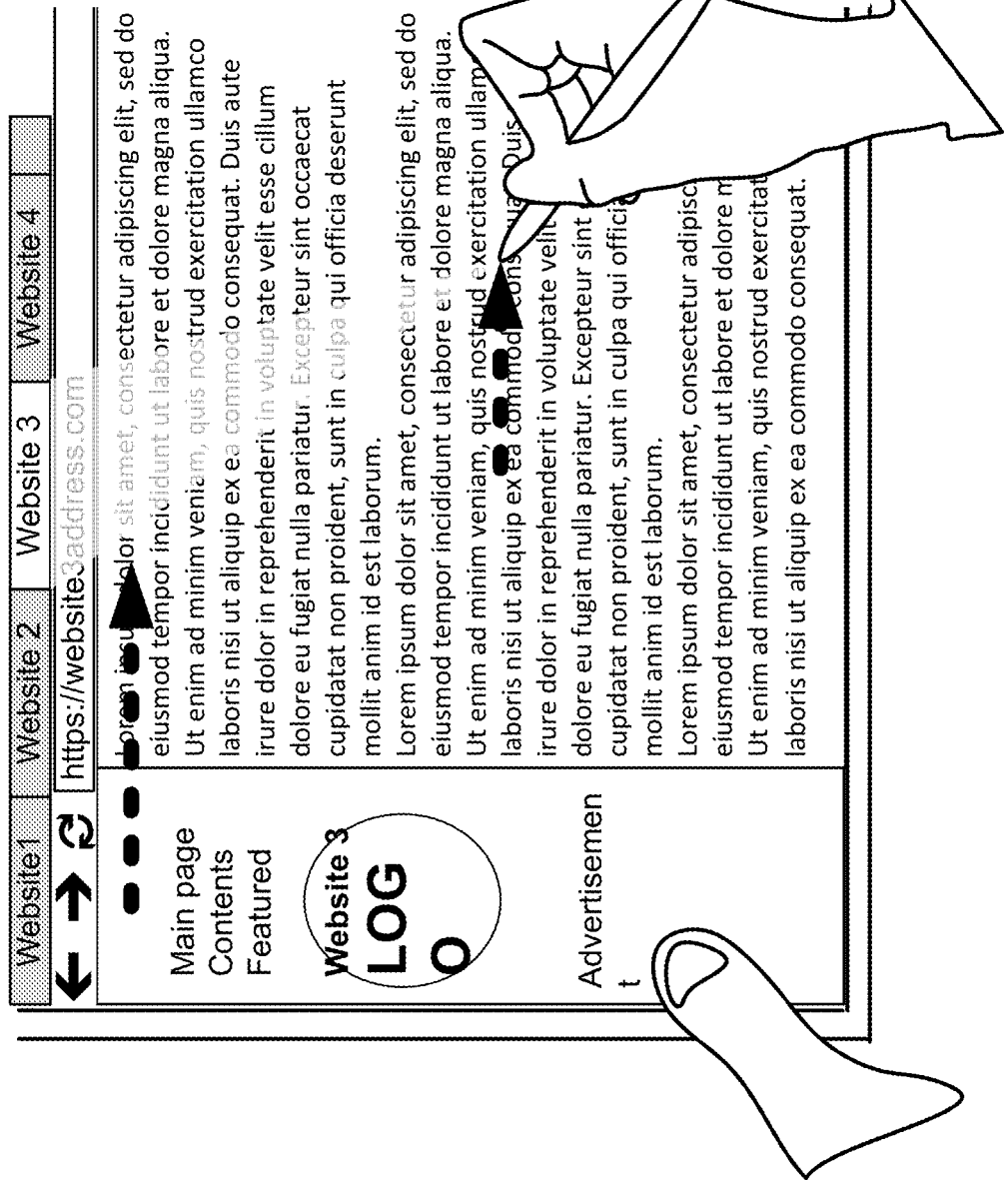

FIGS. 20A-20B are illustrations of example graphical user interfaces that enable thumb+pen interactions. More specifically, the user interface is configured to provide tab switching. Conventionally, a tab is selected by a direct tap, requiring the user to reaching out to the tab list that is located at the top of the browser user interface. Because of the inconvenience, the top option of the marking menu provides a shortcut control to the tabs.

Figure 21A:
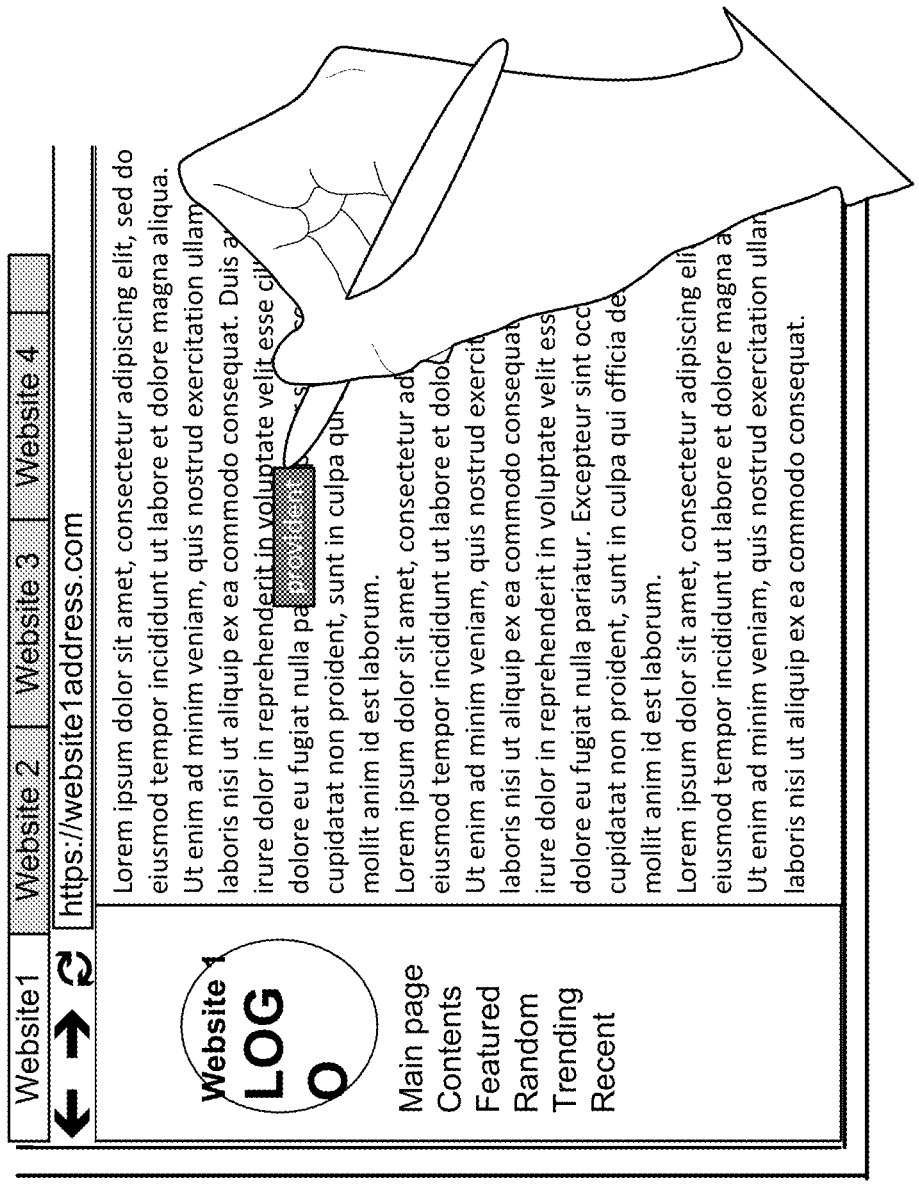
FIGS. 21A-21B are illustrations of example graphical user interfaces that enable thumb+pen interactions.
Figure 21B:
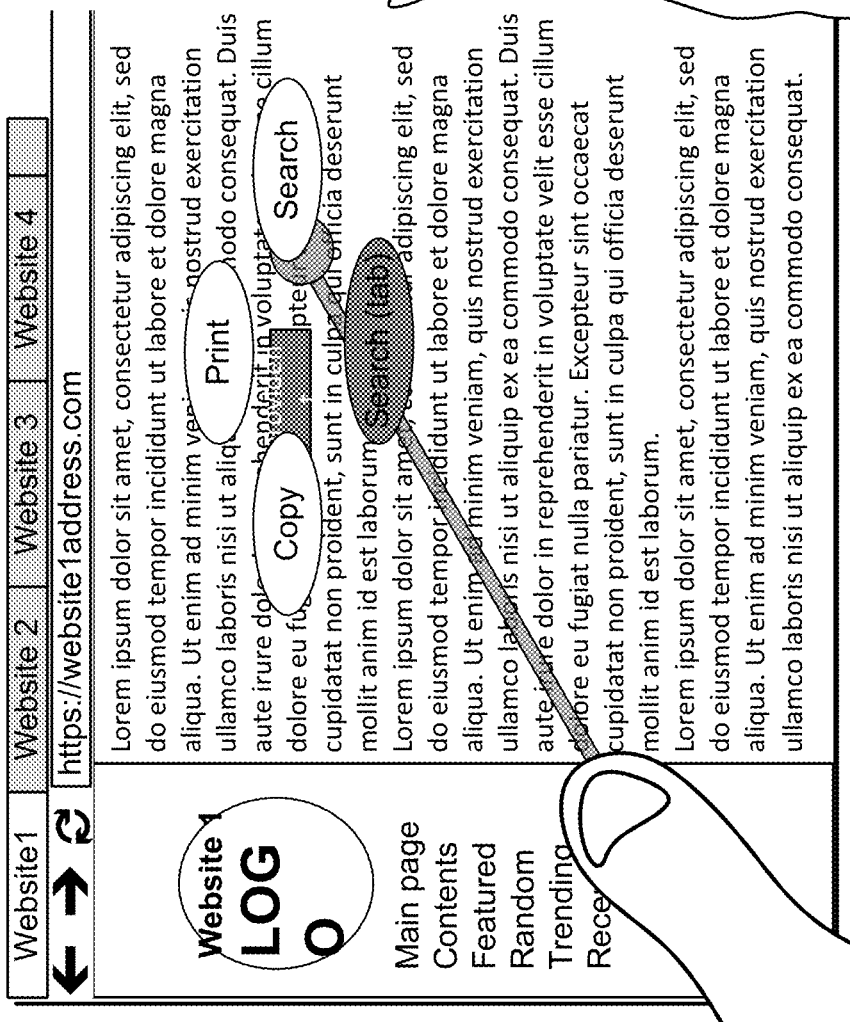

FIGS. 21A-21B are illustrations of example graphical user interfaces that enable thumb+pen interactions. More specifically, the user interface is configured to provide text context menu controls that permit the user to select text with the pen, display an indication of the selection, and if the selection becomes active, provide a radial menu with functionalities (e.g., copy, print, search, and search in tab).

Further, the marking menu provides one or more techniques for interacting with the interface. In one example, the user may employ simultaneous thumb+pen input that opens the context menu in response to holding the thumb down. In another example, the users employ indirect thumb input. As shown in FIGS. 21A-21B, after selecting text, the thumb touches downward, establishing an indirect handle to the menus center, such that indirect dragging selects an option.

Figure 22A:
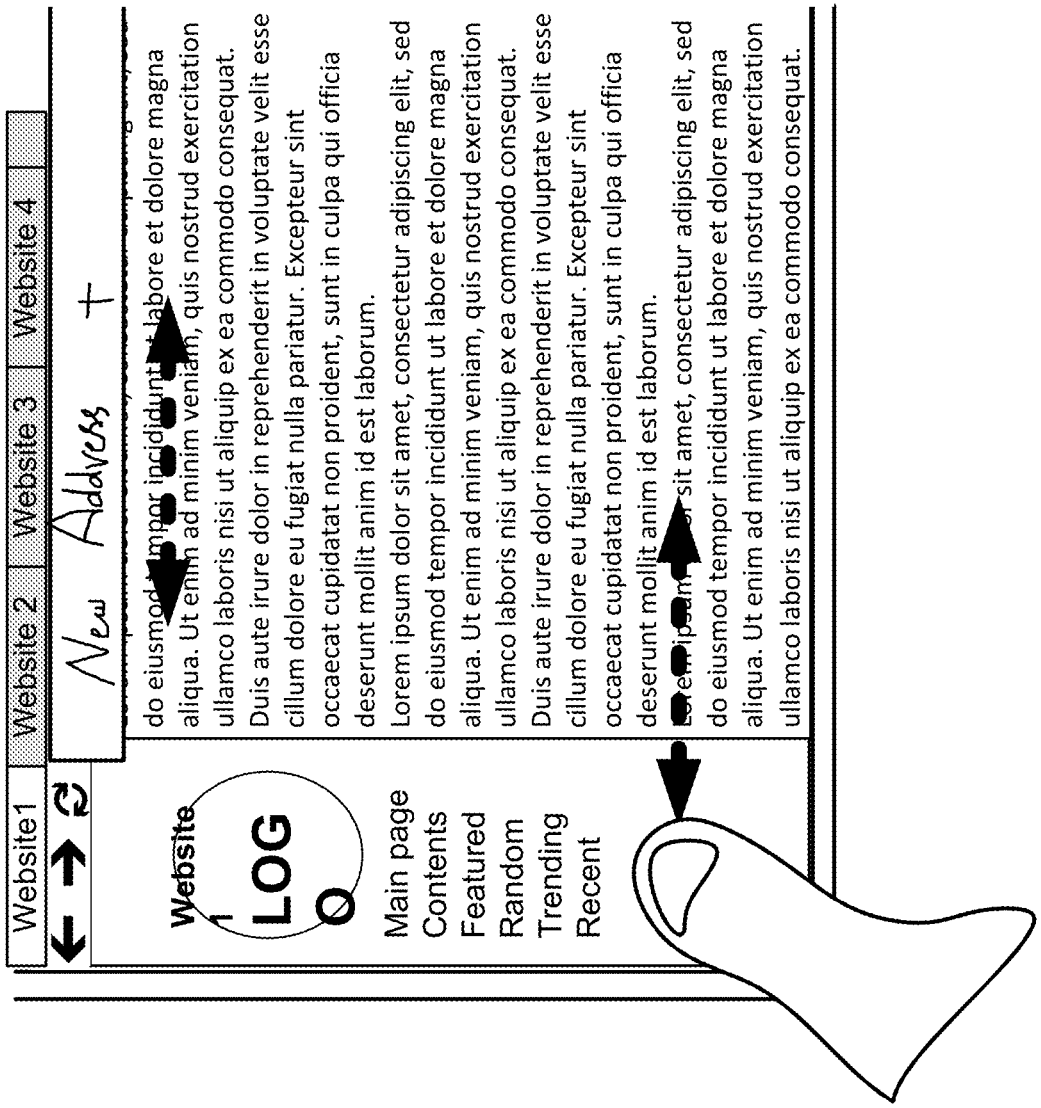
FIGS. 22A-22B are illustrations of example graphical user interfaces that enable thumb+pen interactions.
Figure 22B:
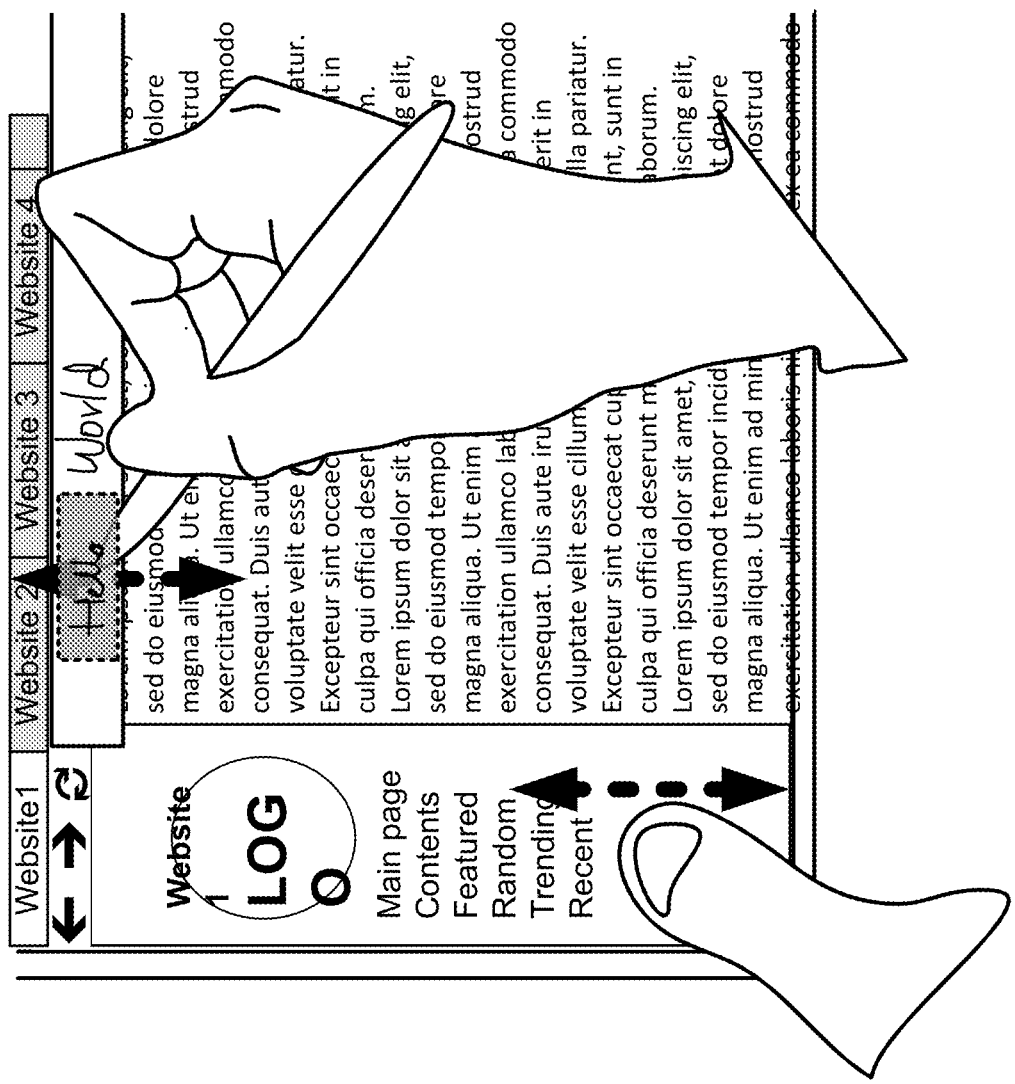

FIGS. 22A-22B are illustrations of example graphical user interfaces that enable thumb+pen interactions. More specifically, the user interface is configured to provide address bar thumb supports, including a horizontal thumb input that scrolls the address bar and a vertical thumb input that allows users to select alternative ink suggestions. The technique allows users to hover over a few words, and perform a few thumb-scroll gestures to rapidly correct a portion or the whole sentence. Further, the graphical user interface is configured to provide an application framework with the capability of concurrent pen and thumb interaction in order to allow users to manipulate two attributes of an object at the same time. Pen modes include free drawing, straight lines, shape creation, hand (dragging) tool, fill color, and marquee selection. Thumb modes include adjustments of uniform size, alpha level, width/height, canvas zoom factor, and layer level of objects. The thumb mode is issued indirectly through a slider-like area located around the left border of the screen.

Figure 23B:
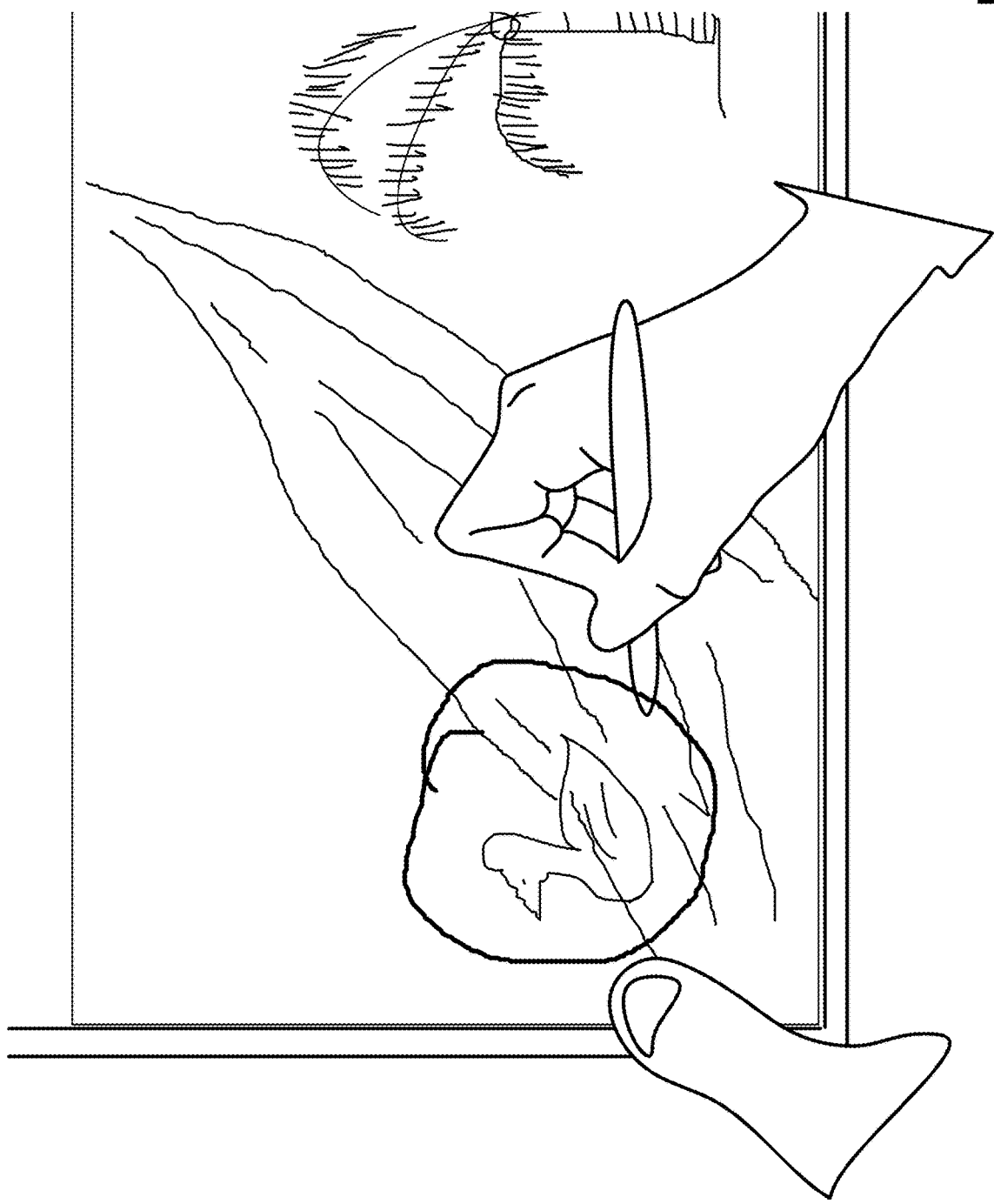

FIGS. 23A-23B are illustrations of example graphical user interfaces that enable thumb+pen interactions. More specifically, the user interface is configured to provide zoom support. The zoom worked based on the thumb mode. The user can scroll the thumb slider to zoom at the pen's location (i.e., when the pen is hovering over the display). Zooming supports inertia, allowing users to perform just short dragging gestures for continuous zooming. When the zooming operation finishes, a user can almost immediately start work, with the pen already located at the area of interest.

Figure 24A:
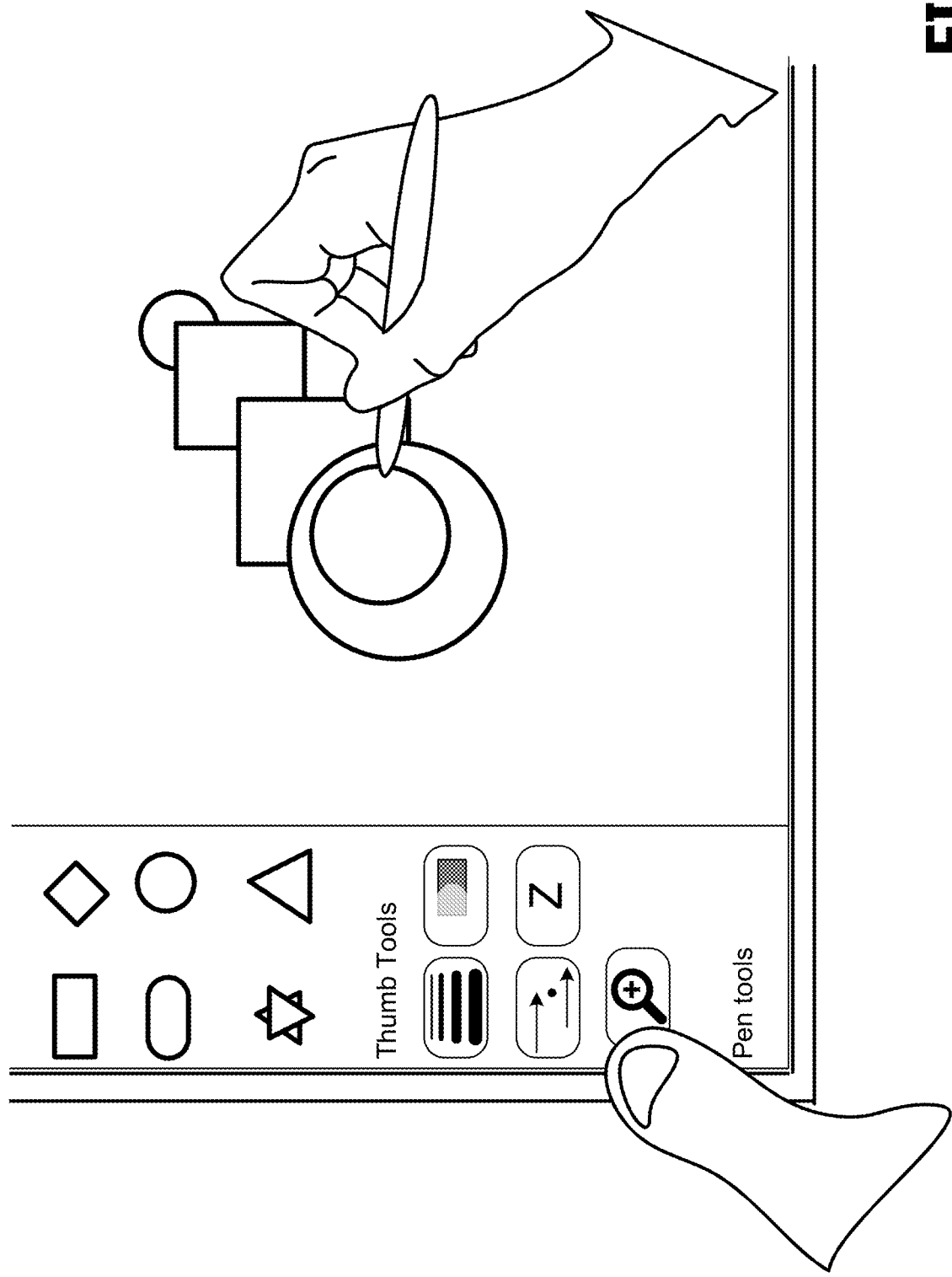
FIGS. 24A-24B are illustrations of example graphical user interfaces that enable thumb+pen interactions.
Figure 24B:
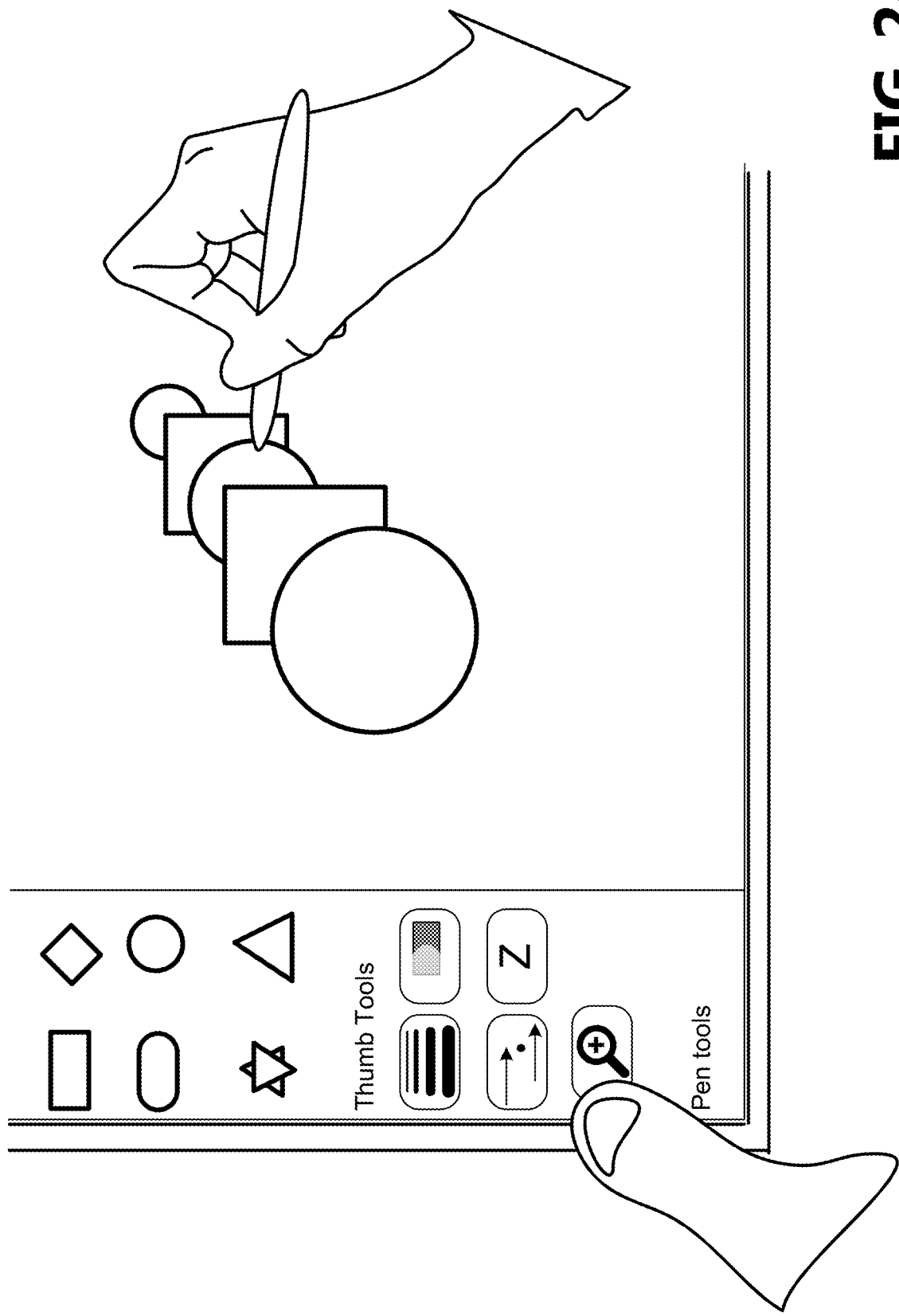

FIGS. 24A-24B are illustrations of example graphical user interfaces that enable thumb+pen interactions. The object location includes a layer control that allows users to move their design objects to the fore and back. This mode works particularly well in combination with dragging objects with the pen. The pen directly moves an object in 2D space, while the thumb indirectly controls the third dimension in form of layers. The outcome is a compound technique that integrates both pen and thumb to a unitary whole, that can be equally employed for any 3D object translation task.

Figure 25:
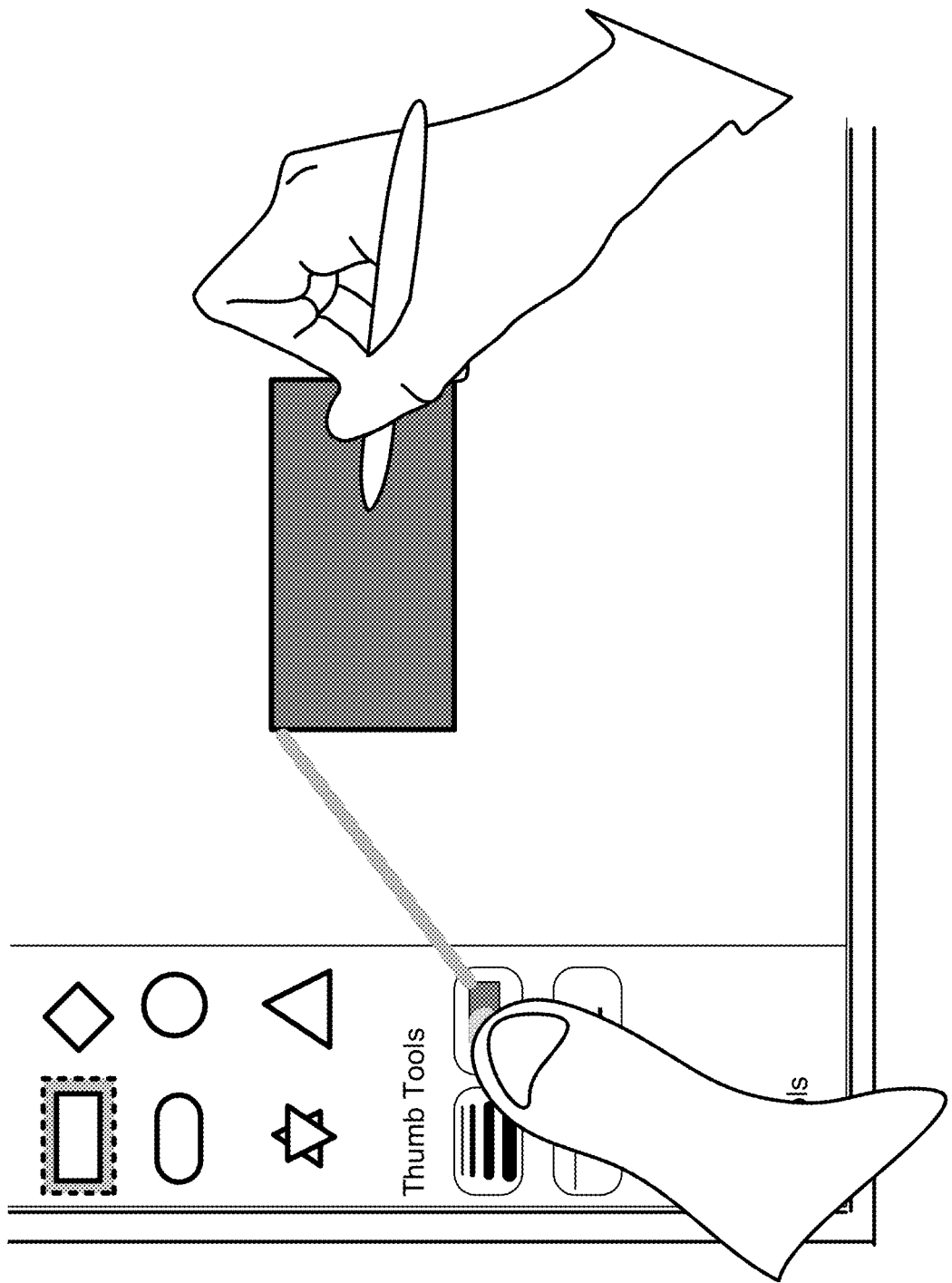
FIG. 25 is an illustration of example graphical user interface that enables thumb+pen interactions.

FIG. 25 is an illustration of example graphical user interface that enables thumb+pen interactions. In the tablet case, one hand holds the device, making direct two-point control difficult. The thumb indirectly controls the second point. This is possible when users actively add shapes, for example, to create a rectangle. Users press the pen down to add the shape, and then the pen controls the bottom-right corner. Thumb input is optional, and then controls the top-left corner.

Figure 26:
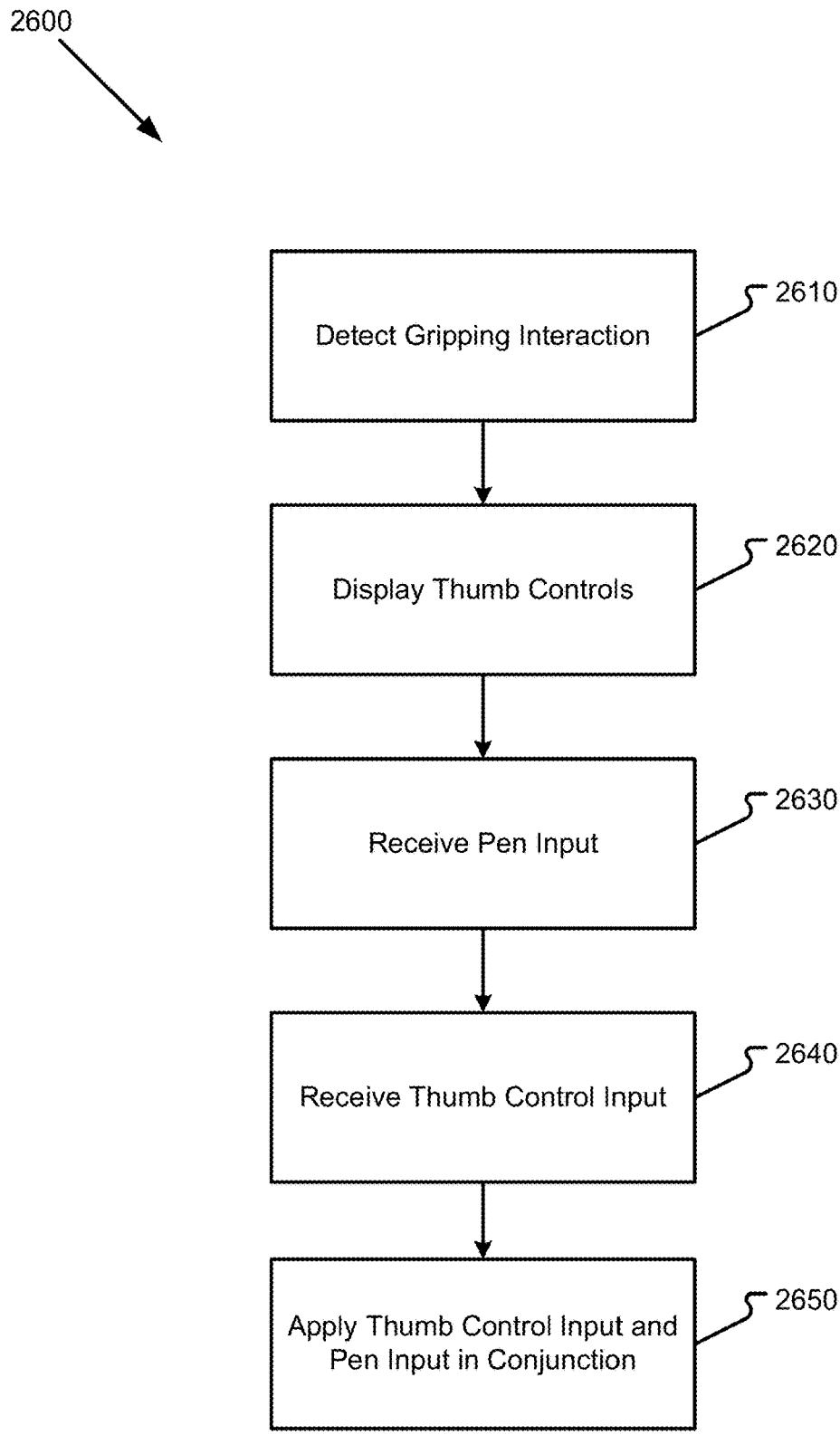
FIG. 26 is a flow chart showing general stages involved in an example method for enabling thumb+pen interactions on a mobile computing device.

FIG. 26 is a flow chart showing general stages involved in an example method 2600 for providing rich bimanual interactions for touchscreen enabled computing devices. Method 2600 begins at OPERATION 2610, where a gripping interaction is detected. In various aspects, a gripping interaction is detected by the touch input sensor 120 on an edge thereof based on its position and/or a shape of a hand or finger in contact with or proximity to the surface of the touch input sensor 120. In additional aspects, the gripping interaction is performed by the non-preferred hand of the user, and gripping the touch input sensor 120 with both hands or the preferred hand, will not result in a detected gripping interaction. In other aspects, two gripping hands may be identified and provided with different roles and menus in manipulating content in the application canvas receiving the touch inputs. Whether a given hand is preferred or non-preferred may be defined by a user (e.g., a right/left handed preference setting), based on the presence of a smart watch (which wrist it is worn on indicating a non-preferred hand), based on visual input (e.g., a front facing camera, a depth camera, an IR camera, motion sensors) or may be assumed to be a given hand (e.g., the right hand is preferred unless otherwise specified).

At OPERATION 2620 thumb controls are displayed on a user interface. The thumb controls displayed may depend on the application receiving touch input, a mode of operation, and prior selections of controls (e.g., in a submenu). The thumb controls are displayed in proximity to an area of the touch sensor 120 that a thumb of the user can actuate based on a location of grip. A user may specify a hand size, dexterity/flexibility, and/or preferred grip style (deep in palm, supported by fingers, angle of grip) that influence where the thumb controls are displayed. The system may also, based on the detected gripping interaction, reposition the thumb controls relative to a predicted accessible region that the user may actuate via the thumb while maintaining a steady grip on the user device 110. In aspects where multiple hands are detected as gripping the device, the preferred hand may optionally be provided with thumb controls that mirror or are complementary to those of the non-preferred hand.

Proceeding to OPERATIONS 2630 and 2640, inputs are received via a pen input and a touch input from a free hand and the gripping hand respectively. The thumb control input and the pen input are then applied in conjunction with one another to an application canvas in which the inputs were received at OPERATION 2650. As discussed herein, the pen input refers to inputs received based upon a pen hover, a pen moving over the digitizer, pen down, and pen move on a digitizer. In various aspects, the inputs are received simultaneously, such as a user holding down a thumb control with the gripping hand and drawing/writing with the free hand to impart an effect from the thumb control on the pen/freehand input. In other aspects, the pen input is received first, followed by the thumb control input, such as, for example, selecting an object via a pen/freehand double-tap and performing a reformatting option associated with a selected thumb control. In further aspects, the thumb control input is received first, followed by the pen input, such as, for example, selecting a lasso tool from among several thumb controls to impact the inputs to be made by the pen input. It will be appreciated that the above are given as non-limiting examples; other input types and combinations thereof are contemplated by the present disclosure to affect various behaviors in various applications.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 27:
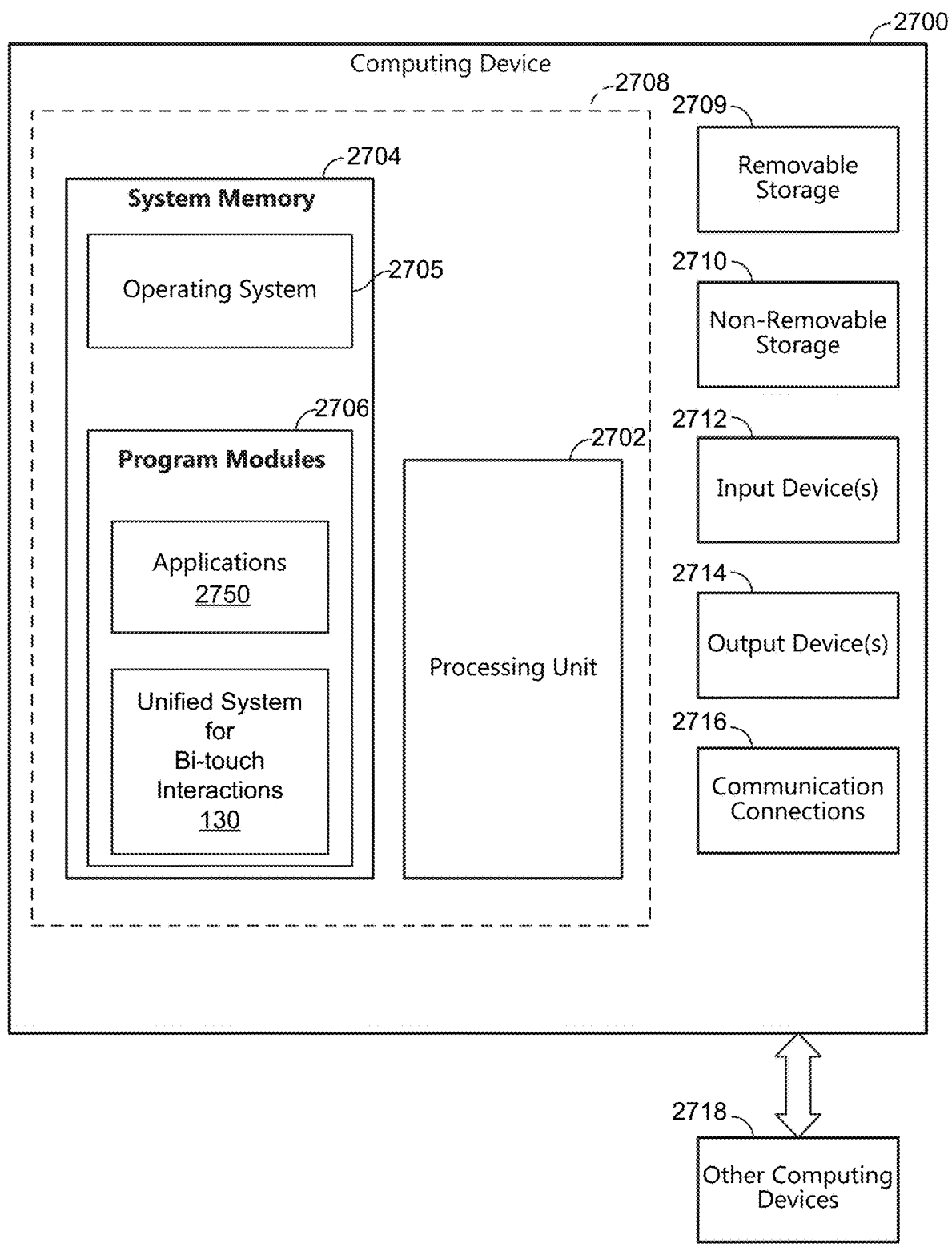
FIG. 27 is a block diagram illustrating example physical components of a computing device.
Figure 28A:
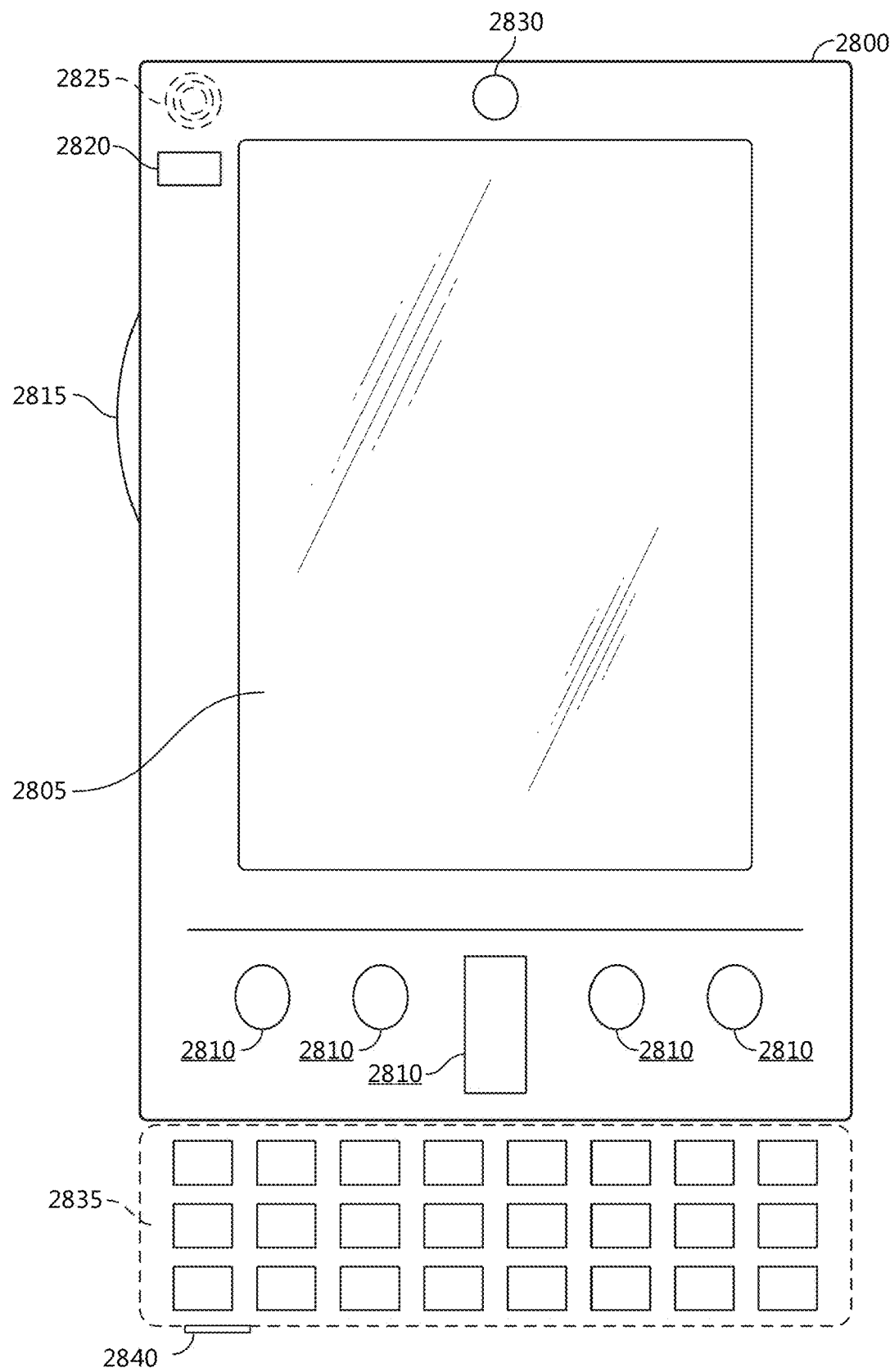
FIGS. 28A and 28B are block diagrams of a mobile computing device.
Figure 28B:
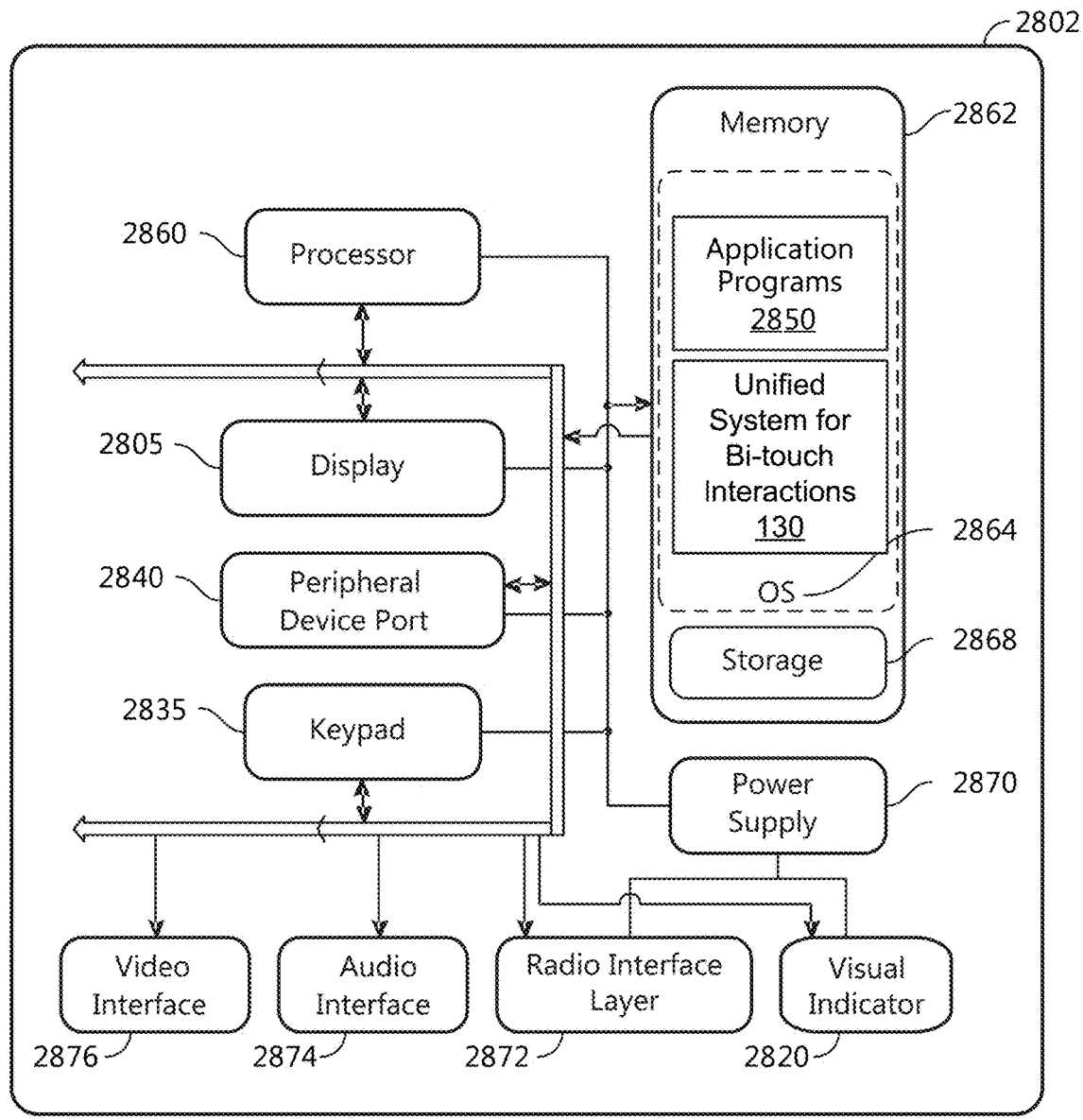
Figure 29:
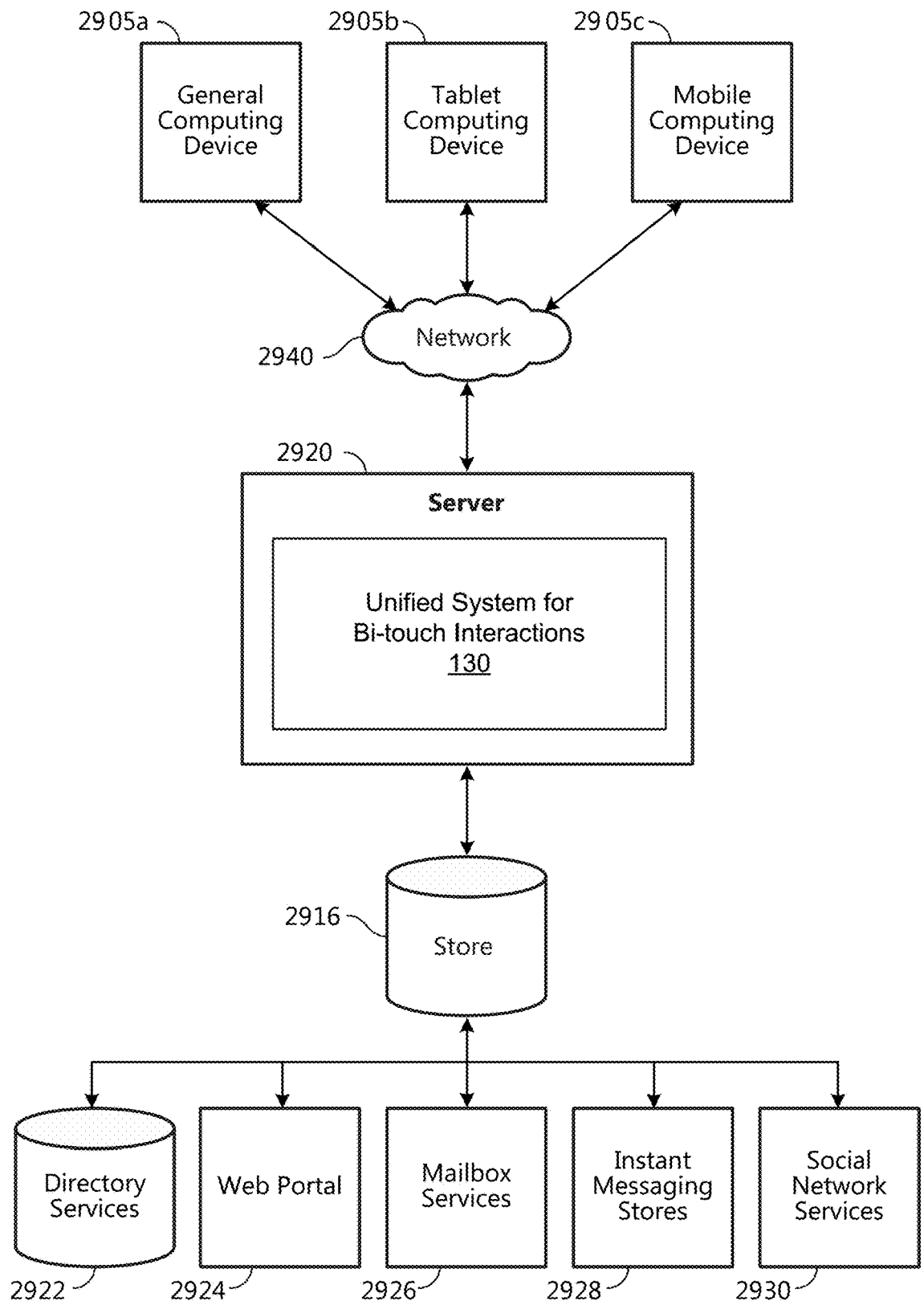
FIG. 29 is a block diagram of a distributed computing system.

FIGS. 27-29 and the associated descriptions provide a discussion of a variety of operating environments in which examples are practiced. However, the devices and systems illustrated and discussed with respect to FIGS. 27-29 are for purposes of example and illustration and are not limiting of a vast number of computing device configurations that are utilized for practicing aspects, described herein.

FIG. 27 is a block diagram illustrating physical components (i.e., hardware) of a computing device 2700 with which examples of the present disclosure may be practiced. In a basic configuration, the computing device 2700 includes at least one processing unit 2702 and a system memory 2704. According to an aspect, depending on the configuration and type of computing device, the system memory 2704 comprises, but is not limited to, volatile storage (e.g., random access memory), non-volatile storage (e.g., read-only memory), flash memory, or any combination of such memories. According to an aspect, the system memory 2704 includes an operating system 2705 and one or more program modules 2706 suitable for running software applications 2750. According to an aspect, the system memory 2704 includes unified system for bi-touch interactions 130. The operating system 2705, for example, is suitable for controlling the operation of the computing device 2700. Furthermore, aspects are practiced in conjunction with a graphics library, other operating systems, or any other application program, and are not limited to any particular application or system. This basic configuration is illustrated in FIG. 27 by those components within a dashed line 2708. According to an aspect, the computing device 2700 has additional features or functionality. For example, according to an aspect, the computing device 2700 includes additional data storage devices (removable and/or non-removable) such as, for example, magnetic disks, optical disks, or tape. Such additional storage is illustrated in FIG. 27 by a removable storage device 2709 and a non-removable storage device 2710.

As stated above, according to an aspect, a number of program modules and data files are stored in the system memory 2704. While executing on the processing unit 2702, the program modules 2706 (e.g., unified system for bi-touch interactions 130) perform processes including, but not limited to, one or more of the stages of the method 2600 illustrated in FIG. 26. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 27 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 2700 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 2700 has one or more input device(s) 2712 such as a keyboard, a mouse, a pen, a sound input device, a touch input device, etc. The output device(s) 2714 such as a display, speakers, a printer, etc. are also included according to an aspect. The aforementioned devices are examples and others may be used. According to an aspect, the computing device 2700 includes one or more communication connections 2716 allowing communications with other computing devices 2718. Examples of suitable communication connections 2716 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 2704, the removable storage device 2709, and the non-removable storage device 2710 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 2700. According to an aspect, any such computer storage media is part of the computing device 2700. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 28A and 28B illustrate a mobile computing device 2800, for example, a mobile telephone, a smart phone, a tablet personal computer, a laptop computer, and the like, with which aspects may be practiced. With reference to FIG. 28A, an example of a mobile computing device 2800 for implementing the aspects is illustrated. In a basic configuration, the mobile computing device 2800 is a handheld computer having both input elements and output elements. The mobile computing device 2800 typically includes a display 2805 and one or more input buttons 2810 that allow the user to enter information into the mobile computing device 2800. According to an aspect, the display 2805 of the mobile computing device 2800 functions as an input device (e.g., a touch screen display). If included, an optional side input element 2815 allows further user input. According to an aspect, the side input element 2815 is a rotary switch, a button, or any other type of manual input element. In alternative examples, mobile computing device 2800 incorporates more or fewer input elements. For example, the display 2805 may not be a touch screen in some examples. In alternative examples, the mobile computing device 2800 is a portable phone system, such as a cellular phone. According to an aspect, the mobile computing device 2800 includes an optional keypad 2835. According to an aspect, the optional keypad 2835 is a physical keypad. According to another aspect, the optional keypad 2835 is a "soft" keypad generated on the touch screen display. In various aspects, the output elements include the display 2805 for showing a graphical user interface (GUI), a visual indicator 2820 (e.g., a light emitting diode), and/or an audio transducer 2825 (e.g., a speaker). In some examples, the mobile computing device 2800 incorporates a vibration transducer for providing the user with tactile feedback. In yet another example, the mobile computing device 2800 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 2800 incorporates peripheral device port 2840, such as an audio input (e.g., a microphone jack), an audio output (e.g., a headphone jack), and a video output (e.g., a HDMI port) for sending signals to or receiving signals from an external device.

FIG. 28B is a block diagram illustrating the architecture of one example of a mobile computing device. That is, the mobile computing device 2800 incorporates a system (i.e., an architecture) 2802 to implement some examples. In one example, the system 2802 is implemented as a "smart phone" capable of running one or more applications (e.g., browser, e-mail, calendaring, contact managers, messaging clients, games, and media clients/players). In some examples, the system 2802 is integrated as a computing device, such as an integrated personal digital assistant (PDA) and wireless phone.

According to an aspect, one or more application programs 2850 are loaded into the memory 2862 and run on or in association with the operating system 2864. Examples of the application programs include phone dialer programs, e-mail programs, personal information management (PIM) programs, word processing programs, spreadsheet programs, Internet browser programs, messaging programs, and so forth. According to an aspect, unified system for bi-touch interactions 130 is loaded into memory 2862. The system 2802 also includes a non-volatile storage area 2868 within the memory 2862. The non-volatile storage area 2868 is used to store persistent information that should not be lost if the system 2802 is powered down. The application programs 2850 may use and store information in the non-volatile storage area 2868, such as e-mail or other messages used by an e-mail application, and the like. A synchronization application (not shown) also resides on the system 2802 and is programmed to interact with a corresponding synchronization application resident on a host computer to keep the information stored in the non-volatile storage area 2868 synchronized with corresponding information stored at the host computer. As should be appreciated, other applications may be loaded into the memory 2862 and run on the mobile computing device 2800.

According to an aspect, the system 2802 has a power supply 2870, which is implemented as one or more batteries. According to an aspect, the power supply 2870 further includes an external power source, such as an AC adapter or a powered docking cradle that supplements or recharges the batteries.

According to an aspect, the system 2802 includes a radio 2872 that performs the function of transmitting and receiving radio frequency communications. The radio 2872 facilitates wireless connectivity between the system 2802 and the "outside world," via a communications carrier or service provider. Transmissions to and from the radio 2872 are conducted under control of the operating system 2864. In other words, communications received by the radio 2872 may be disseminated to the application programs 2850 via the operating system 2864, and vice versa.

According to an aspect, the visual indicator 2820 is used to provide visual notifications and/or an audio interface 2874 is used for producing audible notifications via the audio transducer 2825. In the illustrated example, the visual indicator 2820 is a light emitting diode (LED) and the audio transducer 2825 is a speaker. These devices may be directly coupled to the power supply 2870 so that when activated, they remain on for a duration dictated by the notification mechanism even though the processor 2860 and other components might shut down for conserving battery power. The LED may be programmed to remain on indefinitely until the user takes action to indicate the powered-on status of the device. The audio interface 2874 is used to provide audible signals to and receive audible signals from the user. For example, in addition to being coupled to the audio transducer 2825, the audio interface 2874 may also be coupled to a microphone to receive audible input, such as to facilitate a telephone conversation. According to an aspect, the system 2802 further includes a video interface 2876 that enables an operation of an on-board camera 2830 to record still images, video stream, and the like.

According to an aspect, a mobile computing device 2800 implementing the system 2802 has additional features or functionality. For example, the mobile computing device 2800 includes additional data storage devices (removable and/or non-removable) such as, magnetic disks, optical disks, or tape. Such additional storage is illustrated in FIG. 28B by the non-volatile storage area 2868.

According to an aspect, data/information generated or captured by the mobile computing device 2800 and stored via the system 2802 are stored locally on the mobile computing device 2800, as described above. According to another aspect, the data are stored on any number of storage media that are accessible by the device via the radio 2872 or via a wired connection between the mobile computing device 2800 and a separate computing device associated with the mobile computing device 2800, for example, a server computer in a distributed computing network, such as the Internet. As should be appreciated such data/information are accessible via the mobile computing device 2800 via the radio 2872 or via a distributed computing network. Similarly, according to an aspect, such data/information are readily transferred between computing devices for storage and use according to well-known data/information transfer and storage means, including electronic mail and collaborative data/information sharing systems.

FIG. 29 illustrates one example of the architecture of a system for rich bimanual interactions for touchscreen enabled devices as described above. Content developed, interacted with, or edited in association with the unified system for bi-touch interactions 130 is enabled to be stored in different communication channels or other storage types. For example, various documents may be stored using a directory service 2922, a web portal 2924, a mailbox service 2926, an instant messaging store 2928, or a social networking site 2930. The unified system for bi-touch interactions 130 is operative to use any of these types of systems or the like for rich bimanual interactions for touchscreen enabled devices, as described herein. According to an aspect, a server 2920 provides the unified system for bi-touch interactions 130 to clients 2905a,b,c. As one example, the server 2920 is a web server providing the unified system for bi-touch interactions 130 over the web. The server 2920 provides the unified system for bi-touch interactions 130 over the web to clients 2905 through a network 2940. By way of example, the client computing device is implemented and embodied in a personal computer 2905*a*, a tablet computing device 2905*b* or a mobile computing device 2905*c* (e.g., a smart phone), or other computing device. Any of these examples of the client computing device are operable to obtain content from the store 2916.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing bimanual interactions for touchscreen enabled devices, comprising:
   providing an application canvas accepting inputs from a touch interface of a user device;
   detecting a contextual interaction of a gripping hand at an edge of the user device, wherein the gripping hand is a non-preferred hand of a user holding the user device;
   in response to detecting the contextual interaction, displaying a marking menu comprised of thumb controls in the application canvas within a range of motion of a thumb of the gripping hand;
   receiving, from the thumb of the gripping hand, a selection of a first thumb control of the marking menu, wherein the first thumb control is a spring-loaded mode control associated with a first mode;
   while the first thumb control is being held by the thumb of the gripping hand, receiving a first set of actions made using a non-gripping hand;
   interpreting the first set of actions based on the first mode;
   applying the interpreted first set of actions to the application canvas;
   in response to receiving a drag motion from the thumb of the gripping hand, re-displaying the marking menu comprised of the thumb controls in the application canvas;
   receiving, from the thumb of the gripping hand, a selection of a second thumb control of the marking menu, wherein the second thumb control is a spring-loaded mode control associated with a second mode;
   while the second thumb control is being held by the thumb of the gripping hand, receiving a second set of actions made using the non-gripping hand;
   interpreting the second set of actions made using the non-gripping hand based on the second mode; and
   applying the interpreted second set of actions to the application canvas.

2. The method of claim 1, further comprising:
   while no thumb control is being held by the thumb of the gripping hand and a third set of actions made using the non-gripping hand is received, interpreting the third set of actions based on a default mode, wherein the default mode is distinct from the first mode and
   the second mode.

3. The method of claim 1, further comprising:
   determining the gripping hand is the non-preferred hand of the user holding the user device.

4. The method of claim 1, wherein displaying the marking menu comprised of the thumb controls in the application canvas further comprises:
   determining a hand size of the gripping hand; and
   displaying the thumb controls in the application canvas based on the hand size.

5. The method of claim 1, wherein displaying the marking menu comprised of the thumb controls in the application canvas further comprises:
   determining a context of the gripping hand; and
   positioning the thumb controls at a location suitable on the application canvas for interaction with the thumb based on the context.

6. A system for providing a unified system for bimanual interactions on flexible representations of content, comprising:
   a processor; and
   a memory including instructions, which when executed by the processor, causes the system to:
      detect a contextual interaction of a gripping hand at an edge of a user device, the user device including a touch interface and providing an application canvas accepting inputs from the touch interface, wherein the gripping hand is a non-preferred hand of a user holding the user device;
      in response to detecting the contextual interaction, display a marking menu comprised of thumb controls in the application canvas based on the contextual interaction within a range of motion of a thumb of the gripping hand for actuation by the thumb of the gripping hand;
      receive, from the thumb of the gripping hand, a selection of a first thumb control of the marking menu, wherein the first thumb control is a spring-loaded mode control associated with a first mode;
      while the first thumb control is being held by the thumb of the gripping hand, receive a first set of actions made by a pen held by a non-gripping hand;
      interpret the first set of actions based on the first mode;
      apply the interpreted first set of actions to the application canvas;
      in response to receiving a drag motion from the thumb of the gripping hand, re-display the marking menu comprised of the thumb controls in the application canvas;
      receive, from the thumb of the gripping hand, a selection of a second thumb control of the marking menu, wherein the second thumb control is a spring-loaded mode control associated with a second mode;
      while the second thumb control is being held by the thumb of the gripping hand, receive a second set of actions made by the pen held by the non-gripping hand;
      interpret the second set of actions based on the second mode; and apply the interpreted second set of actions to the application canvas.

7. The system of claim 6, wherein the processor further causes the system to:
while no thumb control is being held by the thumb of the gripping hand and a third set of actions made by the pen held by the non-gripping hand is received, interpret the third set of actions based on a default mode, wherein the default mode is distinct from the first mode and the second mode.

8. The system of claim 6, wherein the processor further causes the system to:
receive a selection of an object in the application canvas via the first set of actions; and
modify the object according to the interpreted first set of actions.

9. The system of claim 6, the processor further causes the system to:
determine the gripping hand is the non-preferred hand of the user holding the user device.

10. The system of claim 6, wherein the processor further causes the system to:
determine a hand size of the gripping hand; and
display the thumb controls in the application canvas based on the hand size.

11. The system of claim 6, wherein the processor further causes the system to:
determine a context in the application canvas; and
select the thumb controls for display in the application canvas based on the context.

12. The system of claim 11, wherein the context affects a location and a size of display for the thumb controls.

13. The system of claim 11, further comprising a motion sensor and an orientation sensor, wherein the context is determined according to the motion sensor and the orientation sensor.

14. The system of claim 6, wherein the first set of actions and the second set of actions are received from a finger of the non-gripping hand or a device held by the non-gripping hand.

15. The system of claim 6, wherein the first set of actions and the second set of actions include one or more of: contact with the user device and detected hover inputs in proximity with the user device.

16. A computer readable storage media including computer readable instructions, which when executed by a processor, performs steps for providing bimanual interactions for touchscreen enabled devices, comprising:
detecting a contextual interaction of a gripping hand at an edge of a user device, the user device including a touch interface and providing an application canvas accepting inputs from the touch interface, wherein the gripping hand is a non-preferred hand of a user holding the user device;
in response to detecting the contextual interaction, displaying a marking menu comprised of thumb controls within a range of motion of a thumb of the gripping hand in the application canvas based on the contextual interaction for actuation by the thumb of the gripping hand including:
determining a hand size of the gripping hand; and
displaying the thumb controls in the application canvas based on the hand size;
receiving, from the thumb of the gripping hand, a selection of a first thumb control of the marking menu, wherein the first thumb control is a spring-loaded mode control associated with a first mode;
while the first thumb control is being held by the thumb of the gripping hand, receiving a first set of actions made by a pen held by a non-gripping hand;
interpreting the first set of actions based on the first mode;
applying the interpreted first set of actions to the application canvas;
in response to receiving a drag motion from the thumb of the gripping hand, re-displaying the marking menu comprised of the thumb controls in the application canvas;
receiving, from the thumb of the gripping hand, a selection of a second thumb control of the marking menu, wherein the second thumb control is a spring-loaded mode control associated with a second mode;
while the second thumb control is being held by the thumb of the gripping hand, receiving a second set of actions made by the pen held by the non-gripping hand;
interpreting the second set of actions based on the second mode; and
applying the interpreted second set of actions to the application canvas.

17. The computer readable storage media of claim 16, further comprising:
while no thumb control is being held by the thumb of the gripping hand and a third set of actions made by the pen held by the non-gripping hand is received, interpreting the third set of actions based on a default mode, wherein the default mode is distinct from the first mode; and
the second mode.

* * * * *